United States Patent
Honda

(10) Patent No.: US 11,031,603 B2
(45) Date of Patent: Jun. 8, 2021

(54) BATTERY AND BATTERY MANUFACTURING METHOD

(71) Applicant: Panasonic Intellectual Property Management Co., Ltd., Osaka (JP)

(72) Inventor: Kazuyoshi Honda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 405 days.

(21) Appl. No.: 15/942,575

(22) Filed: Apr. 2, 2018

(65) Prior Publication Data

US 2018/0309134 A1    Oct. 25, 2018

(30) Foreign Application Priority Data

Apr. 19, 2017  (JP) .............................. JP2017-082830

(51) Int. Cl.
*H01M 4/78* (2006.01)
*H01M 10/04* (2006.01)
(Continued)

(52) U.S. Cl.
CPC ......... *H01M 4/78* (2013.01); *H01M 10/0404* (2013.01); *H01M 10/0431* (2013.01); *H01M 10/0463* (2013.01); *H01M 10/0472* (2013.01); *H01M 4/665* (2013.01); *H01M 10/0525* (2013.01); *H01M 10/0583* (2013.01)

(58) Field of Classification Search
CPC .... H01M 4/78; H01M 10/04; H01M 10/0583; H01M 10/0431; H01M 10/0463; H01M 10/0404; H01M 10/0472; H01M 4/665; H01M 10/0525; Y02E 60/10
See application file for complete search history.

(56) References Cited

U.S. PATENT DOCUMENTS

| | | | | |
|---|---|---|---|---|
| 4,999,263 A | * | 3/1991 | Kabata | H01M 10/04 429/131 |
| 5,635,312 A | * | 6/1997 | Yanagisawa | H01M 10/0436 429/94 |
| 2016/0308195 A1 | * | 10/2016 | Mui | H01M 4/667 |

FOREIGN PATENT DOCUMENTS

| | | |
|---|---|---|
| JP | 8-203539 | 8/1996 |
| JP | 2012-243395 | * 12/2012 |

(Continued)

OTHER PUBLICATIONS

JP 2014130754 MT (Year: 2014).*

*Primary Examiner* — Alexander Usyatinsky
(74) *Attorney, Agent, or Firm* — Greenblum & Bernstein, P.L.C.

(57) ABSTRACT

A battery includes a first current collector, a first electrode layer, and a first counter electrode layer. The first counter electrode layer is a counter electrode of the first electrode layer. The first current collector includes a first electroconductive portion, a second electroconductive portion, and a first insulating portion. The first electrode layer is disposed in contact with the first electroconductive portion. The first counter electrode layer is disposed in contact with the second electroconductive portion. The first insulating portion links the first electroconductive portion and the second electroconductive portion. The first current collector is folded at the first insulating portion, whereby the first electrode layer and the first counter electrode layer are positioned facing each other.

8 Claims, 68 Drawing Sheets

(51) Int. Cl.
*H01M 10/0583* (2010.01)
*H01M 4/66* (2006.01)
*H01M 10/0525* (2010.01)

(56) References Cited

FOREIGN PATENT DOCUMENTS

| | | | |
|---|---|---|---|
| JP | 2014130754 | * | 7/2014 |
| WO | 1988/008210 | | 10/1988 |

* cited by examiner

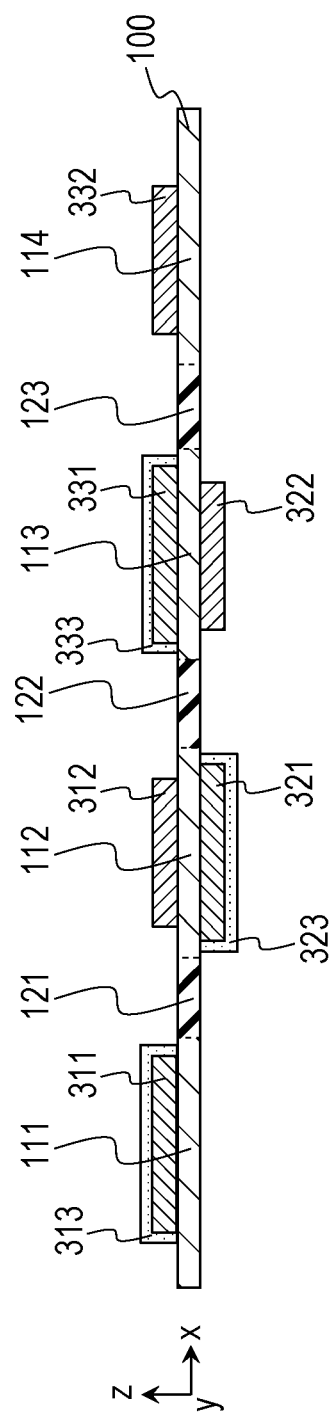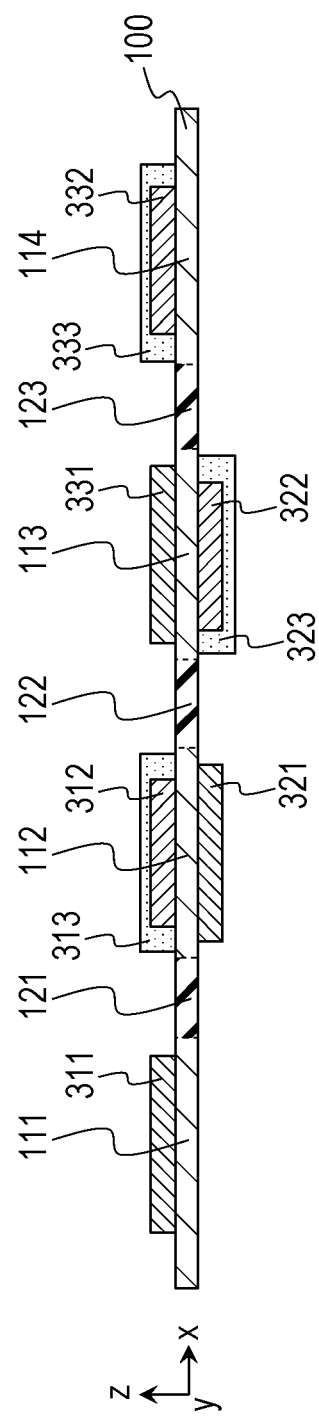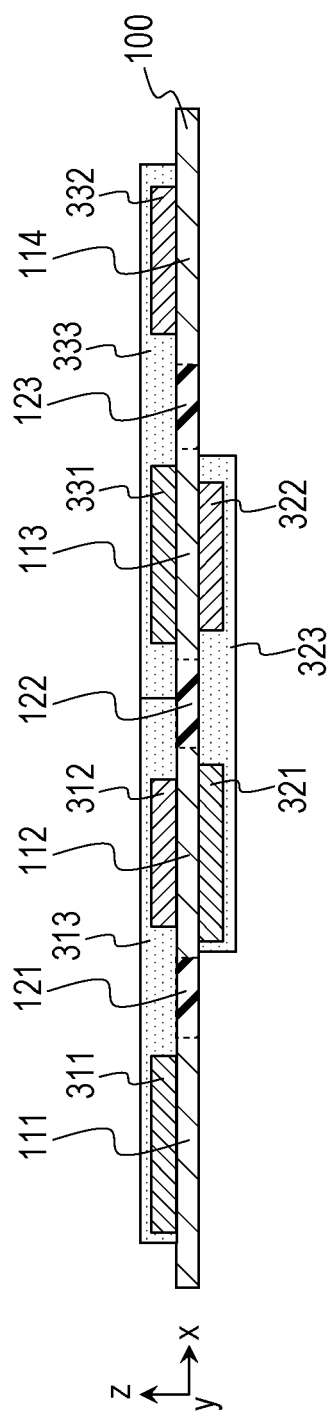

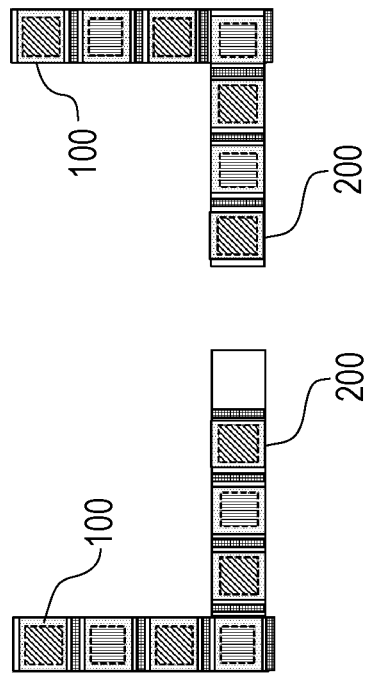
FIG. 67D
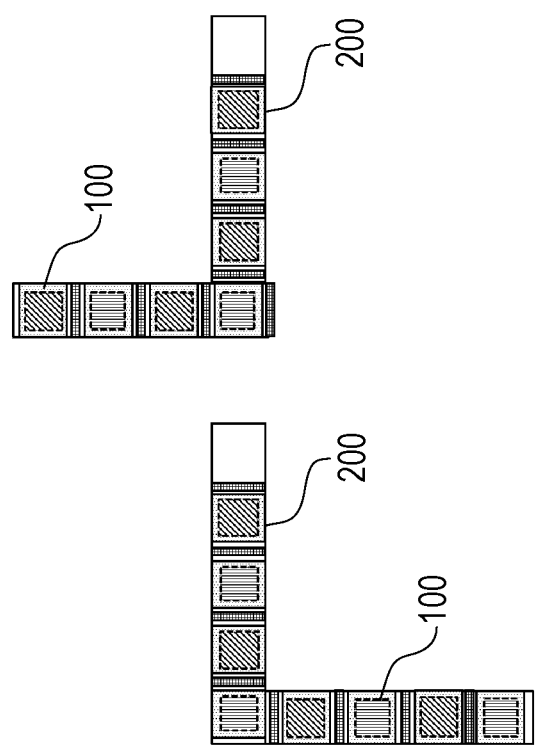
FIG. 67C
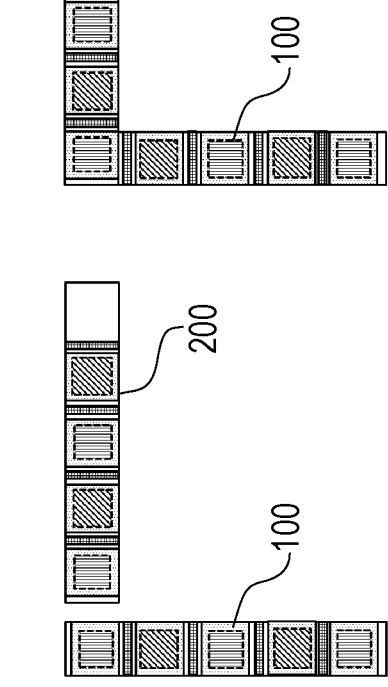
FIG. 67B
FIG. 67A
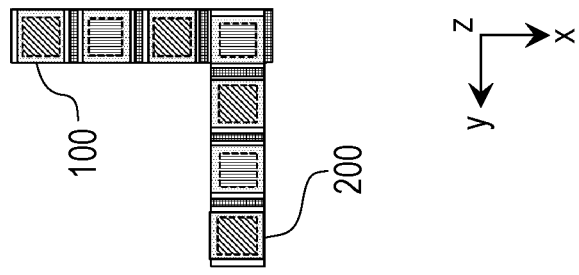
FIG. 67E
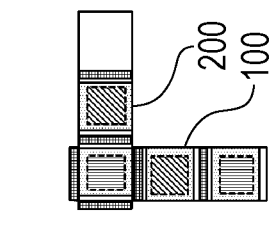
FIG. 67F
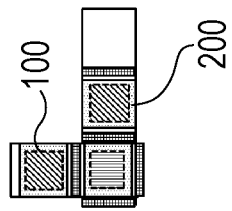
FIG. 67G
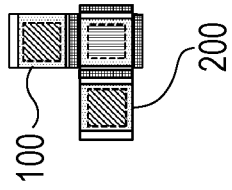
FIG. 67H
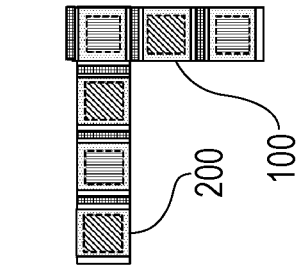
FIG. 67I
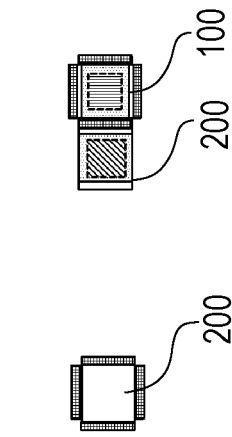
FIG. 67J

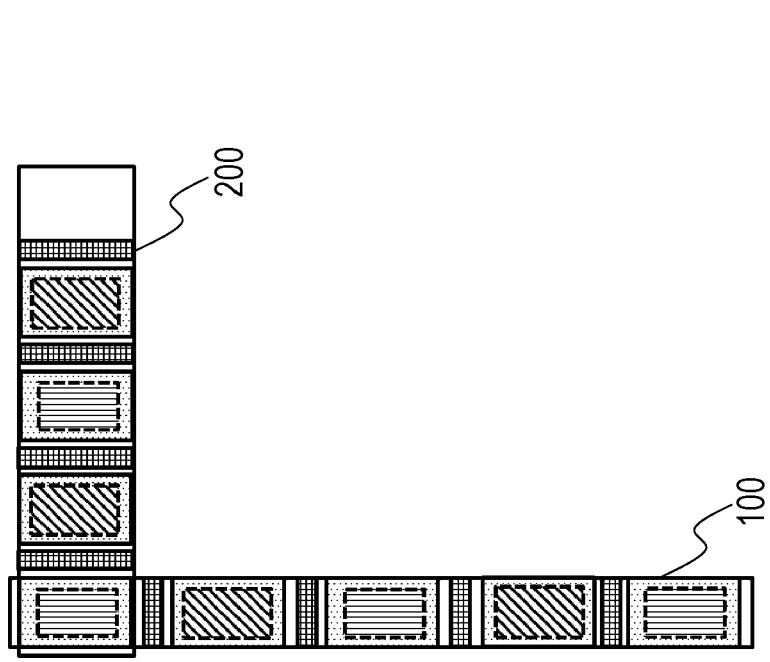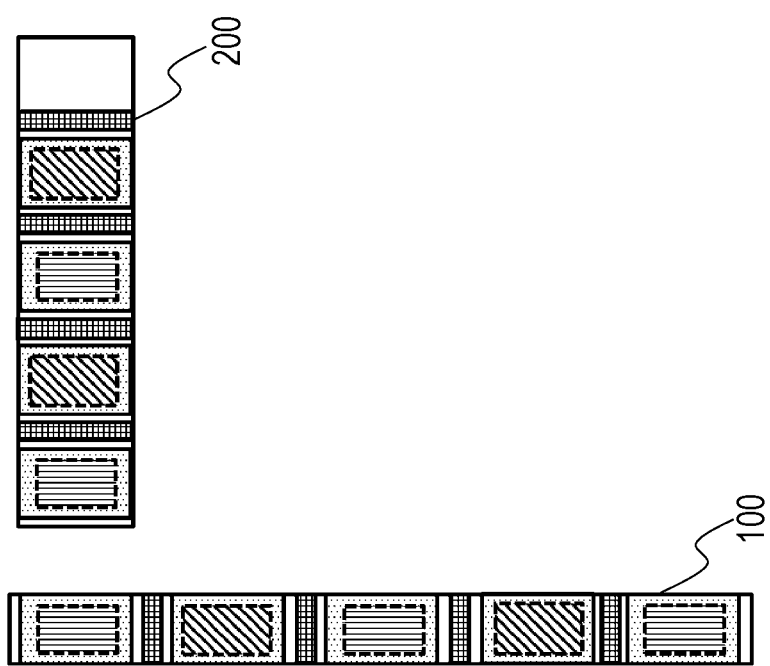

BATTERY AND BATTERY MANUFACTURING METHOD

BACKGROUND

1. Technical Field

The present disclosure relates to a battery and a battery manufacturing method.

2. Description of the Related Art

Japanese Unexamined Patent Application Publication No. 8-203539 discloses a laminated battery that is formed by disposing positive and negative electrodes formed in bands, disposed such that both faces of electrodes of one polarity face electrodes of the other polarity by being folded.

International Publication No. 88/008210 discloses a secondary battery having a structure where a positive electrode and negative electrode are folded in an alternating manner with separators disposed therebetween.

Japanese Patent No. 5,599,366 discloses a manufacturing method of a solid assembled battery, including a process of folding a band-shaped positive current collector and a band-shaped negative current collector in an alternating manner.

SUMMARY

Improved bonding strength of components of the battery is desired in the conventional art.

In one general aspect, the techniques disclosed here feature a battery including a first current collector, a first electrode layer; and a first counter electrode layer. The first counter electrode layer is a counter electrode of the first electrode layer. The first current collector includes a first electroconductive portion, a second electroconductive portion, and a first insulating portion. The first electrode layer is disposed in contact with the first electroconductive portion. The first counter electrode layer is disposed in contact with the second electroconductive portion. The first insulating portion links the first electroconductive portion and the second electroconductive portion. The first current collector is folded at the first insulating portion, whereby the first electrode layer and the first counter electrode layer are positioned facing each other.

A battery manufacturing method according to an aspect of the present disclosure is a battery manufacturing method using a battery manufacturing apparatus. The battery manufacturing apparatus includes an electrode layer forming unit, a counter electrode layer forming unit, and a current collector folding unit that folds a first current collector. T herein the first current collector includes a first electroconductive portion, a second electroconductive portion, and a first insulating portion linking the first electroconductive portion and the second electroconductive portion. The method includes steps of: forming (a1) a first electrode layer in contact with the first electroconductive portion by the electrode layer forming unit; forming (b1) the first counter electrode layer, which is a counter electrode of the first electrode layer, in contact with the second electroconductive portion, by the counter electrode layer forming unit; and folding (c1) the first insulating portion by the current collector folding unit. The first electrode layer and the first counter electrode layer are positioned facing each other, due to the first current collector being folded at the first insulating portion by the current collector folding unit in the folding step (c1).

According to the present disclosure, bonding strength of components of the battery can be improved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 46A through 46C are x-z diagrams (cross-sectional views) illustrating schematic configurations of the first current collector where electrode layers, counter electrode layers, and solid electrolyte layers have been formed;

FIGS. 67A through 67J are x-y views (plan views) illustrating an example of a laminating step and the insulating portion folding steps;

FIGS. 68A and 68B are x-y views (plan views) illustrating an example of laminating the first current collector and second current collector;

DETAILED DESCRIPTION

Embodiments will be described below with reference to the drawings.

First Embodiment

Figure 1:
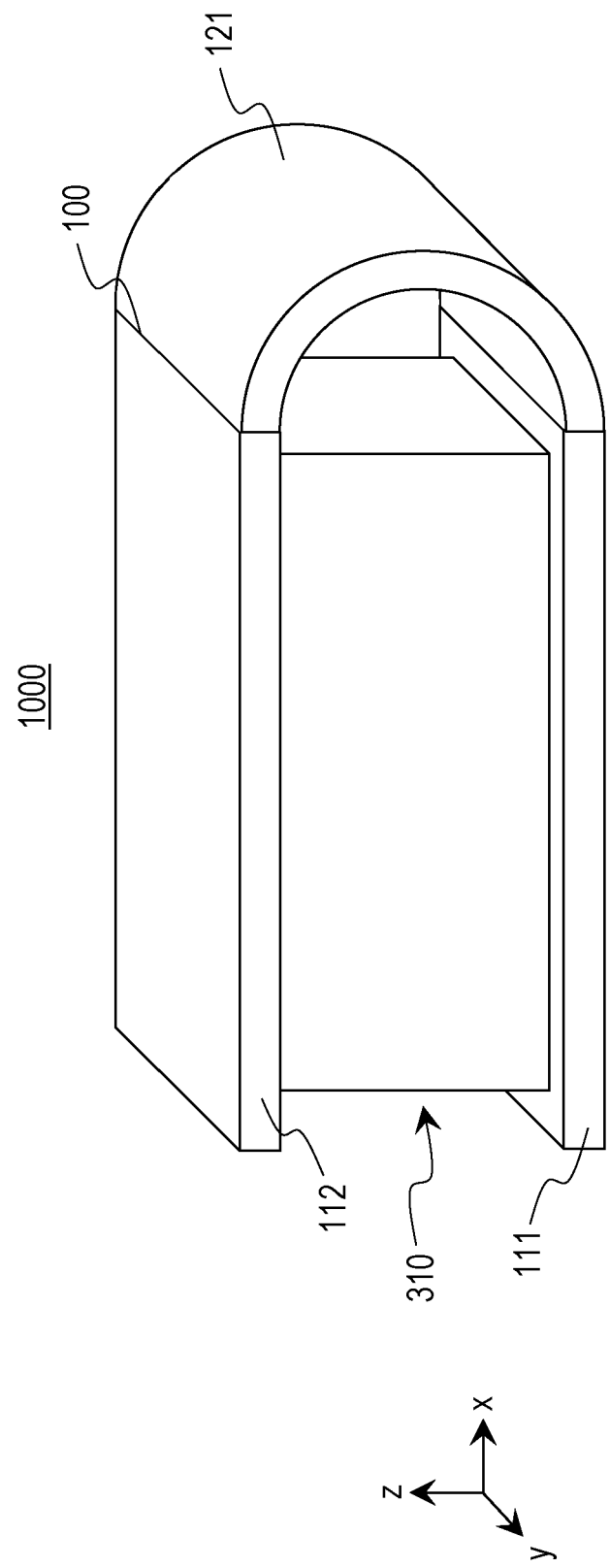
FIG. 1 is a perspective view illustrating a schematic configuration of a battery according to a first embodiment.

FIG. 1 is a perspective view illustrating a schematic configuration of a battery 1000 according to a first embodiment.

Figure 2:
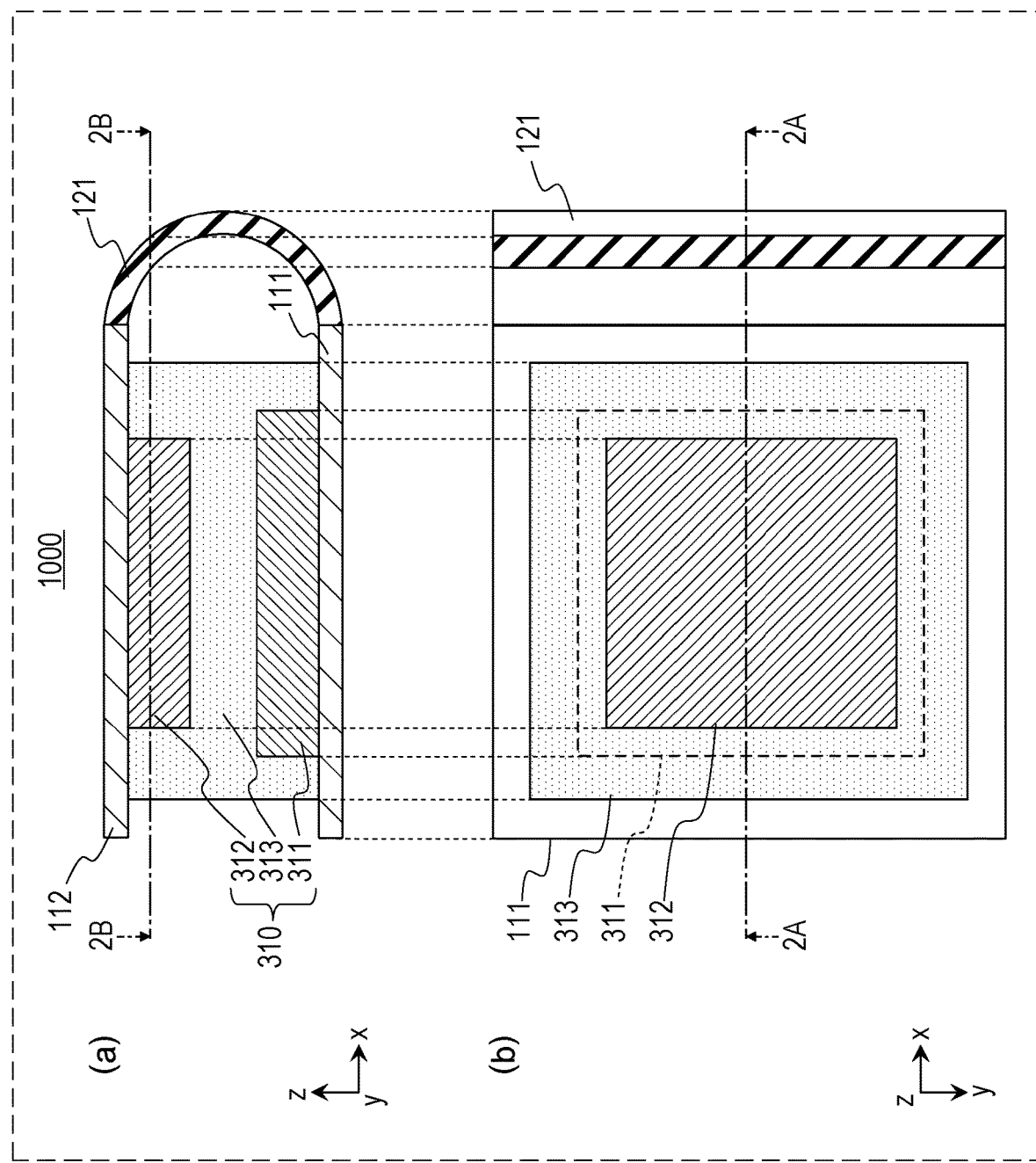
FIG. 2 is a diagram illustrating a schematic configuration of an example of the battery according to the first embodiment.

FIG. 2 is a diagram illustrating a schematic configuration of the battery 1000 according to the first embodiment.

Indicated by (a) in FIG. 2 is an x-z view (cross-sectional view taken along 2A in FIG. 2) illustrating the schematic configuration of the battery 1000 according to the first embodiment.

Indicated by (b) in FIG. 2B is an x-y view (cross-sectional view taken along 2B in FIG. 2) illustrating the schematic configuration of the battery 1000 according to the first embodiment.

The battery 1000 according to the first embodiment includes a first current collector 100, a first electrode layer 311, and a first counter electrode layer 312.

The first counter electrode layer 312 is a counter electrode of the first electrode layer 311.

The first current collector 100 has a first electroconductive portion 111, a second electroconductive portion 112, and a first insulating portion 121.

The first electrode layer 311 is disposed in contact with the first electroconductive portion 111.

The first counter electrode layer 312 is disposed in contact with the second electroconductive portion 112.

The first insulating portion 121 is a member linking the first electroconductive portion 111 and second electroconductive portion 112.

The first current collector 100 is folded at the first insulating portion 121, whereby the first electrode layer 311 and first counter electrode layer 312 are positioned facing each other.

According to the above configuration, the bonding strength between components of the battery can be improved. That is to say, the first electrode layer 311 and first counter electrode layer 312 can be respectively disposed to the first electroconductive portion 111 and second electroconductive portion 112 that are linked to each other by the first insulating portion 121. Accordingly, the positional relationship between the first electrode layer 311 disposed on the first electroconductive portion 111 and the first counter electrode layer 312 disposed on the second electroconductive portion 112 can be strongly maintained by the first insulating portion 121 (in other words, by the first current collector 100 that is one component). Accordingly, the layers (or cells) making up the battery can be prevented from exhibiting positional shifting or separation due to shock, vibration, and so forth, when manufacturing the battery or using the battery, for example. That is to say, the strength of bonding of the layers (e.g., the first electrode layer 311 and first counter electrode layer 312) making up the battery can be improved by the first current collector 100. Thus, reliability of the battery can be improved.

Also, according to the above configuration, out of the side faces of the battery, the side face where the first insulating portion 121 is situated can be covered by the first insulating portion 121. Accordingly, mutual contact between members that may exist outside of the battery (e.g., another battery, etc.), and the side face of the battery where the first insulating portion 121 is situated, can be prevented by the first insulating portion 121. Thus, short-circuiting among batteries can be suppressed. Also, partial destruction of the side face of the battery by contact between the battery and members that may exist outside of the battery can be suppressed. Even if a part of battery components (e.g., electrode material included in the first electrode layer 311, counter electrode material included in the first counter electrode layer 312, and so forth) of the battery falls loose, the fallen component can be suppressed by the first insulating portion 121 from moving to another cell portion within the battery or to the outside of the battery, due to part of the side face of the battery being covered by the first insulating portion 121. Accordingly, short-circuiting within the battery due to fallen components of the battery can be suppressed. This enables the reliability of the battery to be further improved.

Note that the battery 1000 according to the first embodiment may further include a first solid electrolyte layer 313, as illustrated in FIG. 2.

The first solid electrolyte layer 313 is situated between the first electrode layer 311 and the first counter electrode layer 312.

According to the above configuration, one solid battery cell (first power-generating element 310) can be configured from the first electrode layer 311, first counter electrode layer 312, and first solid electrolyte layer 313.

Note that the first solid electrolyte layer 313 may be disposed in contact with the first electroconductive portion 111 and second electroconductive portion 112 in the battery 1000 according to the first embodiment.

According to the above configuration, the strength of bonding between components of the battery can be further improved. That is to say, the strength of bonding between the first electroconductive portion 111 and second electroconductive portion 112 can be improved by the first solid electrolyte layer 313. Accordingly, the first electrode layer 312 can be suppressed from peeling loose from the second electroconductive portion 112. Further, the first electrode layer 311 can be suppressed from peeling loose from the first electroconductive portion 111. Thus, the layers of the first power-generating element 310 can be prevented from exhibiting positional shifting or separation due to shock, vibration, and so forth, when manufacturing the battery or using the battery, for example. Thus, reliability of the battery can be improved even further.

The first electroconductive portion 111 and second electroconductive portion 112 are members having electroconductivity. The first electroconductive portion 111 and second electroconductive portion 112 may be thin films having electroconductivity, for example. Examples of material from which the first electroconductive portion 111 and second electroconductive portion 112 are formed include metal (stainless steel (SUS), aluminum (Al), copper (Cu), and so forth), for example. The material of a principal face of the first electroconductive portion 111 and second electroconductive portion 112 on which electrode layers are formed may be a different material from that of a principal face where counter electrode layers are formed. That is to say, a multi-layer-structure metal foil may be used for the first electroconductive portion 111 and second electroconductive portion 112. Also, a current collector layer (e.g., a layer including an electroconductive material) may be provided to portions coming into contact with an electrode layer or counter electrode layer. The thicknesses of the first electroconductive portion 111 and second electroconductive portion 112 may be 5 to 100 μm, for example.

The first power-generating element 310 is a power-generating unit having charging and discharging properties (e.g., a secondary battery), for example. The first power-generating element 310 may be a battery cell, for example.

Note that the first power-generating element 310 may have a solid electrolyte layer. That is to say, the first power-generating element 310 may be a fully-solid battery.

The first electrode layer 311 is a layer including electrode material (e.g., active material).

The first counter electrode layer 312 is a layer including counter electrode material (e.g., active material). Counter electrode material is material making up counter electrodes to the electrode material.

The first electrode layer 311 and first counter electrode layer 312 may be each formed over ranges narrower than the first electroconductive portion 111 and second electroconductive portion 112, as illustrated in FIG. 2.

The first solid electrolyte layer 313 is a solid electrolyte layer including a solid electrolyte.

The first solid electrolyte layer 313 may be disposed over a greater area than that of the first electrode layer 311 and first counter electrode layer 312, as illustrated in FIG. 2. That is to say, the first solid electrolyte layer 313 may be disposed in a manner covering the first electrode layer 311 and first counter electrode layer 312. Accordingly, short-circuiting of the first electrode layer 311 and first counter electrode layer 312 due to direct contact can be prevented.

The first solid electrolyte layer 313 may be disposed in a range that is narrower than the first electroconductive portion 111 and second electroconductive portion 112, as illustrated in FIG. 2. Alternatively, the formation range of the first solid electrolyte layer 313 may be the same range as the first electroconductive portion 111 and second electroconductive portion 112.

Note that the first electrode layer 311 may be a negative active material layer. The electrode material in this case is a negative active material. The first electroconductive portion 111 is a negative current collector. The first counter electrode layer 312 is a positive active material layer. The counter electrode material is a positive active material. The second electroconductive portion 112 is a positive current collector.

Alternatively, first electrode layer 311 may be a positive active material layer. The electrode material in this case is a positive active material. The first electroconductive portion 111 is a positive current collector. The first counter electrode layer 312 is a negative active material layer. The counter electrode material is a negative active material. The second electroconductive portion 112 is a negative current collector.

Known positive active materials (e.g., lithium cobalt oxide, lithium oxonitrate (LiNO), etc.) may be used as positive active material included in the positive active material layers. Various materials capable of ion detachment and insertion such as lithium (Li) and magnesium (Mg) may be used as ingredients of the positive active material.

Known solid electrolytes (e.g., inorganic solid electrolytes, etc.) may be used as materials included in the positive active material layers. Sulfide solid electrolytes, oxide solid electrolytes, or the like, may be used as an inorganic solid electrolyte. As an example of a sulfide solid electrolyte, a mixture of lithium sulfide and phosphorus pentasulfide ($Li_2S:P_2S_5$) may be used. The surface of the positive active material may be coated with a solid electrolyte. Conductors (e.g., acetylene black, etc.), adhesive binders (e.g., polyvinylidene difluoride, etc.) may be used as materials included in the positive active material layers.

A positive active material layer may be fabricated by a paste-like coating agent, in which these materials included in the positive active material layers have been kneaded with a solvent, being coated upon the face of a positive current collector, and dried. Pressing may be performed after drying, in order to improve the density of the positive active material layer. The thickness of the positive active material layer fabricated in this way is 5 to 300 μm, for example.

Metal foil (e.g., SUS foil or Al foil) or the like may be used as the positive current collector.

Known negative active materials (e.g., graphite, etc.) may be used as negative active material included in the negative active material layers. Various materials capable of ion detachment and insertion such as lithium (Li) and magnesium (Mg) may be used as ingredients of the positive active material.

Known solid electrolytes (e.g., inorganic solid electrolytes, etc.) may be used as materials included in the negative active material layers. Sulfide solid electrolytes, oxide solid electrolytes, or the like, may be used as an inorganic solid electrolyte. As an example of a sulfide solid electrolyte, a mixture of $Li_2S:P_2S_5$ may be used. Conductors (e.g., acetylene black, etc.), adhesive binders (e.g., polyvinylidene difluoride, etc.) may be used as materials included in the negative active material layers.

A negative active material layer may be fabricated by a paste-like coating agent, in which these materials included in the negative active material layers have been kneaded with a solvent, being coated upon the face of a negative current collector, and dried. Pressing of the negative polarity plate may be performed in order to improve the density of the negative active material layer. The thickness of the negative active material layer fabricated in this way is 5 to 300 μm, for example.

Metal foil (e.g., SUS foil or Cu foil) or the like may be used as the negative current collector.

The range of formation of the positive active material layers and the negative active material layers may be the same. Alternatively, the range of formation of the negative active material layers may be larger than the range of formation of the positive active material layers. According to this, deterioration in reliability of the battery due to lithium deposition (or magnesium deposition), for example, can be prevented.

Known solid electrolytes (e.g., inorganic solid electrolytes, etc.) may be used as solid electrolytes included in the solid electrolyte layers. Sulfide solid electrolytes, oxide solid electrolytes, or the like, may be used as an inorganic solid electrolyte. As an example of a sulfide solid electrolyte, a mixture of $Li_2S:P_2S_5$ may be used.

Adhesive binders (e.g., polyvinylidene difluoride, etc.) may be used as materials included in the solid electrolyte layers.

A solid electrolyte layer may be fabricated by a paste-like coating agent, in which these included materials have been kneaded with a solvent, being coated upon the face of a positive current collector or negative current collector, and dried.

The first insulating portion 121 is a member formed of insulating material (i.e., material having no electroconductivity or sufficiently low electroconductivity). Examples of the material of the first insulating portion 121 includes resin or the like. The first insulating portion 121 may be a resin film (or mesh), for example. The thickness of the first insulating portion 121 may be 5 to 100 μm, for example.

The first insulating portion 121 is linked to the first electroconductive portion 111 and second electroconductive portion 112. That is to say, one end of the first insulating portion 121 is connected (e.g., bonded) to the first electroconductive portion 111 (e.g., an end of the first electroconductive portion 111). Another end of the first insulating portion 121 is further connected (e.g., bonded) to the second electroconductive portion 112 (e.g., an end portion of the second electroconductive portion 112).

The first current collector 100 may be fabricated by the first electroconductive portion 111, second electroconductive portion 112, and first insulating portion 121, that have each been individually prepared, being combined (i.e., connected to each other.)

Figure 3:
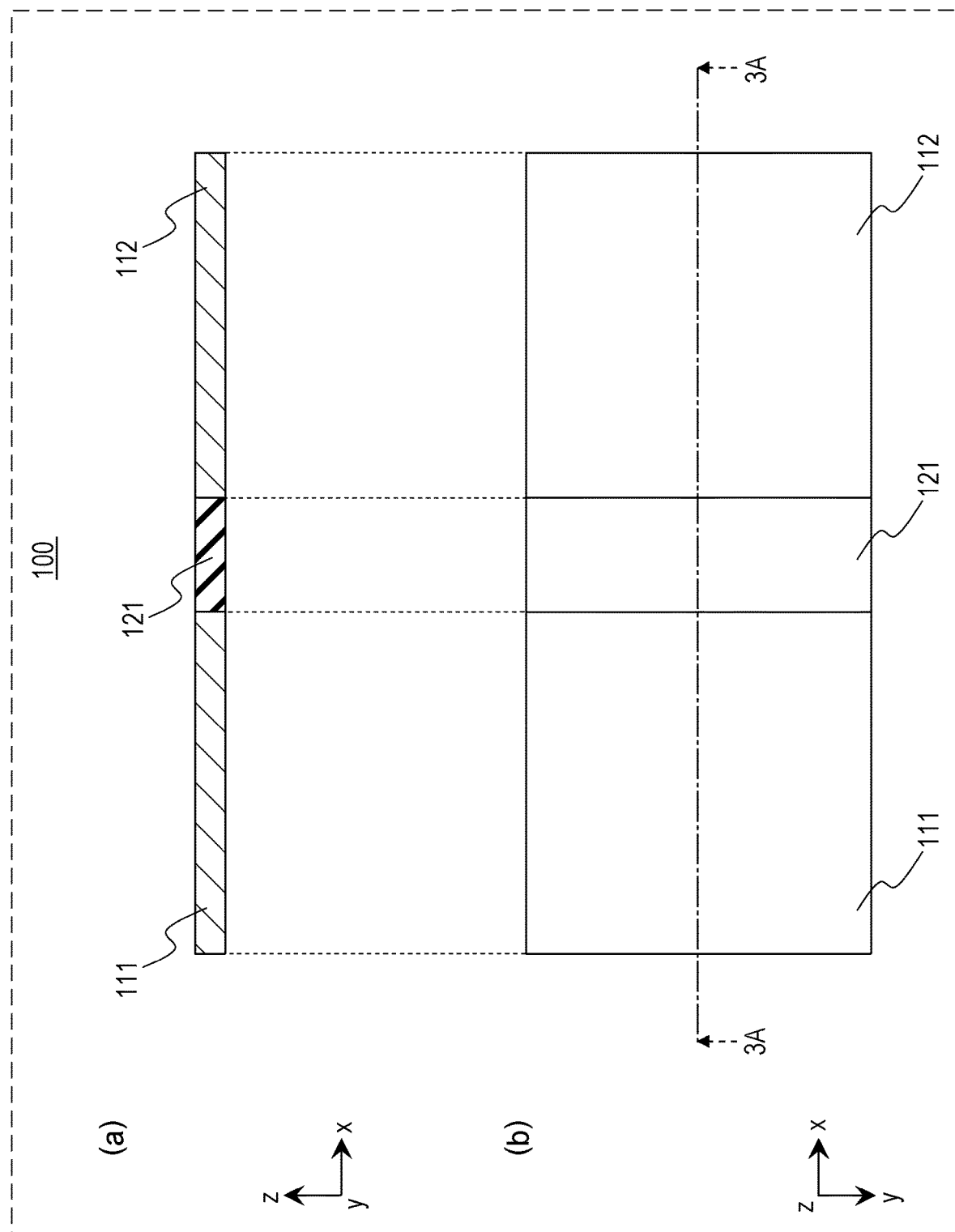
FIG. 3 is a diagram illustrating a schematic configuration of an example of a first current collector.

FIG. 3 is a diagram illustrating a schematic configuration of an example of the first current collector 100.

Indicated by (a) in FIG. 3 is an x-z view (cross-sectional view taken along 3A in FIG. 3) illustrating a schematic configuration of an example of the first current collector 100.

Indicated by (b) FIG. 3 is an x-y view (plan view) illustrating a schematic configuration of an example of the first current collector 100.

At least one (or both) of the first electroconductive portion 111 and second electroconductive portion 112 may be connected to the first insulating portion 121 by abutting, as illustrated in FIG. 3. That is to say, the side faces of the first electroconductive portion 111 and first insulating portion 121 may be connected (e.g., bonded) to the first insulating portion 121.

According to this configuration, steps on the first current collector 100 can be reduced in size. Accordingly, the form after winding up when manufacturing the battery can be improved, for example. Thus, a battery with higher energy density can be realized.

Figure 4:
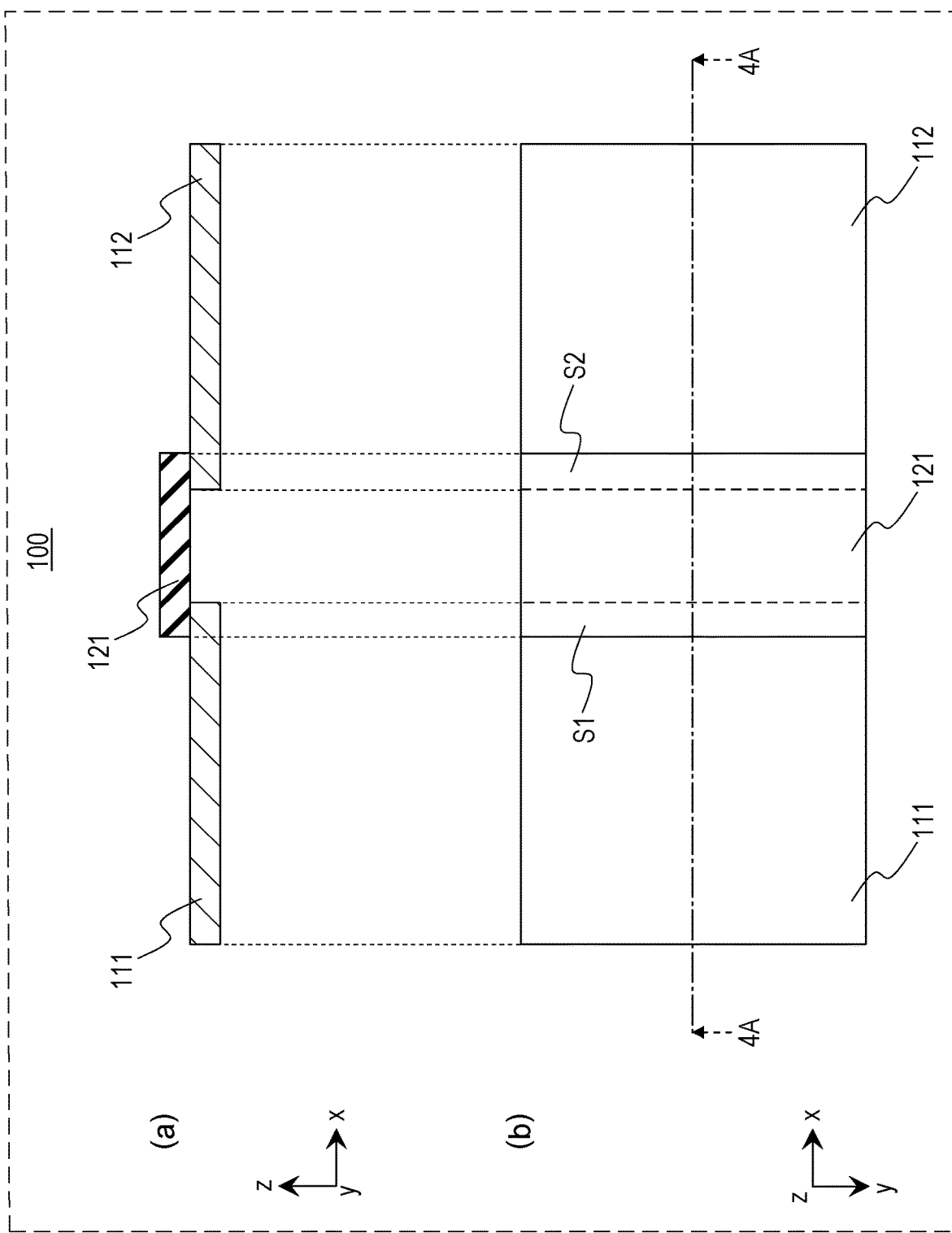
FIG. 4 is a diagram illustrating a schematic configuration of an example of the first current collector.

FIG. 4 is a diagram illustrating a schematic configuration of an example of the first current collector 100.

Indicated by (a) in FIG. 4 is an x-z view (cross-sectional view taken along 4A in FIG. 4) illustrating a schematic configuration of an example of the first current collector 100.

Indicated by (b) in FIG. 4 is an x-y view (plan view) illustrating a schematic configuration of an example of the first current collector 100.

At least one (or both) of the of the ends first electroconductive portion 111 and second electroconductive portion 112 (S1 and S2 illustrated in (b) in FIG. 4) may be connected to the first insulating portion 121 by overlapping, as illustrated in FIG. 4.

According to this configuration, the bonding area can be increased. Thus, the bonding strength can be improved.

Figure 5:
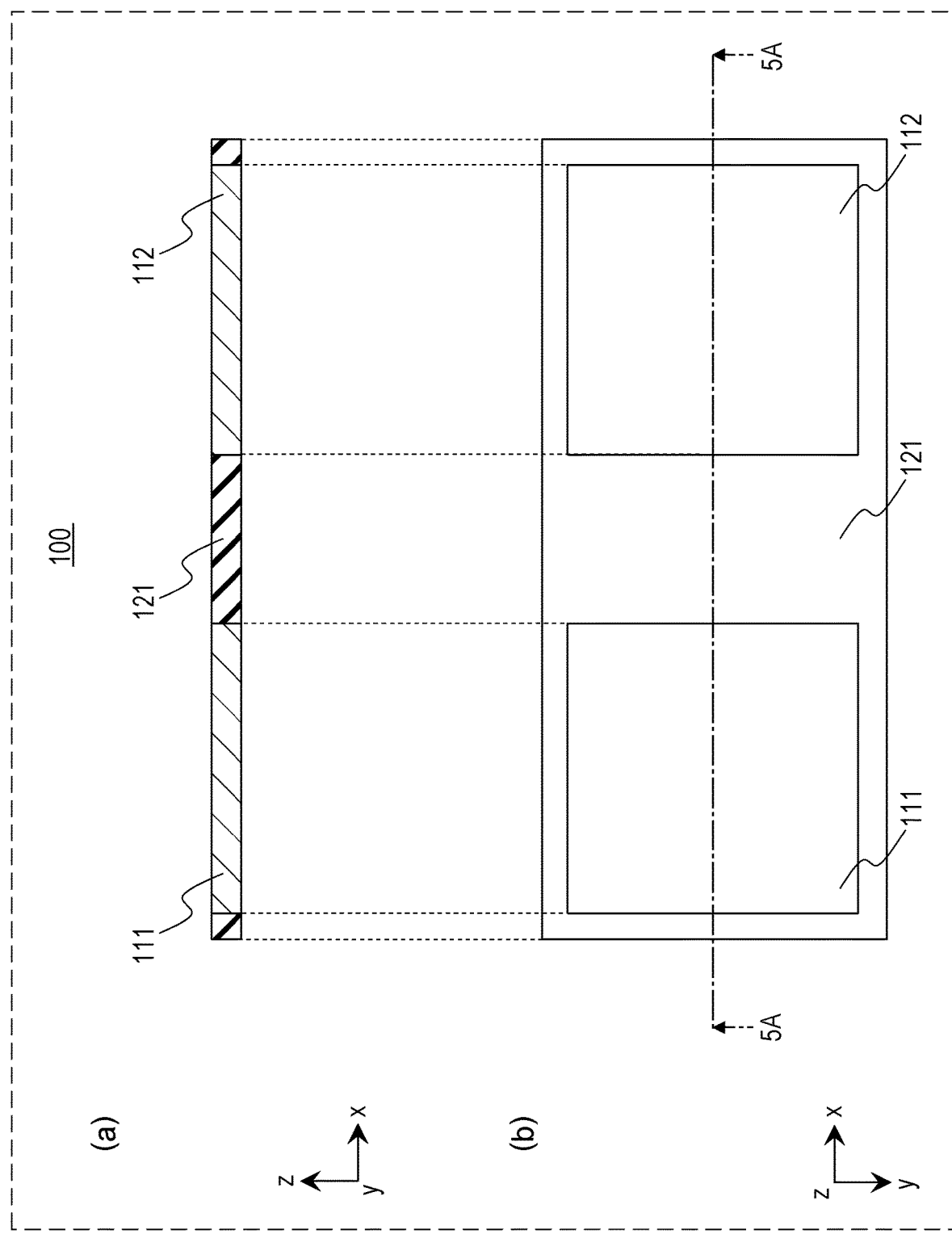
FIG. 5 is a diagram illustrating a schematic configuration of an example of the first current collector.

FIG. 5 is a diagram illustrating a schematic configuration of an example of the first current collector 100.

Indicated by (a) in FIG. 5 is an x-z view (cross-sectional view taken along 5A in FIG. 5) illustrating a schematic configuration of an example of the first current collector 100.

Indicated by (b) in FIG. 5 is an x-y view (plan view) illustrating a schematic configuration of an example of the first current collector 100.

At least one (or both) of the first electroconductive portion 111 and second electroconductive portion 112 may be connected to the first insulating portion 121 by fitting, as illustrated in FIG. 5. That is to say, the first electroconductive portion 111 and second electroconductive portion 112 may each be embedded into opening portions formed in the first insulating portion 121. The first electroconductive portion 111 and second electroconductive portion 112 may thus be fixed to the opening portions of the first insulating portion 121.

According to this configuration, steps on the first current collector 100 can be reduced in size. Accordingly, the form after winding up when manufacturing the battery can be improved, for example. Thus, a battery with higher energy density can be realized. Further, the first insulating portion 121 can be continuously formed over the entirety of the first current collector 100. Thus, the tensile strength of the first current collector 100 can be improved.

Note that the first insulating portion 121 may be a portion formed by a part (electroconductive part) of the first current collector 100 being made non-electroconductive (e.g., electroconductivity being sufficiently reduced) by chemical processing (oxidization, etc.), for example.

Figure 6:
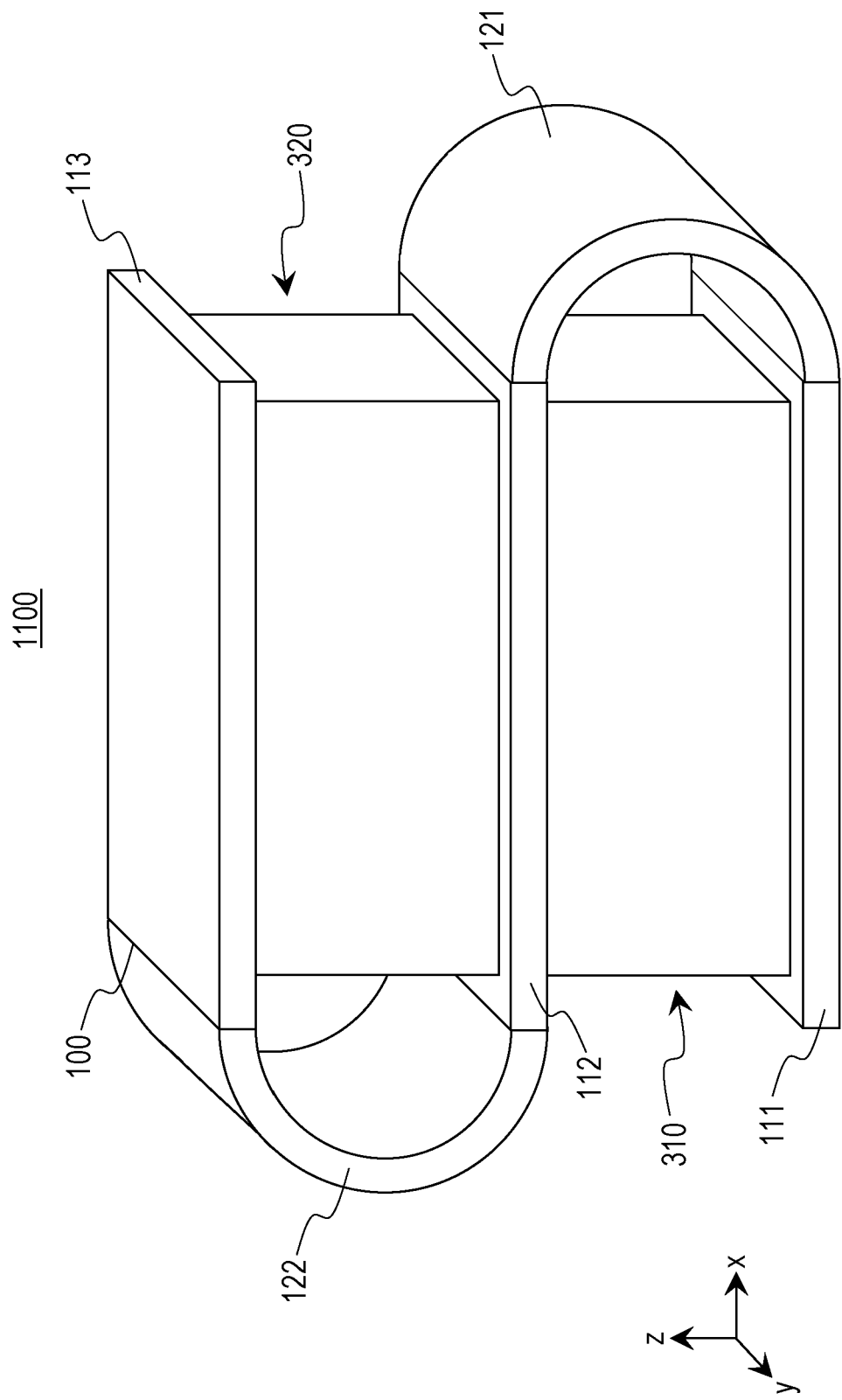
FIG. 6 is a perspective view illustrating a schematic configuration of a battery according to the first embodiment.

FIG. 6 is a perspective view illustrating a schematic configuration of a battery 1100 according to the first embodiment.

Figure 7:
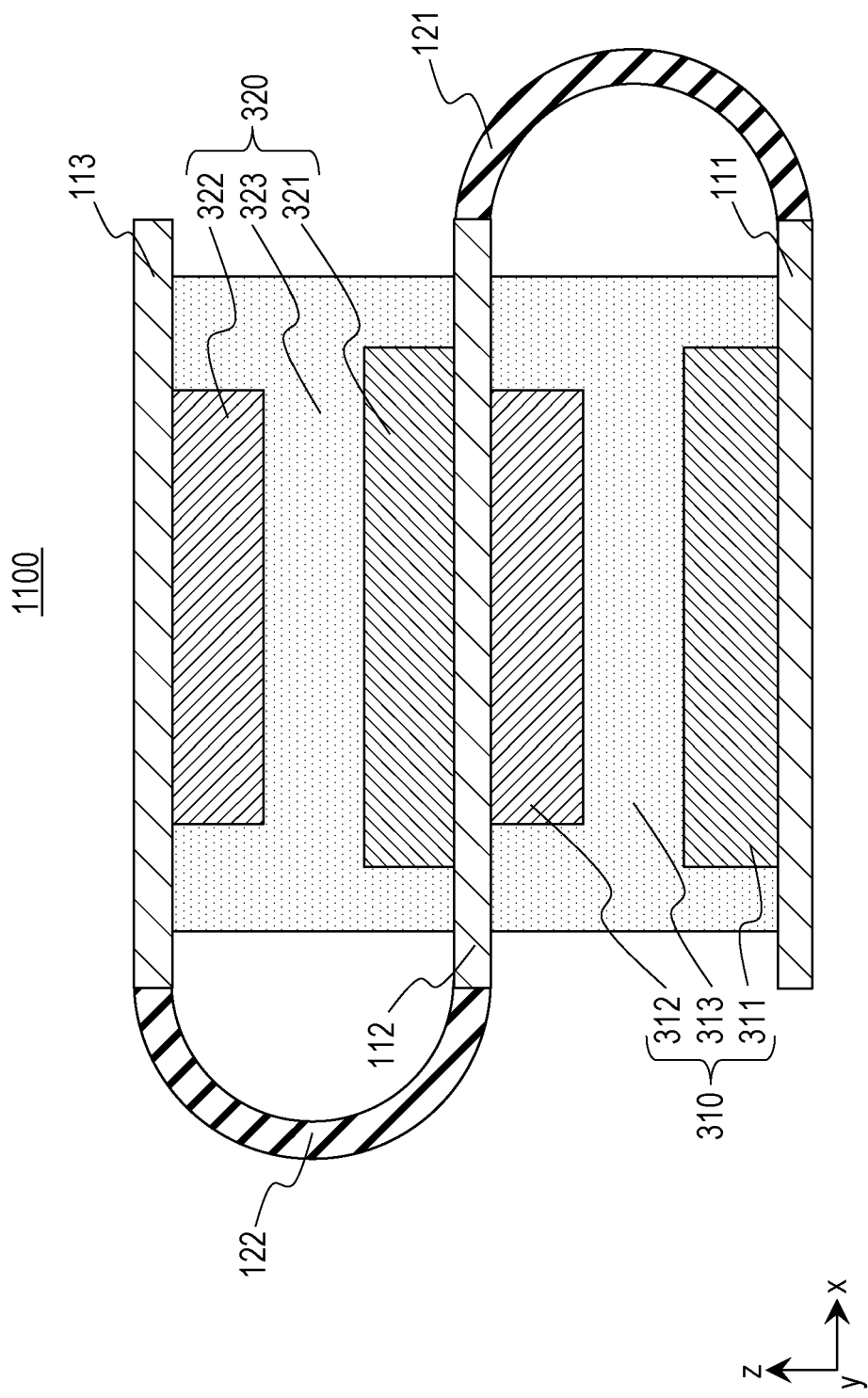
FIG. 7 is an x-z diagram (cross-sectional view) illustrating a schematic configuration of a battery according to the first embodiment.

FIG. 7 is an x-z diagram (cross-sectional view) illustrating a schematic configuration of the battery 1100 according to the first embodiment.

The battery 1100 according to the first embodiment further has, in addition to the configuration of the above-described battery 1000 according to the first embodiment, the following configuration.

That is to say, the battery 1100 according to the first embodiment further includes a second electrode layer 321 and a second counter electrode layer 322.

The second counter electrode layer 322 is a counter electrode of the first electrode layer 311 and second electrode layer 321.

The first current collector 100 includes a second insulating portion 122 and a third electroconductive portion 113.

The second electrode layer 321 is disposed in contact with the second electroconductive portion 112.

The second counter electrode layer 322 is disposed in contact with the third electroconductive portion 113.

The second insulating portion 122 is a member linking the second electroconductive portion 112 and third electroconductive portion 113.

The first current collector 100 is folded at the second insulating portion 122, whereby the second electrode layer 321 and second counter electrode layer 322 are positioned facing each other.

According to the above configuration, the bonding strength between components of the battery can be improved. That is to say, the second electrode layer 321 and second counter electrode layer 322 can be respectively disposed to the second electroconductive portion 112 and third electroconductive portion 113 that are linked to each other by the second insulating portion 122. Accordingly, the positional relationship between the second electrode layer 321 disposed on the second electroconductive portion 112 and the second counter electrode layer 322 disposed on the third electroconductive portion 113 can be strongly maintained by the second insulating portion 122 (in other words, by the first current collector 100 that is one component). Accordingly, the layers (e.g., second electrode layer 321 and second counter electrode layer 322) making up the battery can be prevented from exhibiting positional shifting or separation due to shock, vibration, and so forth, when manufacturing the battery or using the battery, for example.

Also, according to the above configuration, a laminated battery can be configured using the first current collector 100. That is to say, a power-generating element (first power-generating element 310) including the first electrode layer 311 and first counter electrode layer 312, and a power-generating element (second power-generating element 320) including the second electrode layer 321 and second counter electrode layer 322, can be laminated by serial connection via the first current collector 100 (i.e., the second electroconductive portion 112 of the first current collector 100). Accordingly, the positional relationship between the components of the first power-generating element 310 and the components of the second power-generating element 320 can be strongly maintained by the first insulating portion 121 and second insulating portion 122 (in other words, by the first current collector 100 that is one component). Accordingly, the power-generating elements (e.g., the first power-generating element 310 and second power-generating element 320) making up the battery can be prevented from exhibiting positional shifting or separation due to shock, vibration, and so forth, when manufacturing the battery or using the battery, for example. Thus, the reliability of the battery can be improved while raising the battery voltage by the serial connection of the first power-generating element 310 and second power-generating element 320.

Also, according to the above configuration, out of the side faces of the battery, the side face where the second insulating portion 122 is situated can be covered by the second insulating portion 122. Accordingly, mutual contact between members that may exist outside of the battery (e.g., another battery, etc.), and the side face of the battery where the second insulating portion 122 is situated, can be prevented by the second insulating portion 122. Thus, short-circuiting due to contact among batteries can be suppressed. Also, partial destruction of the side face of the battery by contact between the battery and members that may exist outside of the battery can be suppressed. Even if a part of components (e.g., electrode material included in the second electrode layer 321, counter electrode material included in the second counter electrode layer 322, and so forth) of the battery falls loose, the fallen component can be suppressed by the second insulating portion 122 from moving to another cell portion (e.g., the first power-generating element 310, etc.) within the battery or to the outside of the battery, due to part of the side face of the battery being covered by the second insulating portion 122. Accordingly, short-circuiting within the battery due to fallen components of the battery can be suppressed. This enables the reliability of the battery to be further improved.

Note that the battery 1100 according to the first embodiment may further include a second solid electrolyte layer 323, as illustrated in FIG. 7.

The second solid electrolyte layer 323 is situated between the second electrode layer 321 and second counter electrode layer 322.

According to the above configuration, one solid battery cell (second power-generating element 320) can be configured from the second electrode layer 321, second counter electrode layer 322, and second solid electrolyte layer 323.

Note that the second solid electrolyte layer 323 may be disposed in contact with the second electroconductive portion 112 and third electroconductive portion 113 in the battery 1100 according to the first embodiment.

According to the above configuration, the strength of bonding between components of the battery can be further improved. That is to say, the strength of bonding between the second electroconductive portion 112 and third electroconductive portion 113 can be improved by the second solid electrolyte layer 323. Accordingly, the second counter electrode layer 322 can be suppressed from peeling loose from the third electroconductive portion 113. Further, the second electrode layer 321 can be suppressed from peeling loose from the second electroconductive portion 112. Thus, the layers making up the second power-generating element 320 can be prevented from exhibiting positional shifting or separation due to shock, vibration, and so forth, when manufacturing the battery or using the battery, for example. Thus, reliability of the battery can be improved even further.

The second electrode layer 321 and second counter electrode layer 322 may be each formed over ranges narrower than the second electroconductive portion 112 and third electroconductive portion 113, as illustrated in FIG. 7.

The second solid electrolyte layer 323 may be disposed over a greater area than that of the second electrode layer 321 and second counter electrode layer 322, as illustrated in FIG. 7. That is to say, the second solid electrolyte layer 323 may be disposed in a manner covering the second electrode layer 321 and second counter electrode layer 322. Accordingly, short-circuiting of the second electrode layer 321 and second counter electrode layer 322 due to direct contact can be prevented.

The second solid electrolyte layer 323 may be disposed in a range that is narrower than the second electroconductive portion 112 and third electroconductive portion 113, as illustrated in FIG. 7. Alternatively, the formation range of the second solid electrolyte layer 323 may be the same range as the second electroconductive portion 112 and third electroconductive portion 113.

The second insulating portion 122 is linked to the second electroconductive portion 112 and third electroconductive portion 113. That is to say, one end of the second insulating portion 122 is connected (e.g., bonded) to the second electroconductive portion 112 (e.g., an end of the second electroconductive portion 112). Another end of the second insulating portion 122 is further connected (e.g., bonded) to the third electroconductive portion 113 (e.g., an end portion of the third electroconductive portion 113).

Note that the method of connecting at least one (or both) of the second electroconductive portion 112 and the third electroconductive portion 113 to the second insulating portion 122 may be different from the method of connecting at least one (or both) of the first electroconductive portion 111 and second electroconductive portion 112 to the first insulating portion 121, or may be the same.

Note that the end of the second electroconductive portion 112 (i.e., in a case where the second electroconductive portion 112 is rectangular, one side of the rectangle) to which the second insulating portion 122 is connected may be different from the end of the second electroconductive portion 112 to which the first insulating portion 121 is connected, or may be the same. That is to say, the end of the second electroconductive portion 112 to which the second insulating portion 122 is connected may be an end situated across from the end of the second electroconductive portion 112 to which the first insulating portion 121 is connected, as illustrated in FIGS. 6 and 7. Alternatively, the end of the second electroconductive portion 112 to which the second insulating portion 122 is connected may be an end adjacent to the end of the second electroconductive portion 112 to which the first insulating portion 121 is connected.

Note that the first electrode layer 311 and second electrode layer 321 may be negative active material layers. The electrode material in this case is a negative active material. The first electroconductive portion 111 is a negative current collector. The first counter electrode layer 312 and second counter electrode layer 322 are positive active material layers. The counter electrode material is a positive active material. The second electroconductive portion 112 is a bipolar current collector (i.e., a current collector having a principal face having a positive layer and a principal face having a negative layer). The third electroconductive portion 113 is a positive current collector.

Alternatively, the first electrode layer 311 and second electrode layer 321 may be positive active material layers. The electrode material in this case is a positive active material. The first electroconductive portion 111 is a positive current collector. The first counter electrode layer 312 and second counter electrode layer 322 are negative active material layers. The counter electrode material is a negative active material. The second electroconductive portion 112 is a bipolar current collector. The third electroconductive portion 113 is a negative current collector.

Figure 8:
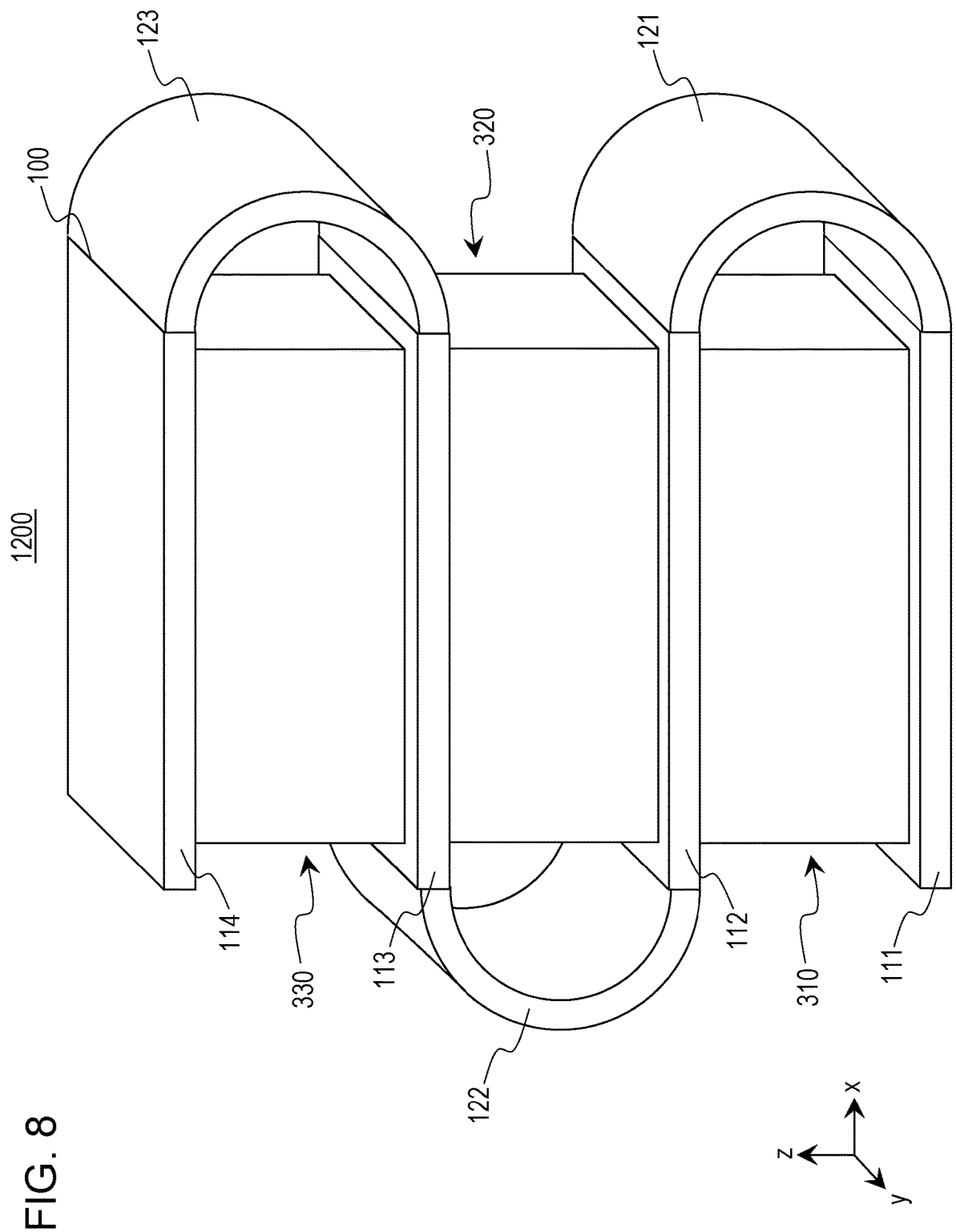
FIG. 8 is a perspective view illustrating a schematic configuration of a battery according to the first embodiment.

FIG. 8 is a perspective view illustrating a schematic configuration of a battery 1200 according to the first embodiment.

Figure 9:
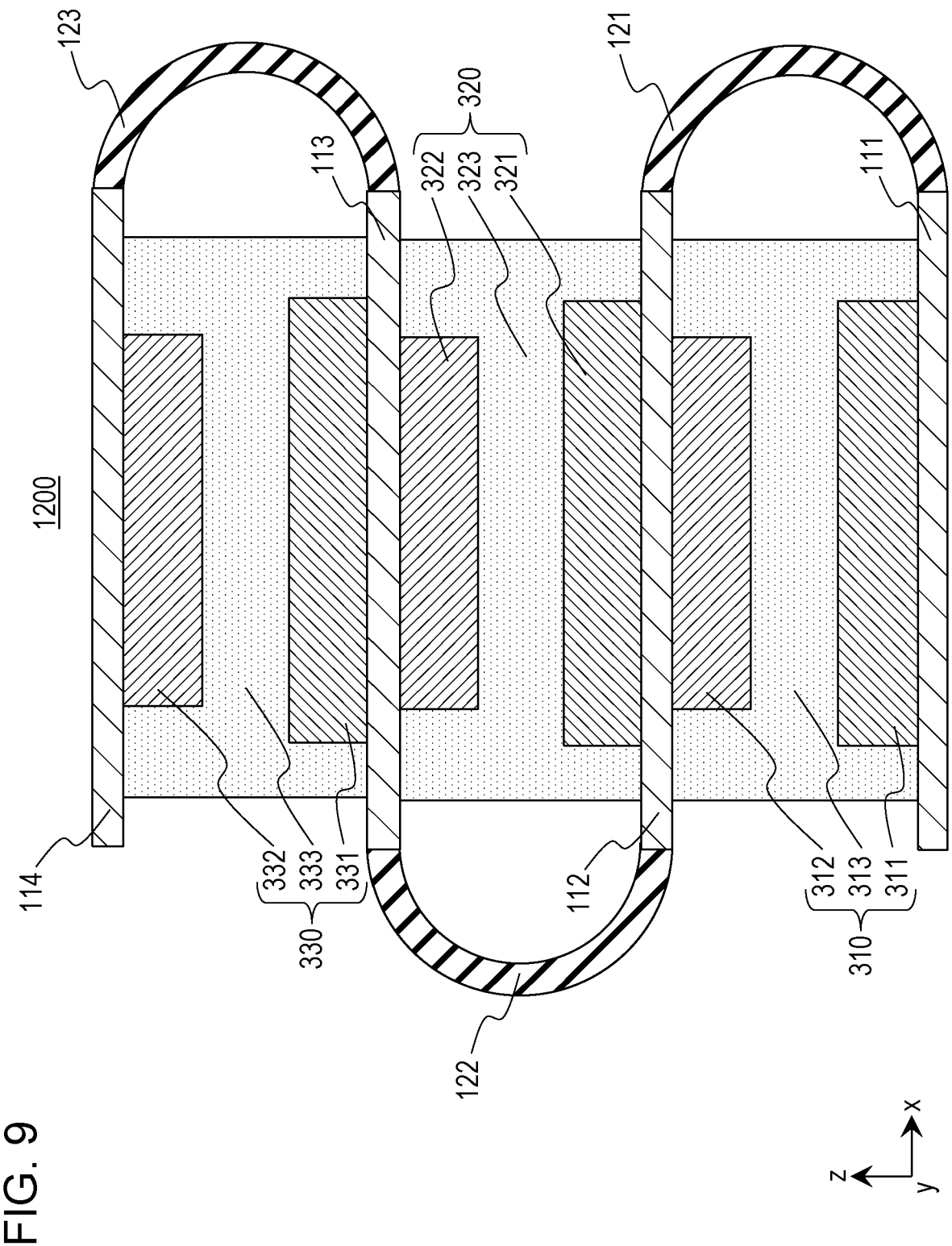
FIG. 9 is an x-z diagram (cross-sectional view) illustrating a schematic configuration of a battery according to the first embodiment.

FIG. 9 is an x-z diagram (cross-sectional view) illustrating a schematic configuration of the battery 1200 according to the first embodiment.

The battery 1200 according to the first embodiment has the following configuration in addition to the configuration of the above-described battery 1100 according to the first embodiment.

That is to say, the battery 1200 according to the first embodiment further includes a third electrode layer 331 and a third counter electrode layer 332.

The third counter electrode layer 332 is a counter electrode of the first electrode layer 311, second electrode layer 321, and third electrode layer 331.

The first current collector 100 includes a third insulating portion 123 and a fourth electroconductive portion 114.

The third electrode layer 331 is disposed in contact with the third electroconductive portion 113.

The third counter electrode layer 332 is disposed in contact with the fourth electroconductive portion 114.

The third insulating portion 123 is a member linking the third electroconductive portion 113 and the fourth electroconductive portion 114.

The first current collector 100 is folded at the third insulating portion 123, whereby the third electrode layer 331 and third counter electrode layer 332 are positioned facing each other.

According to the above configuration, the bonding strength among component members of the battery can be further improved. That is to say, the third electrode layer 331 and third counter electrode layer 332 can be respectively disposed at the third electroconductive portion 113 and fourth electroconductive portion 114 that are linked with each other by the third insulating portion 123. Accordingly, the positional relationship between the third electrode layer 331 disposed on the third electroconductive portion 113 and the third counter electrode layer 332 disposed on the fourth electroconductive portion 114 can be strongly maintained by the third insulating portion 123 (in other words, by the first current collector 100 that is one component). Accordingly, the layers (e.g., the third electrode layer 331 and third counter electrode layer 332) making up the battery can be prevented from exhibiting positional shifting or separation due to shock, vibration, and so forth, when manufacturing the battery or using the battery, for example.

Also, according to the above configuration, a laminated battery can be configured using the first current collector 100. That is to say, a power-generating element (second power-generating element 320) including the second electrode layer 321 and second counter electrode layer 322, and a power-generating element (third power-generating element 330) including the third electrode layer 331 and third counter electrode layer 332, can be laminated by serial connection via the first current collector 100 (i.e., the third electroconductive portion 113 of the first current collector 100). Accordingly, the positional relationship between the components of the second power-generating element 320 and the components of the third power-generating element 330 can be strongly maintained by the second insulating portion 122 and third insulating portion 123 (in other words, by the first current collector 100 that is one component). Accordingly, the power-generating elements (e.g., the second power-generating element 320 and third power-generating element 330) making up the battery can be prevented from exhibiting positional shifting or separation due to shock, vibration, and so forth, when manufacturing the battery or using the battery, for example. Thus, the reliability of the battery can be improved while raising the battery voltage by the serial connection of the second power-generating element 320 and third power-generating element 330.

Also, according to the above configuration, out of the side faces of the battery, the side face where the third insulating portion 123 is situated can be covered by the third insulating portion 123. Accordingly, mutual contact between members that may exist outside of the battery (e.g., another battery, etc.), and the side face of the battery where the third insulating portion 123 is situated, can be prevented by the third insulating portion 123. Thus, short-circuiting among batteries due to contact can be suppressed. Also, partial destruction of the side face of the battery by contact between the battery and members that may exist outside of the battery can be suppressed. Even if a part of battery components (e.g., electrode material included in the third electrode layer 331, counter electrode material included in the third counter electrode layer 332, and so forth) of the battery falls loose, the fallen component can be suppressed by the third insulating portion 123 from moving to another cell portion (e.g., the second power-generating element 320, etc.) within the battery or to the outside of the battery, due to part of the side face of the battery being covered by the third insulating portion 123. Accordingly, short-circuiting within the battery due to fallen components of the battery can be suppressed. This enables the reliability of the battery to be further improved.

Note that the battery 1200 according to the first embodiment may further include a third solid electrolyte layer 333, as illustrated in FIG. 9.

The third solid electrolyte layer 333 is situated between the third electrode layer 331 and third counter electrode layer 332.

According to the above configuration, one solid battery cell (third power-generating element 330) can be configured from the third electrode layer 331, third counter electrode layer 332, and third solid electrolyte layer 333.

Note that the third solid electrolyte layer 333 may be disposed in contact with the third electroconductive portion 113 and fourth electroconductive portion 114 in the battery 1200 according to the first embodiment.

According to the above configuration, the strength of bonding between components of the battery can be further improved. That is to say, the strength of bonding between the third electroconductive portion 113 and fourth electroconductive portion 114 can be improved by the third solid electrolyte layer 333. Accordingly, the third counter electrode layer 332 can be suppressed from peeling loose from the fourth electroconductive portion 114. Further, the third electrode layer 331 can be suppressed from peeling loose from the third electroconductive portion 113. Thus, the layers making up the third power-generating element 330 can be prevented from exhibiting positional shifting or separation due to shock, vibration, and so forth, when manufacturing the battery or using the battery, for example. Thus, reliability of the battery can be improved even further.

Note that the third electrode layer 331 and third counter electrode layer 332 may each be formed in a narrower range than the third electroconductive portion 113 and fourth electroconductive portion 114, as illustrated in FIG. 9.

Also, the third solid electrolyte layer 333 may be disposed over a greater area than that of the third electrode layer 331 and third counter electrode layer 332, as illustrated in FIG. 9. That is to say, the third solid electrolyte layer 333 may be disposed in a form covering the third electrode layer 331 and third counter electrode layer 332. Thus, short-circuiting of the third electrode layer 331 and third counter electrode layer 332 due to direct contact can be prevented.

Also, the third solid electrolyte layer 333 may be disposed over a narrower range than the third electroconductive portion 113 and fourth electroconductive portion 114, as illustrated in FIG. 9. Alternatively, the range of formation of the third solid electrolyte layer 333 may be the same range as that of the third electroconductive portion 113 and fourth electroconductive portion 114.

The third insulating portion 123 is linked to the third electroconductive portion 113 and fourth electroconductive portion 114. That is to say, one end of the third insulating portion 123 is connected (e.g., bonded) to the third electroconductive portion 113 (e.g., an end of the third electroconductive portion 113). Another end of the third insulating portion 123 is further connected (e.g., bonded) to the fourth electroconductive portion 114 (e.g., an end of the fourth electroconductive portion 114).

A connection method of at least one (e.g., both) of the third electroconductive portion 113 and fourth electroconductive portion 114 to the third insulating portion 123 may be different from the connection method of at least one (e.g., both) of the second electroconductive portion 112 and third electroconductive portion 113 to the second insulating portion 122, or may be the same.

Note that the end of the third electroconductive portion 113 (i.e., in a case where the third electroconductive portion 113 is rectangular, one side of the rectangle) to which the third insulating portion 123 is connected may be the same as the end of the third electroconductive portion 113 to which the second insulating portion 122 is connected, or may be different. That is to say, the end of the third electroconductive portion 113 to which the third insulating portion 123 is connected may be an end situated across from the end of the third electroconductive portion 113 to which the first insulating portion 121 is connected, as illustrated in FIGS. 8 and 9. Alternatively, the end of the third electroconductive portion 113 to which the third insulating portion 123 is connected may be an end adjacent to the end of the third electroconductive portion 113 to which the second insulating portion 122 is connected.

Note that the first electrode layer 311, second electrode layer 321, and third electrode layer 331 may be negative active material layers. The electrode material here is a negative active material. The first electroconductive portion 111 is a negative current collector. The first counter electrode layer 312, second counter electrode layer 322, and third counter electrode layer 332 are positive active material layers. The counter electrode material is a positive active material. The second electroconductive portion 112 and third electroconductive portion 113 are bipolar current collectors. The fourth electroconductive portion 114 is a positive current collector.

Alternatively, the first electrode layer 311, second electrode layer 321, and third electrode layer 331 may be positive active material layers. The electrode material here is a positive active material. The first electroconductive portion 111 is a positive current collector. The first counter electrode layer 312, second counter electrode layer 322, and third counter electrode layer 332 are negative active material layers. The counter electrode material is a negative active material. The second electroconductive portion 112 and third electroconductive portion 113 are bipolar current collectors. The fourth electroconductive portion 114 is a negative current collector.

Note that the third electroconductive portion 113 and fourth electroconductive portion 114 are members having electroconductivity. The configurations of the first electroconductive portion 111, second electroconductive portion 112, third electroconductive portion 113, and fourth electroconductive portion 114 (e.g., thicknesses, area, shape, materials included, etc.) may be the same as each other, or may be different.

The second insulating portion 122 and third insulating portion 123 are members formed of insulating material (i.e., material having no electroconductivity or sufficiently low electroconductivity). Configurations of the first insulating portion 121, second insulating portion 122, and third insulating portion 123 (e.g., thicknesses, area, shape, materials included, etc.) may be the same as each other, or may be different.

The second power-generating element 320 and third power-generating element 330 are power-generating units having charging and discharging properties (e.g., secondary batteries), for example. The second power-generating element 320 and third power-generating element 330 may be a battery cell, or a fully-solid battery, for example. Configurations of the first power-generating element 310, second power-generating element 320, and third power-generating element 330 (e.g., thicknesses of the layers, area, shape, materials included, etc.) may be the same as each other, or may be different.

The second electrode layer 321 and third electrode layer 331 are layers including electrode material (e.g., active material). Configurations of the first electrode layer 311, second electrode layer 321, and third electrode layer 331 (e.g., thicknesses, area, shape, materials included, etc.) may be the same as each other, or may be different.

The second counter electrode layer 322 third counter electrode layer 332 are layers including counter electrode material (e.g., active material). Counter electrode material is material making up counter electrodes to the electrode material. Configurations of the first counter electrode layer 312, second counter electrode layer 322, and third counter electrode layer 332 (e.g., thicknesses of the layers, area, shape, materials included, etc.) may be the same as each other, or may be different.

The second solid electrolyte layer 323 and third solid electrolyte layer 333 are solid electrolyte layers including a solid electrolyte. Configurations of the first solid electrolyte layer 313, second solid electrolyte layer 323, and third solid electrolyte layer 333 (e.g., thicknesses of the layers, area, shape, materials included, etc.) may be the same as each other, or may be different.

Figure 10:
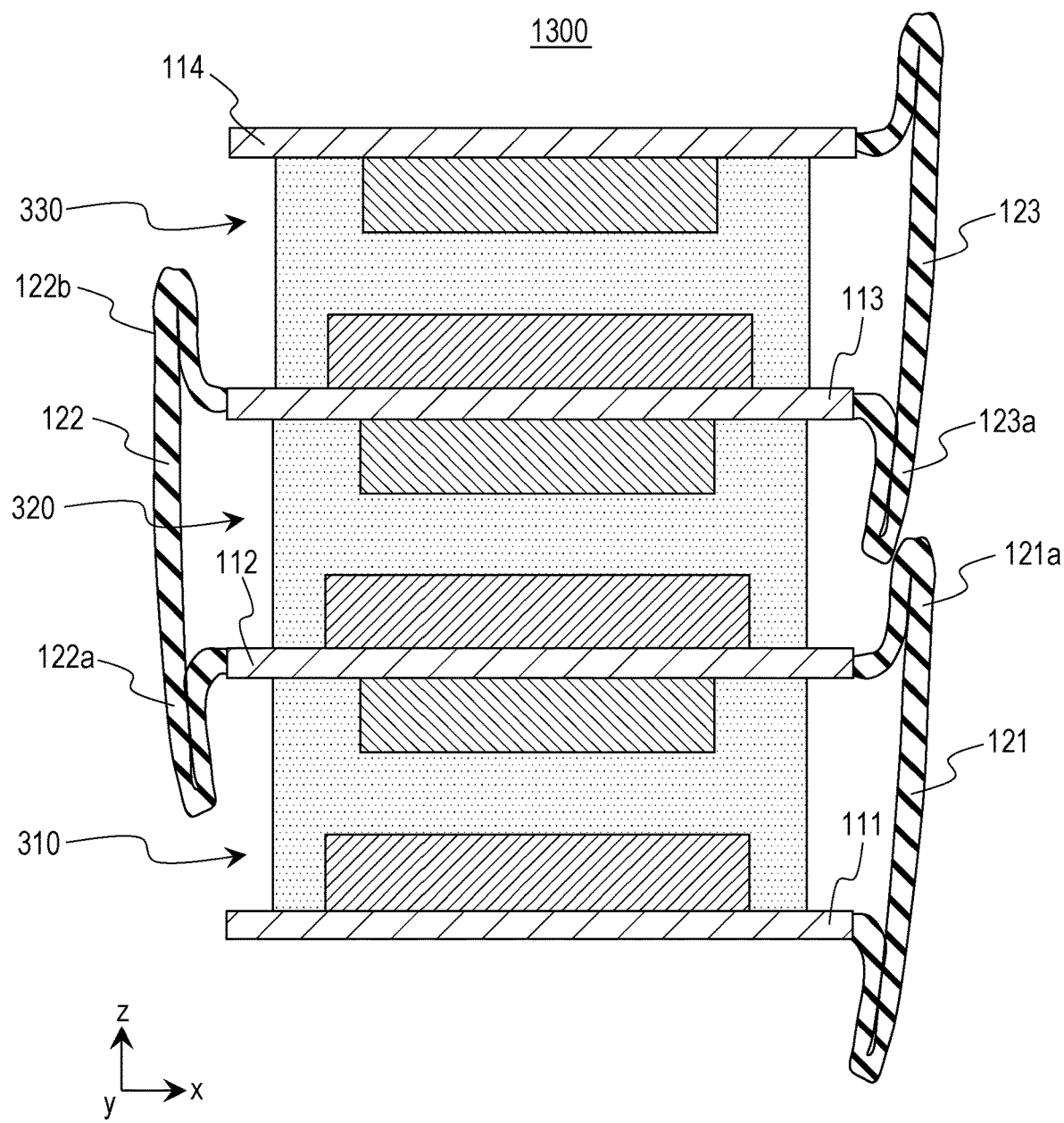
FIG. 10 is an x-z diagram (cross-sectional view) illustrating a schematic configuration of a battery according to the first embodiment.

FIG. 10 is an x-z diagram (cross-sectional view) illustrating a schematic configuration of a battery 1300 according to the first embodiment.

Figure 11:
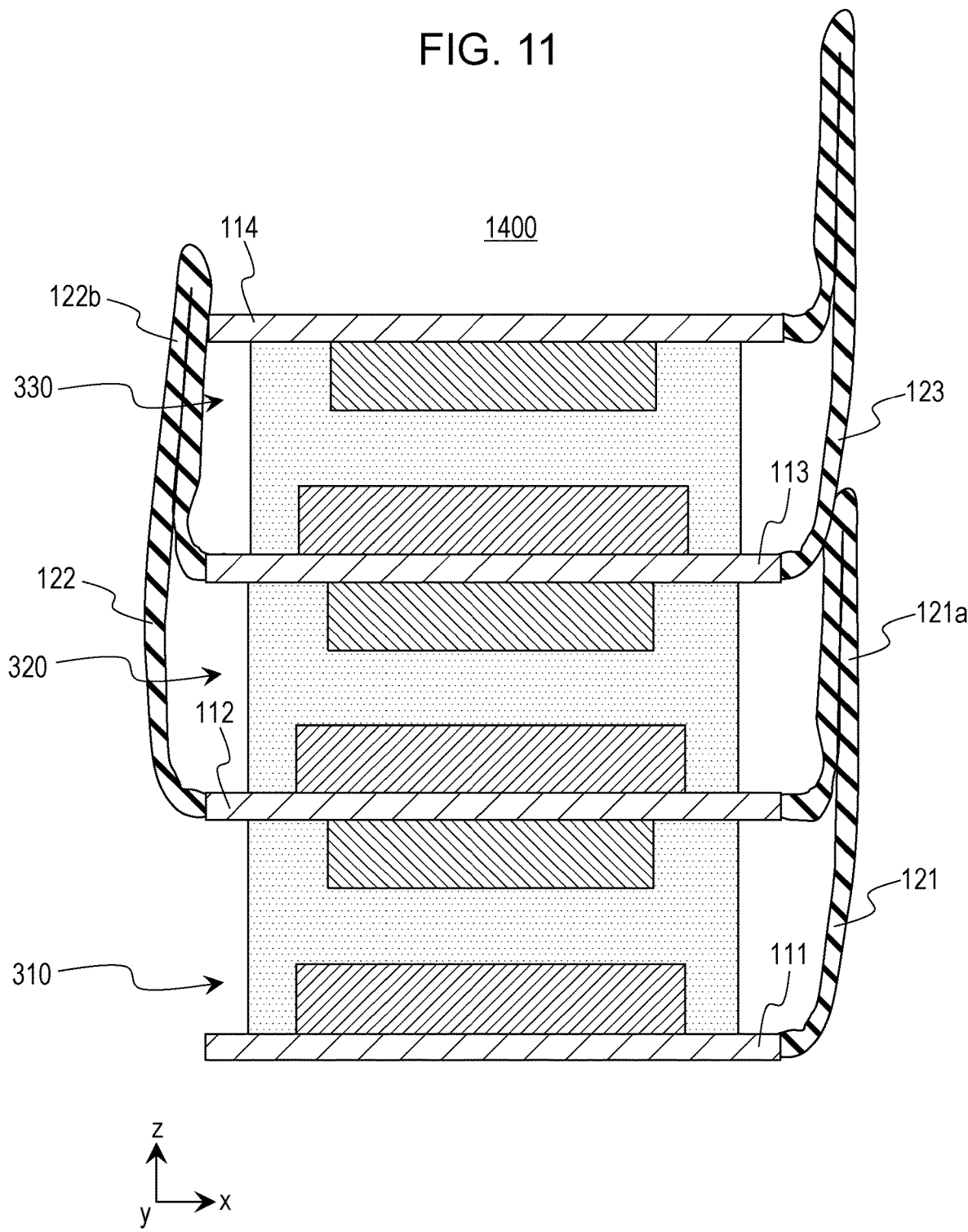
FIG. 11 is an x-z diagram (cross-sectional view) illustrating a schematic configuration of a battery according to the first embodiment.

FIG. 11 is an x-z diagram (cross-sectional view) illustrating a schematic configuration of a battery 1400 according to the first embodiment.

Figure 12:
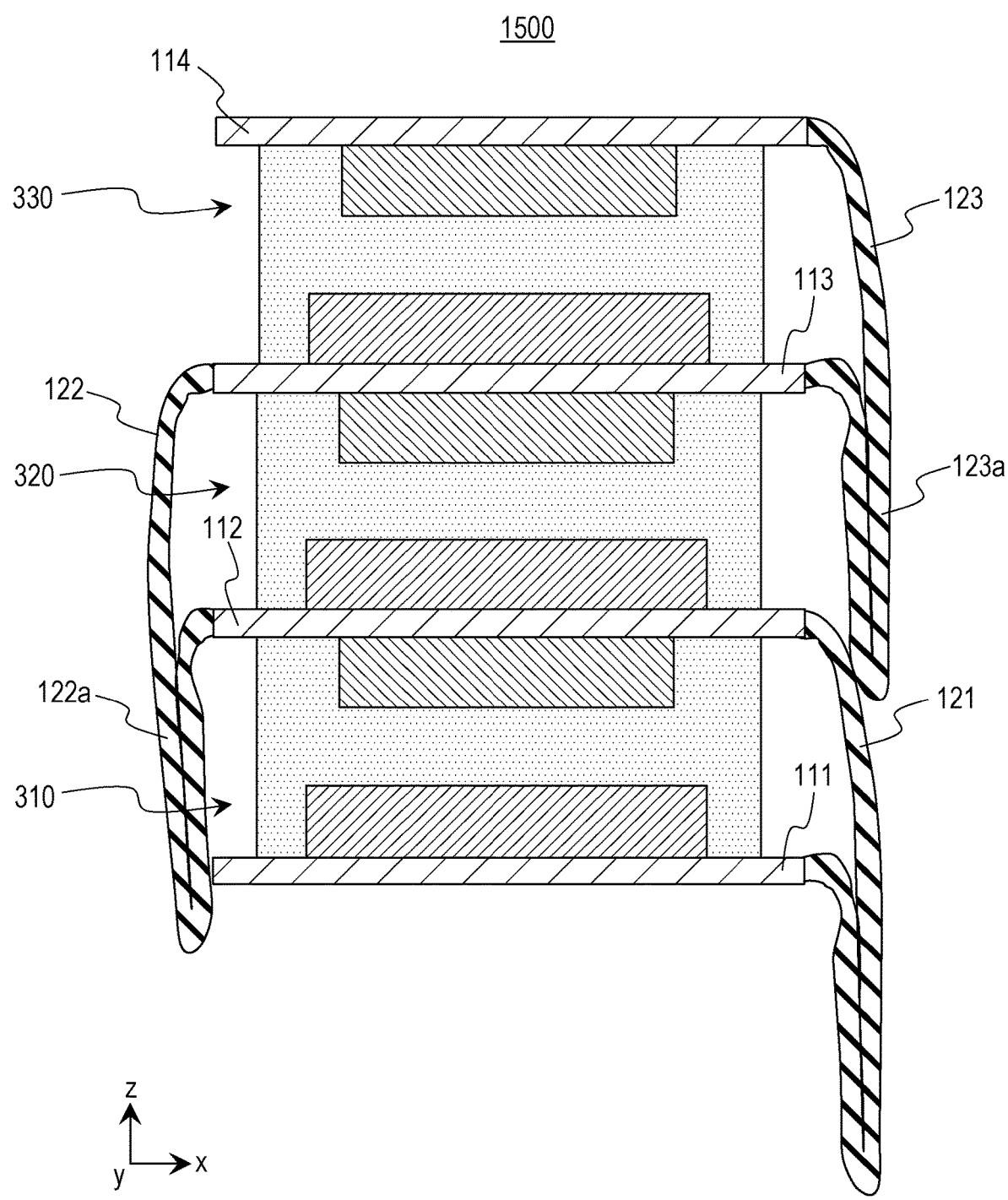
FIG. 12 is an x-z diagram (cross-sectional view) illustrating a schematic configuration of a battery according to the first embodiment.

FIG. 12 is an x-z diagram (cross-sectional view) illustrating a schematic configuration of a battery 1500 according to the first embodiment.

The first insulating portion 121 may have a first overhang portion 121a.

The first overhang portion 121a is a portion that overhangs from the second electroconductive portion 112 toward the side where the second electrode layer 321 is disposed (part of the first insulating portion 121), as illustrated in FIGS. 10 and 11.

According to the above configuration, the side faces of component members situated toward the side where the second electrode layer 321 is disposed from the second electroconductive portion 112 (e.g., second electrode layer 321, second counter electrode layer 322, second solid electrolyte layer 323, etc.) can be covered by the first overhang portion 121a of the first insulating portion 121, while covering the side faces of component members interposed between the first electroconductive portion 111 and second electroconductive portion 112 (e.g., first electrode layer 311, first counter electrode layer 312, first solid electrolyte layer 313, etc.) by the first insulating portion 121. Accordingly, mutual contact between members that may exist outside of the battery (e.g., another battery, etc.), and the side faces of component members interposed between the first electroconductive portion 111 and second electroconductive portion 112, and component members situated toward the side where the second electrode layer 321 is disposed from the second electroconductive portion 112, can be prevented by the first insulating portion 121.

The second insulating portion 122 may have at least one of a second overhang portion 122a and a second overhang portion 122b.

The second overhang portion 122a is a portion that overhangs from the second electroconductive portion 112 toward the side where the first counter electrode 312 is disposed (part of the second insulating portion 122), as illustrated in FIGS. 10 and 12.

According to the above configuration, the side faces of component members situated toward the side where the first counter electrode layer 312 is disposed from the second electroconductive portion 112 (e.g., first electrode layer 311, first counter electrode layer 312, first solid electrolyte layer 313, etc.) can be covered by the second overhang portion 122a of the second insulating portion 122, while covering the side faces of component members interposed between the second electroconductive portion 112 and third electroconductive portion 113 (e.g., second electrode layer 321, second counter electrode layer 322, second solid electrolyte layer 323, etc.) by the second insulating portion 122. Accordingly, mutual contact between members that may exist outside of the battery (e.g., another battery, etc.), and the side faces of component members interposed between the second electroconductive portion 112 and third electroconductive portion 113, and component members situated toward the side where the first counter electrode layer 312 is disposed from the second electroconductive portion 112, can be prevented by the second insulating portion 122.

The second overhang portion 122b is a portion that overhangs from the third electroconductive portion 113 toward the side where the third electrode layer 331 is disposed (part of the second insulating portion 122), as illustrated in FIGS. 10 and 11.

According to the above configuration, the side faces of component members situated toward the side where the third electrode layer 331 is disposed from the third electroconductive portion 113 (e.g., third electrode layer 331, third counter electrode layer 332, third solid electrolyte layer 333, etc.) can be covered by the second overhang portion 122b of the second insulating portion 122, while covering the side faces of component members interposed between the second electroconductive portion 112 and third electroconductive portion 113 (e.g., second electrode layer 321, second counter electrode layer 322, second solid electrolyte layer 323, etc.) by the second insulating portion 122. Accordingly, mutual contact between members that may exist outside of the battery (e.g., another battery, etc.), and the side faces of component members situated toward the side where the third electrode layer 331 is disposed from the third electroconductive portion 113, can be prevented by the second insulating portion 122.

The third insulating portion 123 may have a third overhang portion 123a.

The third overhang portion 123a is a portion that overhangs from the third electroconductive portion 113 toward the side where the second counter electrode layer 322 is disposed (part of the third insulating portion 123), as illustrated in FIGS. 10 and 12.

According to the above configuration, the side faces of component members situated toward the side where the second counter electrode layer 322 is disposed from the third electroconductive portion 113 (e.g., second electrode layer 321, second counter electrode layer 322, second solid electrolyte layer 323, etc.) can be covered by the third overhang portion 123a of the third insulating portion 123, while covering the side faces of component members interposed between the third electroconductive portion 113 and fourth electroconductive portion 114 (e.g., third electrode layer 331, third counter electrode layer 332, third solid electrolyte layer 333, etc.) by the third insulating portion 123. Accordingly, mutual contact between members that may exist outside of the battery (e.g., another battery, etc.), and the side faces of component members interposed between the third electroconductive portion 113 and fourth electroconductive portion 114, and component members situated toward the side where the second counter electrode layer 322 is disposed from the third electroconductive portion 113, can be prevented by the third insulating portion 123.

The first insulating portion 121 and third insulating portion 123 may come in contact with each other, as illustrated in FIGS. 10 through 12.

According to the above configuration, the side faces of component members interposed between the second electroconductive portion 112 and third electroconductive portion 113 (e.g., second electrode layer 321, second counter electrode layer 322, second solid electrolyte layer 323, etc.) can be covered by at least one of the first insulating portion 121 and third insulating portion 123, while covering the side faces of component members interposed between the first electroconductive portion 111 and second electroconductive portion 112 (e.g., first electrode layer 311, first counter electrode layer 312, first solid electrolyte layer 313, etc.) by the first insulating portion 121, and also while covering the side faces of component members interposed between the third electroconductive portion 113 and fourth electroconductive portion 114 (e.g., third electrode layer 331, third counter electrode layer 332, third solid electrolyte layer 333, etc.) by the third insulating portion 123. In other words, of the side faces of component members interposed between the second electroconductive portion 112 and third electroconductive portion 113, side faces different from the side faces covered by the second insulating portion 122, can be covered by at least one of the first insulating portion 121 and third insulating portion 123. Accordingly, mutual contact between members that may exist outside of the battery (e.g., another battery, etc.), and the side faces of component members interposed between the first electroconductive portion 111 and the fourth electroconductive portion 114 can be prevented by the first insulating portion 121 and third insulating portion 123. Even if a part of components (e.g., electrode material included in the second electrode layer 321, counter electrode material included in the second counter electrode layer 322, and so forth) of the battery falls loose, the fallen component can be suppressed by the second electroconductive portion 112 and third insulating portion 123 from moving to another cell portion (e.g., first power-generating element 310, third power-generating element 330, etc.) within the battery or to the outside of the battery, due to the first insulating portion 121 and third insulating portion 123. Accordingly, short-circuiting within the battery due to fallen components of the battery can be suppressed. This enables the reliability of the battery to be further improved.

Note that the first insulating portion 121 and third insulating portion 123 may come into contact with each other, by the first overhang portion 121a and third overhang portion 123a coming into contact, as illustrated in FIG. 10.

Alternatively, the first insulating portion 121 and third insulating portion 123 may come into contact with each other, by the first overhang portion 121a and third insulating portion 123 coming into contact, as illustrated in FIG. 11.

Alternatively, the first insulating portion 121 and third insulating portion 123 may come into contact with each other, first insulating portion 121 and third overhang portion 123a coming into contact, as illustrated in FIG. 12.

Note that in the present disclosure, the expression, "a configuration where a predetermined layer and another predetermined layer are positioned facing each other" means that "part of the principal face (or the entire region of the principal face) of the predetermined layer is situated overlapping "part of the principal face (or the entire region of the principal face) of the other predetermined layer, as viewed from the laminating direction of the layers", for example.

Also, in the present disclosure, the expression, "a configuration where a predetermined layer and another predetermined layer are positioned facing each other" also encompasses "a configuration where a separate member (e.g., a layer made of a separate material) is disposed between a principal face of the predetermined layer and a principal face of the other predetermined layer that face each other".

In the present disclosure, at least one of the first power-generating element 310, second power-generating element 320, and third power-generating element 330 may be a laminated battery where multiple battery cells have been laminated.

For example, the first power-generating element 310 may be a laminated battery of a power-generating element 310a and a power-generating element 310b, which will be described later. Also, the second power-generating element 320 may be a laminated battery of a power-generating element 320a and a power-generating element 320b. Further, the third power-generating element 330 may be a laminated battery of a power-generating element 330a and a power-generating element 330b.

A manufacturing method of the battery according to the first embodiment will be described later as a third embodiment.

Second Embodiment

A second embodiment will be described below. Description that is redundant with that of the above-described first embodiment will be omitted as appropriate.

Figure 13:
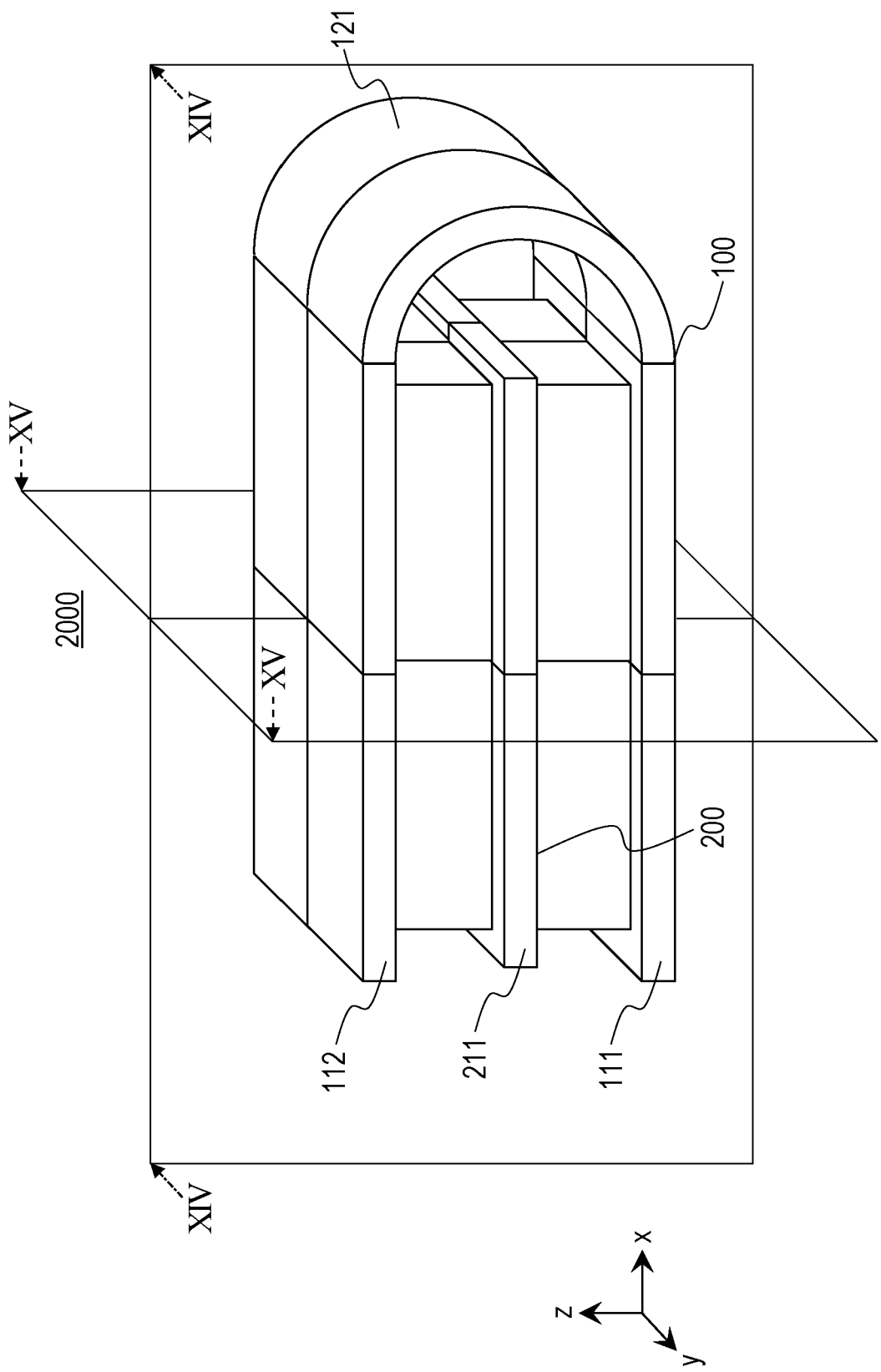
FIG. 13 is a perspective view illustrating a schematic configuration of a battery according to a second embodiment.

FIG. 13 is a perspective view illustrating a schematic configuration of a battery 2000 according to a second embodiment.

Figure 14:
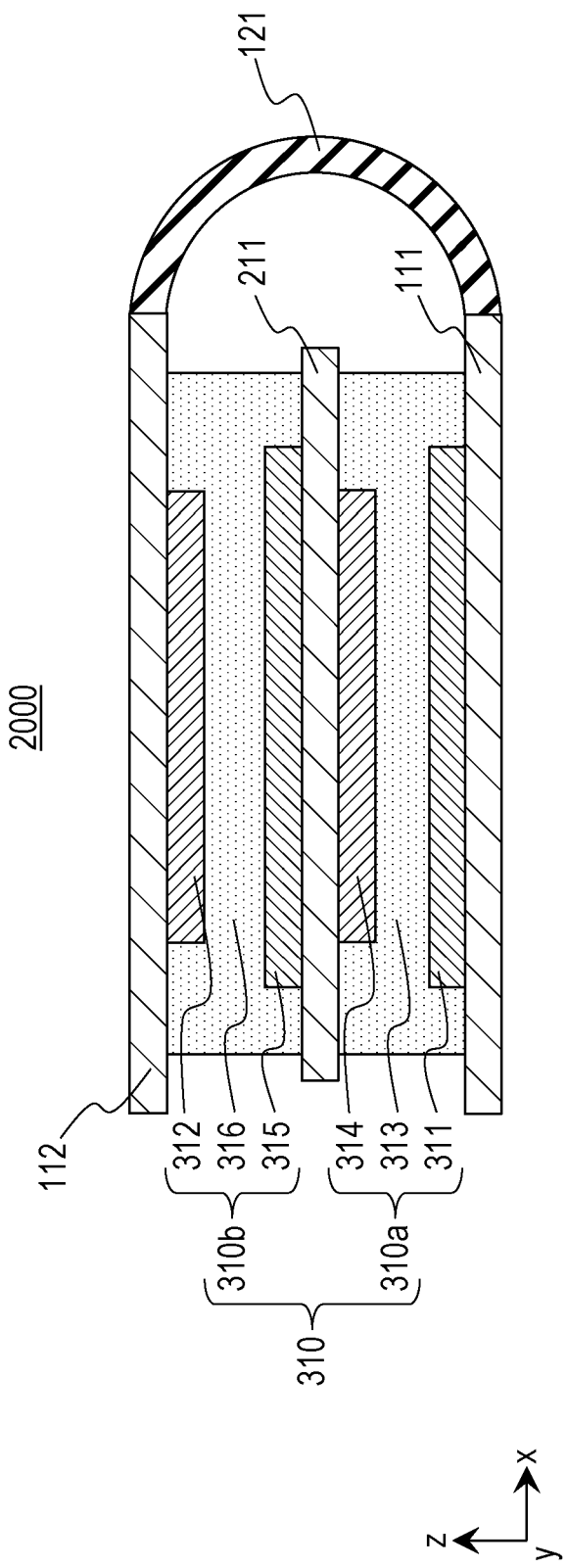
FIG. 14 is an x-z diagram (cross-sectional view taken along XIV-XIV in FIG. 13) illustrating a schematic configuration of the battery according to the second embodiment.

FIG. 14 is an x-z diagram (cross-sectional view taken along XIV-XIV in FIG. 13) illustrating a schematic configuration of the battery 2000 according to the second embodiment.

Figure 15:
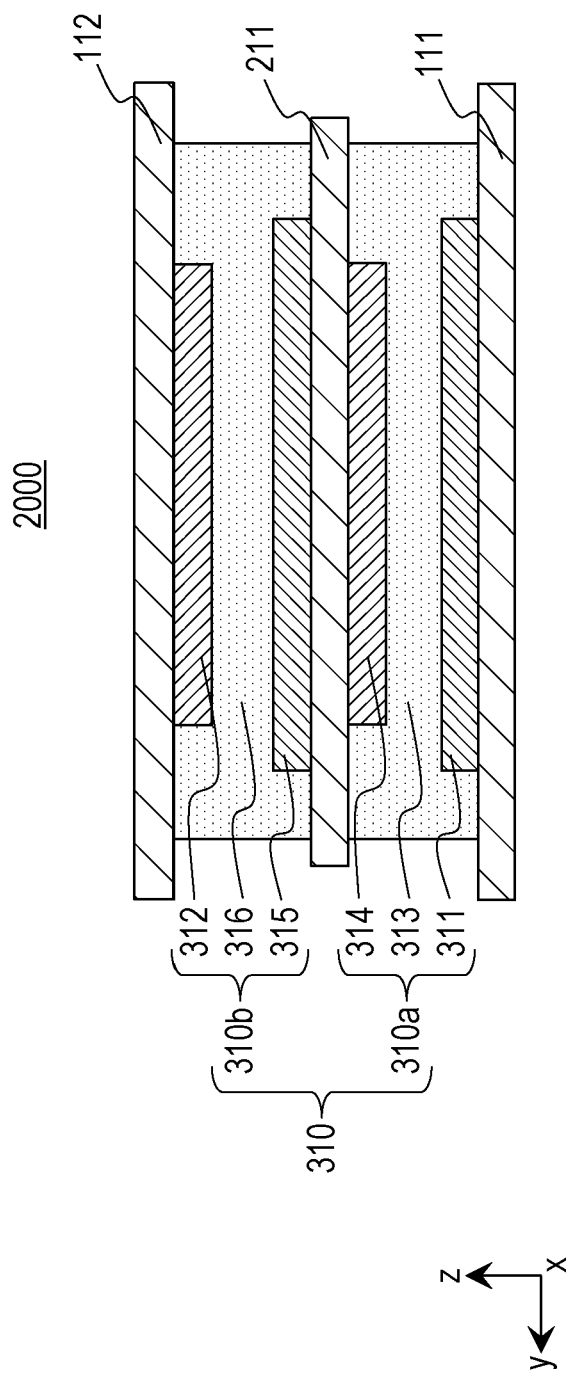
FIG. 15 is a y-z diagram (cross-sectional view taken along XV-XV in FIG. 13) illustrating a schematic configuration of the battery according to the second embodiment.

FIG. 15 is a y-z diagram (cross-sectional view taken along XV-XV in FIG. 13) illustrating a schematic configuration of the battery 2000 according to the second embodiment.

The battery 2000 according to the second embodiment further includes the following configuration, in addition to the configuration of the above-described battery 1000 according to the first embodiment.

That is to say, the battery 2000 according to the second embodiment includes a second current collector 200, a fourth electrode layer 315, and a fourth counter electrode layer 314.

The fourth counter electrode layer 314 is a counter electrode of the first electrode layer 311 and fourth electrode layer 315.

The second current collector 200 has a fifth electroconductive portion 211.

The fifth electroconductive portion 211 is disposed between the first electroconductive portion 111 and second electroconductive portion 112.

The fourth electrode layer 315 is disposed at a position facing the first counter electrode layer 312, in contact with the fifth electroconductive portion 211.

The fourth counter electrode layer 314 is disposed at a position facing the first electrode layer 311, in contact with the fifth electroconductive portion 211.

Also, according to the above configuration, a laminated battery can be configured using the first current collector 100 and second current collector 200. That is to say, a power-generating element (power-generating element 310a) including the first electrode layer 311 and fourth counter electrode layer 314, and a power-generating element (power-generating element 310b) including the fourth electrode layer 315 and first counter electrode layer 312, can be laminated by serial connection via the second current collector 200 (i.e., the fifth electroconductive portion 211 of the second current collector 200). At this time, the positional relationship between the components of the power-generating element 310a and power-generating element 310b can be strongly maintained by the first insulating portion 121 (in other words, by the first current collector 100 that is one component). Accordingly, the power-generating elements (e.g., the power-generating element 310*a* and power-generating element 310*b*) making up the battery can be prevented from exhibiting positional shifting or separation due to shock, vibration, and so forth, when manufacturing the battery or using the battery, for example. Thus, the reliability of the battery can be improved while raising the battery voltage by the serial connection of the power-generating element 310*a* and power-generating element 310*b*.

Note that the battery 2000 according to the second embodiment may further include a first solid electrolyte layer 313, as illustrated in FIGS. 14 and 15.

The first solid electrolyte layer 313 is disposed between the first electrode layer 311 and fourth counter electrode layer 314.

According to the above configuration, one solid battery cell (power-generating element 310*a*) can be configured from the first electrode layer 311, fourth counter electrode layer 314, and first solid electrolyte layer 313.

The first solid electrolyte layer 313 may be disposed in the battery 2000 according to the second embodiment in contact with the first electroconductive portion 111 and fifth electroconductive portion 211.

According to the above configuration, the strength of bonding between components of the battery can be further improved. That is to say, the strength of bonding between first electroconductive portion 111 and fifth electroconductive portion 211 can be improved by the first solid electrolyte layer 313. Accordingly, the fourth counter electrode layer 314 can be suppressed from peeling loose from the fifth electroconductive portion 211. Further, the first electrode layer 311 can be suppressed from peeling loose from the first electroconductive portion 111. Thus, the layers making up the power-generating element 310*a* can be prevented from exhibiting positional shifting or separation due to shock, vibration, and so forth, when manufacturing the battery or using the battery, for example. Thus, reliability of the battery can be improved even further.

Note that the first electrode layer 311 and fourth counter electrode layer 314 may be formed in a narrower range than the first electroconductive portion 111 and fifth electroconductive portion 211, as illustrated in FIGS. 14 and 15.

Also, the first solid electrolyte layer 313 may be disposed over a greater area than that of the first electrode layer 311 and fourth counter electrode layer 314. That is to say, the first solid electrolyte layer 313 may be disposed in a form covering the first electrode layer 311 and fourth counter electrode layer 314, as illustrated in FIGS. 14 and 15. Thus, short-circuiting of the first electrode layer 311 and fourth counter electrode layer 314 due to direct contact can be prevented.

Also, the first solid electrolyte layer 313 may be disposed over a narrower range than the first electroconductive portion 111 and fifth electroconductive portion 211, as illustrated in FIGS. 14 and 15. Alternatively, the range of formation of the first solid electrolyte layer 313 may be the same range as that of the first electroconductive portion 111 and fifth electroconductive portion 211.

The battery 2000 according to the second embodiment may further be provided with a fourth solid electrolyte layer 316, as illustrated in FIGS. 14 and 15.

The fourth solid electrolyte layer 316 is disposed between the fourth electrode layer 315 and first counter electrode layer 312.

According to the above configuration, one solid battery cell (power-generating element 310*b*) can be configured from the fourth electrode layer 315, first counter electrode layer 312, and fourth solid electrolyte layer 316.

The fourth solid electrolyte layer 316 may be disposed in the battery 2000 according to the second embodiment in contact with the second electroconductive portion 112 and fifth electroconductive portion 211.

According to the above configuration, the strength of bonding between components of the battery can be further improved. That is to say, the strength of bonding between second electroconductive portion 112 and fifth electroconductive portion 211 can be improved by the fourth solid electrolyte layer 316. Accordingly, the first counter electrode layer 312 can be suppressed from peeling loose from the second electroconductive portion 112. Further, the fourth electrode layer 315 can be suppressed from peeling loose from the fifth electroconductive portion 211. Thus, the layers making up the power-generating element 310*b* can be prevented from exhibiting positional shifting or separation due to shock, vibration, and so forth, when manufacturing the battery or using the battery, for example. Thus, reliability of the battery can be improved even further.

Note that the fourth electrode layer 315 and first counter electrode layer 312 may be formed in a narrower range than the second electroconductive portion 112 and fifth electroconductive portion 211, as illustrated in FIGS. 14 and 15.

Also, the fourth solid electrolyte layer 316 may be disposed over a greater area than that of the fourth electrode layer 315 and first counter electrode layer 312. That is to say, the fourth solid electrolyte layer 316 may be disposed in a form covering the fourth electrode layer 315 and first counter electrode layer 312, as illustrated in FIGS. 14 and 15. Thus, short-circuiting of the fourth electrode layer 315 and first counter electrode layer 312 due to direct contact can be prevented.

Also, the fourth solid electrolyte layer 316 may be disposed over a narrower range than the second electroconductive portion 112 and fifth electroconductive portion 211, as illustrated in FIGS. 14 and 15. Alternatively, the range of formation of the fourth solid electrolyte layer 316 may be the same range as that of the second electroconductive portion 112 and fifth electroconductive portion 211.

Note that the first electrode layer 311 and fourth electrode layer 315 may be negative active material layers. The electrode material here is a negative active material. The first electroconductive portion 111 is a negative current collector. The first counter electrode layer 312 and fourth counter electrode layer 314 are positive active material layers. The counter electrode material is a positive active material. The fifth electroconductive portion 211 is a bipolar current collector. The second electroconductive portion 112 is a positive current collector.

Alternatively, the first electrode layer 311 and fourth electrode layer 315 may be positive active material layers. The electrode material here is a positive active material. The first electroconductive portion 111 is a positive current collector. The first counter electrode layer 312 and fourth counter electrode layer 314 are negative active material layers. The counter electrode material is a negative active material. The fifth electroconductive portion 211 is a bipolar current collector. The second electroconductive portion 112 is a negative current collector.

Figure 16:
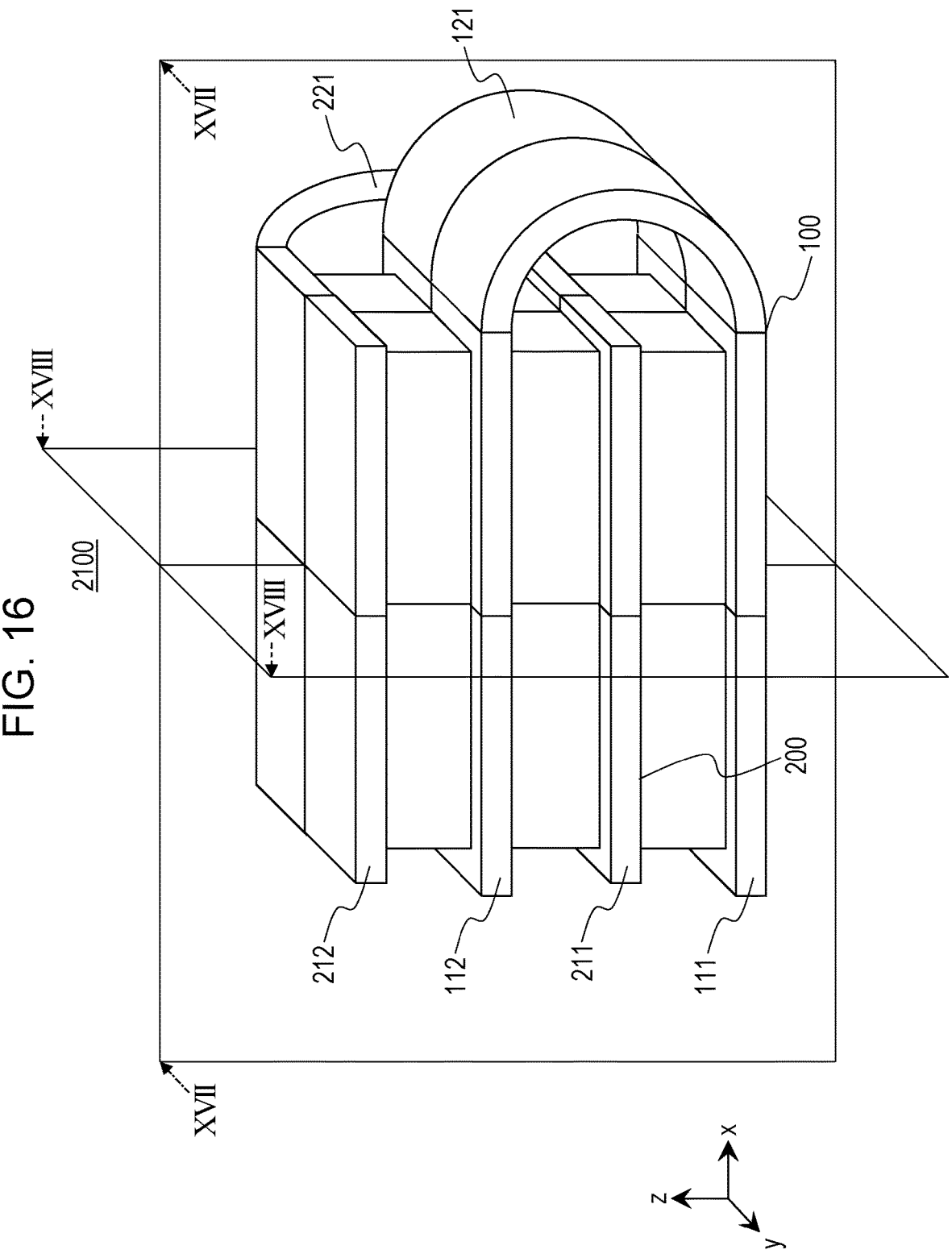
FIG. 16 is a perspective view illustrating a schematic configuration of a battery according to the second embodiment.

FIG. 16 is a perspective view illustrating a schematic configuration of a battery 2100 according to the second embodiment.

Figure 17:
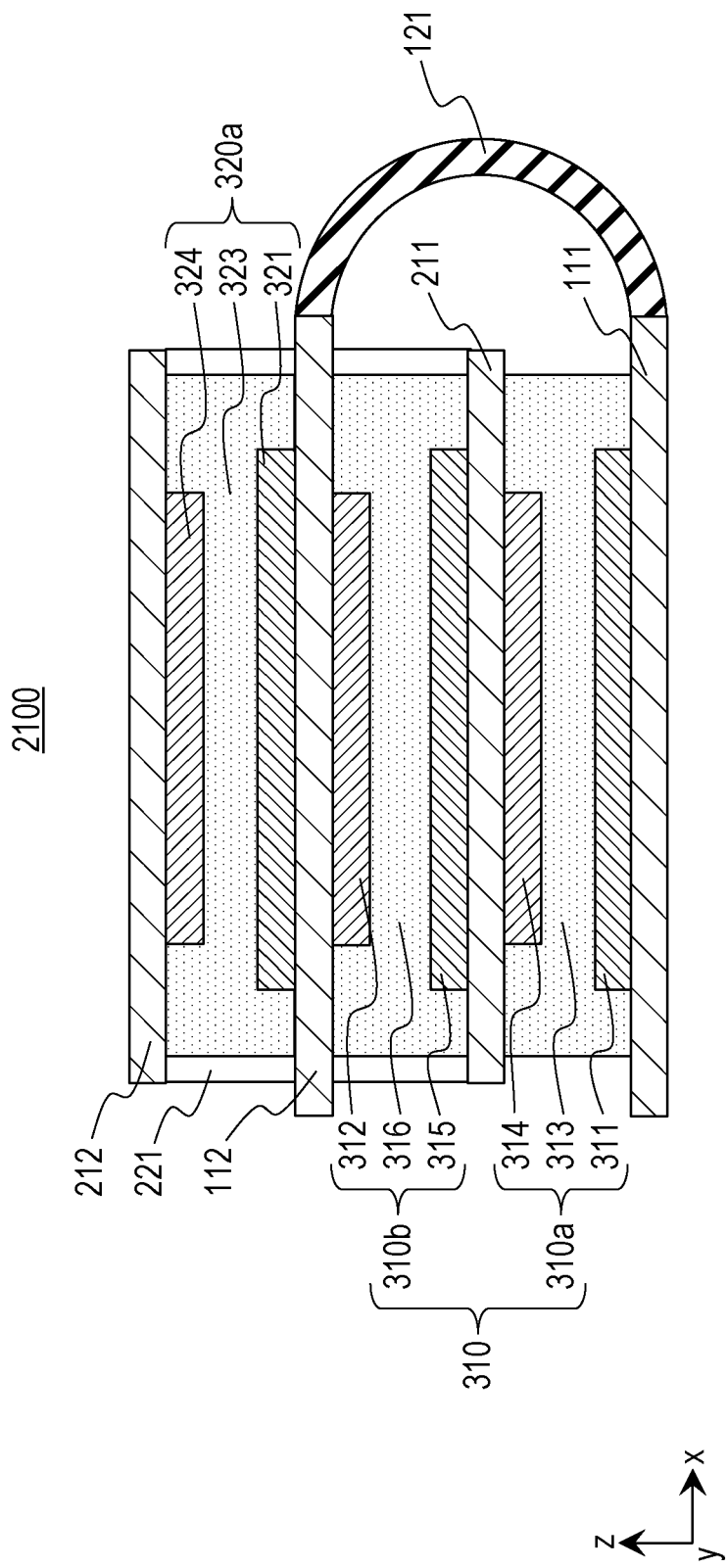
FIG. 17 is an x-z diagram (cross-sectional view taken along XVII-XIVII in FIG. 16) illustrating a schematic configuration of the battery according to the second embodiment.

FIG. 17 is an x-z diagram (cross-sectional view taken along XVII-XIVII in FIG. 16) illustrating a schematic configuration of the battery 2100 according to the second embodiment.

Figure 18:
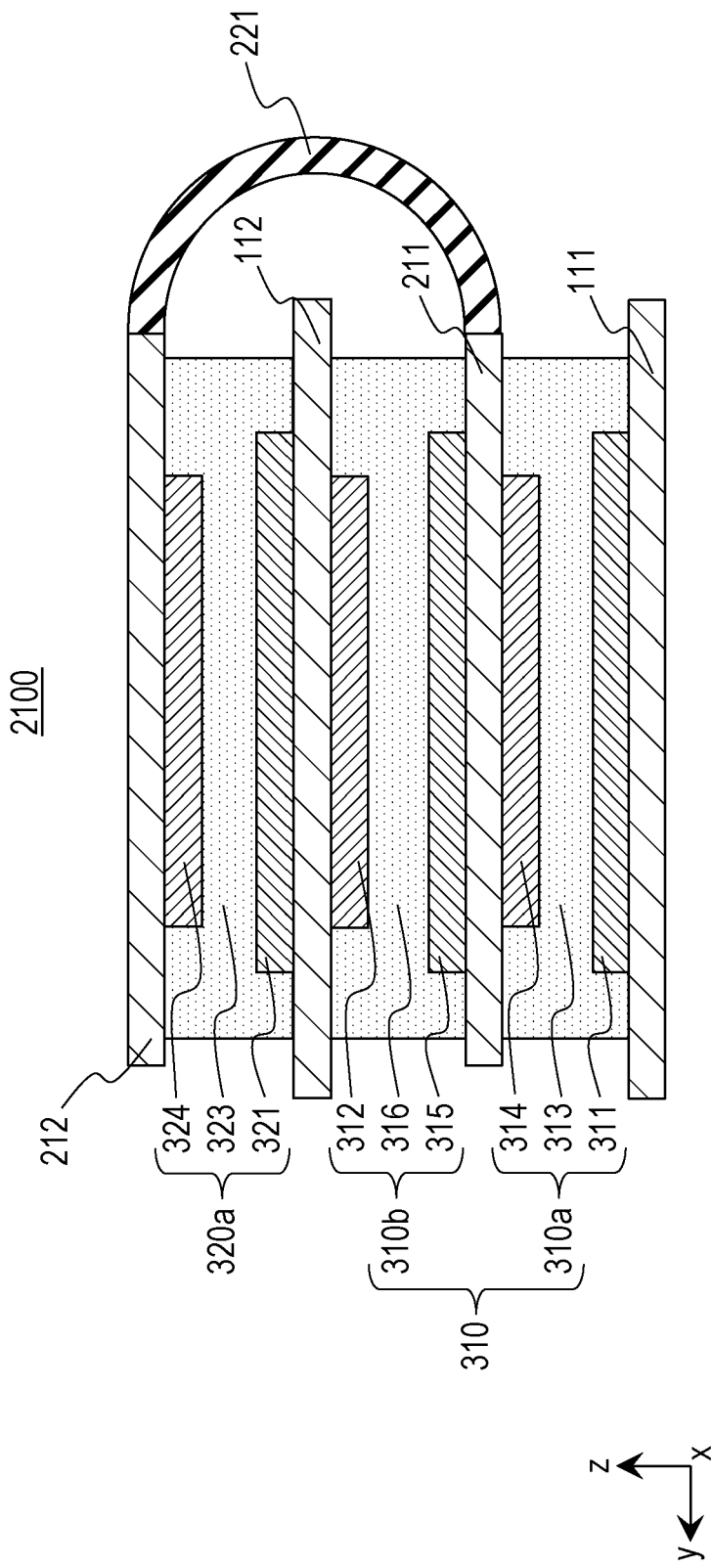
FIG. 18 is a y-z diagram (cross-sectional view taken along XVIII-XVIII in FIG. 16) illustrating a schematic configuration of the battery according to the second embodiment.

FIG. 18 is a y-z diagram (cross-sectional view taken along XVIII-XVIII in FIG. 16) illustrating a schematic configuration of the battery 2100 according to the second embodiment.

The battery 2100 according to the second embodiment further includes the following configuration, in addition to the configuration of the above-described battery 2000 according to the second embodiment.

That is to say, the battery 2100 according to the second embodiment includes a second electrode layer 321 and a fifth counter electrode layer 324.

The fifth counter electrode layer 324 is a counter electrode of the first electrode layer 311, second electrode layer 321, and fourth electrode layer 315.

The second current collector 200 has a sixth electroconductive portion 212 and a fourth insulating portion 221.

The second electrode layer 321 is disposed in contact with the second electroconductive portion 112.

The fifth counter electrode layer 324 is disposed in contact with the sixth electroconductive portion 212.

The fourth insulating portion 221 is a member linking the fifth electroconductive portion 211 and sixth electroconductive portion 212.

The second current collector 200 is folded at the fourth insulating portion 221, whereby the second electrode layer 321 and fifth counter electrode layer 324 are positioned facing each other.

According to the above configuration, the strength of bonding between components of the battery can be further improved. That is to say, the fourth electrode layer 315 and fifth counter electrode layer 324 can each be respectively disposed to the fifth electroconductive portion 211 and sixth electroconductive portion 212 linked to each other by the fourth insulating portion 221. Thus, the positional relationship between the fourth electrode layer 315 disposed on the fifth electroconductive portion 211 and the fifth counter electrode layer 324 disposed on the sixth electroconductive portion 212 can be strongly maintained by the fourth insulating portion 221 (in other words, by the second current collector 200 that is one component). Accordingly, the layers (e.g., the fourth electrode layer 315 and fifth counter electrode layer 324) making up the battery can be prevented from exhibiting positional shifting or separation due to shock, vibration, and so forth, when manufacturing the battery or using the battery, for example.

Also, according to the above configuration, a laminated battery can be configured using the first current collector 100 and second current collector 200. That is to say, a power-generating element (power-generating element 310b) including the fourth electrode layer 315 and first counter electrode layer 312, and a power-generating element (power-generating element 320a) including the second electrode layer 321 and fifth counter electrode layer 324, can be laminated by serial connection via the first current collector 100 (i.e., the second electroconductive portion 112 of the first current collector 100). Accordingly, the positional relationship between the components of the power-generating element 310b and power-generating element 320a can be strongly maintained by the fourth insulating portion 221 (in other words, by the second current collector 200 that is one component). Accordingly, the power-generating elements (e.g., the power-generating element 310b and power-generating element 320a) making up the battery can be prevented from exhibiting positional shifting or separation due to shock, vibration, and so forth, when manufacturing the battery or using the battery, for example. Thus, the reliability of the battery can be improved while raising the battery voltage by the serial connection of the power-generating element 310b and power-generating element 320a.

Also, according to the above configuration, out of the side faces of the battery, the side face where the fourth insulating portion 221 is situated can be covered by the fourth insulating portion 221. Accordingly, mutual contact between members that may exist outside of the battery (e.g., another battery, etc.), and the side face of the battery where the fourth insulating portion 221 is situated, can be prevented by the fourth insulating portion 221. Thus, short-circuiting among batteries due to contact can be suppressed. Also, partial destruction of the side face of the battery by contact between the battery and members that may exist outside of the battery can be suppressed. Even if a part of components (e.g., electrode material included in the second electrode layer 321 or fourth electrode layer 315, counter electrode material included in the first counter electrode layer 312 or fifth counter electrode layer 324, and so forth) of the battery falls loose, the fallen component can be suppressed by the fourth insulating portion 221 from moving to another cell portion within the battery (e.g., power-generating element 310a, etc.) or to the outside of the battery, due to part of the side face of the battery being covered by the fourth insulating portion 221. Accordingly, short-circuiting within the battery due to fallen components of the battery can be suppressed. This enables the reliability of the battery to be further improved.

Note that the battery 2100 according to the second embodiment may further include a second solid electrolyte layer 323, as illustrated in FIGS. 17 and 18.

The second solid electrolyte layer 323 is disposed between the second electrode layer 321 and fifth counter electrode layer 324.

According to the above configuration, one solid battery cell (power-generating element 320a) can be configured from the second electrode layer 321, fifth counter electrode layer 324, and second solid electrolyte layer 323.

The second solid electrolyte layer 323 may be disposed in the battery 2100 according to the second embodiment in contact with the second electroconductive portion 112 and sixth electroconductive portion 212.

According to the above configuration, the strength of bonding between components of the battery can be further improved. That is to say, the strength of bonding between the second electroconductive portion 112 and sixth electroconductive portion 212 can be improved by the second solid electrolyte layer 323. Accordingly, the fifth counter electrode layer 324 can be suppressed from peeling loose from the sixth electroconductive portion 212. Further, the second electrode layer 321 can be suppressed from peeling loose from the second electroconductive portion 112. Thus, the layers making up the power-generating element 320a can be prevented from exhibiting positional shifting or separation due to shock, vibration, and so forth, when manufacturing the battery or using the battery, for example. Thus, reliability of the battery can be improved even further.

Note that the second electrode layer 321 and fifth counter electrode layer 324 may be formed in a narrower range than the second electroconductive portion 112 and sixth electroconductive portion 212, as illustrated in FIGS. 17 and 18.

Also, the second solid electrolyte layer 323 may be disposed over a greater area than that of the second electrode layer 321 and fifth counter electrode layer 324. That is to say, the second solid electrolyte layer 323 may be disposed in a form covering the second electrode layer 321 and fifth counter electrode layer 324, as illustrated in FIGS. 17 and 18. Thus, short-circuiting of the second electrode layer 321 and fifth counter electrode layer 324 due to direct contact can be prevented.

Also, the second solid electrolyte layer 323 may be disposed over a narrower range than the second electroconductive portion 112 and sixth electroconductive portion 212, as illustrated in FIGS. 17 and 18. Alternatively, the range of formation of the second solid electrolyte layer 323 may be the same range as that of the second electroconductive portion 112 and sixth electroconductive portion 212.

The fourth insulating portion 221 is linked to the fifth electroconductive portion 211 and sixth electroconductive portion 212. That is to say, one end of the fourth insulating portion 221 is connected (e.g., bonded) to the fifth electroconductive portion 211 (e.g., an end of the fifth electroconductive portion 211). Another end of the fourth insulating portion 221 is connected (e.g., bonded) to the sixth electroconductive portion 212 (e.g., an end of the sixth electroconductive portion 212).

A connection method of at least one (e.g., both) of the fifth electroconductive portion 211 and sixth electroconductive portion 212 to the fourth insulating portion 221 may be different from the connection method of at least one (e.g., both) of the first electroconductive portion 111 and second electroconductive portion 112 to the first insulating portion 121, or may be the same.

Note that the first electrode layer 311, second electrode layer 321, and fourth electrode layer 315 may be negative active material layers. The electrode material here is a negative active material. The first electroconductive portion 111 is a negative current collector. The first counter electrode layer 312, fourth counter electrode layer 314, and fifth counter electrode layer 324 are positive active material layers. The counter electrode material is a positive active material. The second electroconductive portion 112 and fifth electroconductive portion 211 are bipolar current collectors. The sixth electroconductive portion 212 is a positive current collector.

Alternatively, the first electrode layer 311, second electrode layer 321, and fourth electrode layer 315 may be positive active material layers. The electrode material here is a positive active material. The first electroconductive portion 111 is a positive current collector. The first counter electrode layer 312, fourth counter electrode layer 314, and fifth counter electrode layer 324 are negative active material layers. The counter electrode material is a negative active material. The second electroconductive portion 112 and fifth electroconductive portion 211 are bipolar current collectors. The sixth electroconductive portion 212 is a negative current collector.

Figure 19:
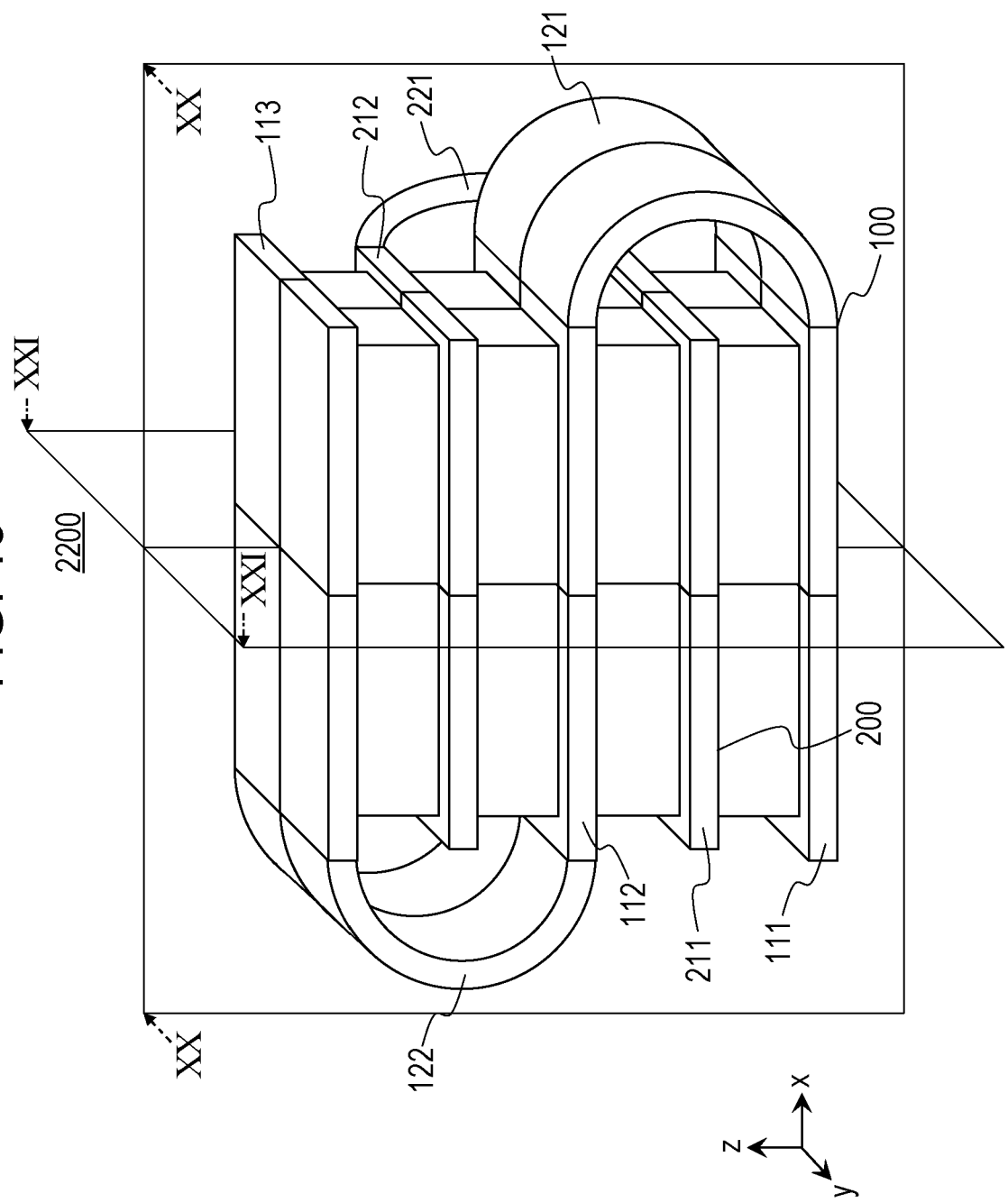
FIG. 19 is a perspective view illustrating a schematic configuration of a battery according to the second embodiment.

FIG. 19 is a perspective view illustrating a schematic configuration of a battery 2200 according to the second embodiment.

Figure 20:
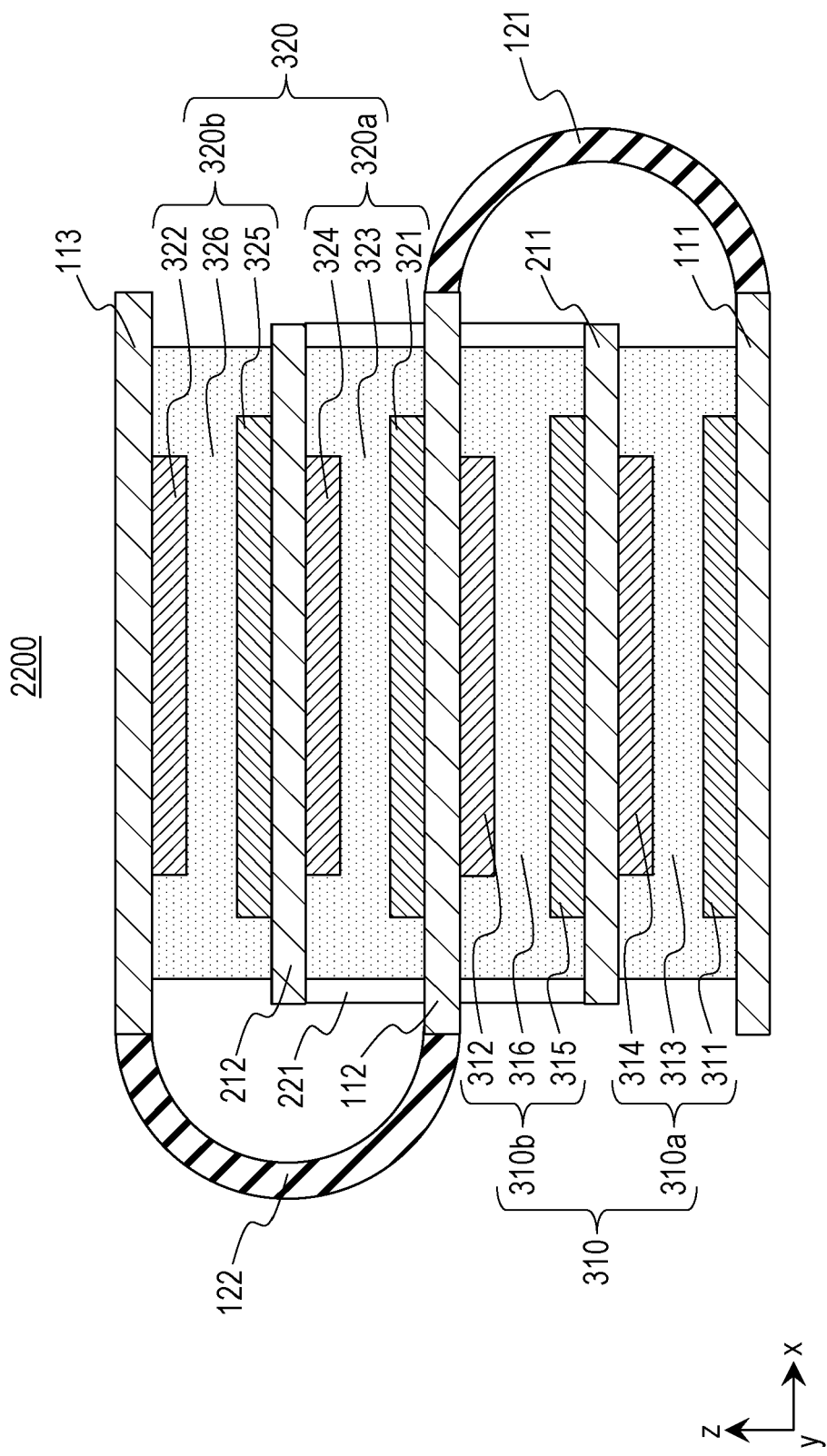
FIG. 20 is an x-z diagram (cross-sectional view taken along XX-XX in FIG. 19) illustrating a schematic configuration of the battery according to the second embodiment.

FIG. 20 is an x-z diagram (cross-sectional view taken along XX-XX in FIG. 19) illustrating a schematic configuration of the battery 2200 according to the second embodiment.

Figure 21:
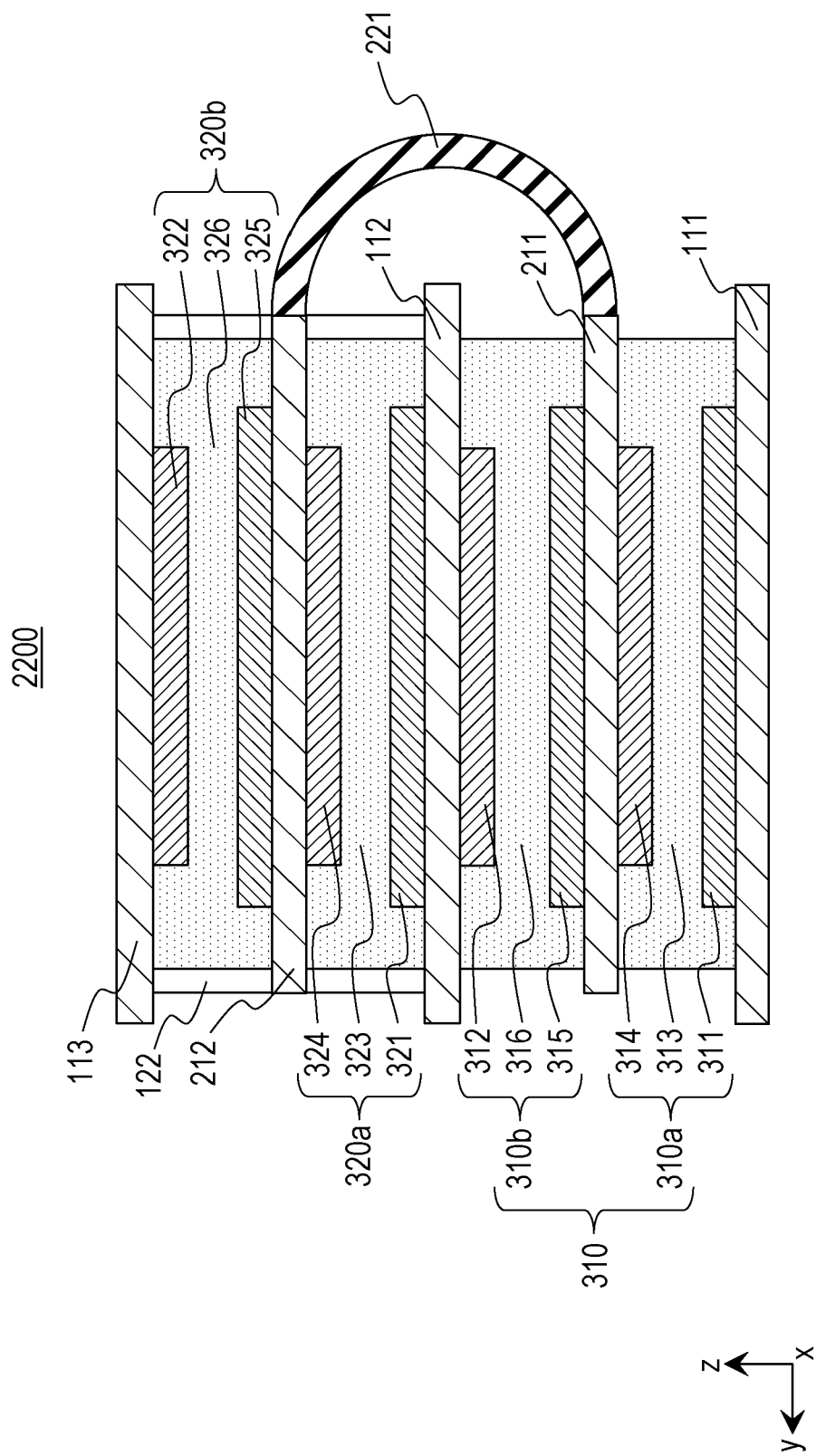
FIG. 21 is a y-z diagram (cross-sectional view taken along XXI-XXI in FIG. 19) illustrating a schematic configuration of the battery according to the second embodiment.

FIG. 21 is a y-z diagram (cross-sectional view taken along XXI-XXI in FIG. 19) illustrating a schematic configuration of the battery 2200 according to the second embodiment.

The battery 2200 according to the second embodiment further includes the following configuration, in addition to the configuration of the above-described battery 2100 according to the second embodiment.

That is to say, the battery 2200 according to the second embodiment further includes a fifth electrode layer 325 and second counter electrode layer 322.

The second counter electrode layer 322 is a counter electrode of the first electrode layer 311, second electrode layer 321, fourth electrode layer 315, and fifth electrode layer 325.

The first current collector 100 has the second insulating portion 122 and third electroconductive portion 113.

The fifth electrode layer 325 is disposed in contact with the sixth electroconductive portion 212.

The second counter electrode layer 322 is disposed in contact with the third electroconductive portion 113.

The second insulating portion 122 is a member linking the second electroconductive portion 112 and third electroconductive portion 113.

The first current collector 100 is folded at the second insulating portion 122, whereby the fifth electrode layer 325 and second counter electrode layer 322 are positioned facing each other.

According to the above configuration, the strength of bonding between components of the battery can be further improved. That is to say, the second electrode layer 321 and second counter electrode layer 322 can each be respectively disposed to the second electroconductive portion 112 and third electroconductive portion 113 linked to each other by the second insulating portion 122. Thus, the positional relationship between the second electrode layer 321 disposed on the second electroconductive portion 112 and the second counter electrode layer 322 disposed on the third electroconductive portion 113 can be strongly maintained by the second insulating portion 122 (in other words, by the first current collector 100 that is one component). Accordingly, the layers (e.g., the second electrode layer 321 and second counter electrode layer 322) making up the battery can be prevented from exhibiting positional shifting or separation due to shock, vibration, and so forth, when manufacturing the battery or using the battery, for example.

Also, according to the above configuration, a laminated battery can be configured using the first current collector 100 and second current collector 200. That is to say, a power-generating element (power-generating element 320a) including the second electrode layer 321 and fifth counter electrode layer 324, and a power-generating element (power-generating element 320b) including the fifth electrode layer 325 and second counter electrode layer 322, can be laminated by serial connection via the second current collector 200 (i.e., the sixth electroconductive portion 212 of the second current collector 200). Accordingly, the positional relationship between the components of the power-generating element 320a and power-generating element 320b can be strongly maintained by the second insulating portion 122 (in other words, by the first current collector 100 that is one component). Accordingly, the power-generating elements (e.g., the power-generating element 320a and power-generating element 320b) making up the battery can be prevented from exhibiting positional shifting or separation due to shock, vibration, and so forth, when manufacturing the battery or using the battery, for example. Thus, the reliability of the battery can be improved while raising the battery voltage by the serial connection of the power-generating element 320a and power-generating element 320b.

Also, according to the above configuration, out of the side faces of the battery, the side face where the second insulating portion 122 is situated can be covered by the second insulating portion 122. Accordingly, mutual contact between members that may exist outside of the battery (e.g., another battery, etc.), and the side face of the battery where the second insulating portion 122 is situated, can be prevented by the second insulating portion 122. Thus, short-circuiting among batteries can be suppressed. Also, partial destruction of the side face of the battery by contact between the battery and members that may exist outside of the battery can be suppressed. Even if a part of components (e.g., electrode material included in the second electrode layer 321 or fifth electrode layer 325, counter electrode material included in the second counter electrode layer 322 or fifth counter electrode layer 324, and so forth) of the battery falls loose, the fallen component can be suppressed by the second insulating portion 122 from moving to another cell portion within the battery (e.g., power-generating element 310*a*, power-generating element 310*b*, etc.) or to the outside of the battery, due to part of the side face of the battery being covered by the second insulating portion 122. Accordingly, short-circuiting within the battery due to fallen components of the battery can be suppressed. This enables the reliability of the battery to be further improved.

Note that the battery 2200 according to the second embodiment may further include a fifth solid electrolyte layer 326, as illustrated in FIGS. 20 and 21.

The fifth solid electrolyte layer 326 is disposed between the fifth electrode layer 325 second counter electrode layer 322.

According to the above configuration, one solid battery cell (power-generating element 320*b*) can be configured from the fifth electrode layer 325, second counter electrode layer 322, and fifth solid electrolyte layer 326.

The fifth solid electrolyte layer 326 may be disposed in the battery 2200 according to the second embodiment in contact with the third electroconductive portion 113 and sixth electroconductive portion 212.

According to the above configuration, the strength of bonding between components of the battery can be further improved. That is to say, the strength of bonding between the third electroconductive portion 113 and sixth electroconductive portion 212 can be improved by the fifth solid electrolyte layer 326. Accordingly, the second counter electrode layer 322 can be suppressed from peeling loose from the third electroconductive portion 113. Further, the fifth electrode layer 325 can be suppressed from peeling loose from the sixth electroconductive portion 212. Thus, the layers making up the power-generating element 320*b* can be prevented from exhibiting positional shifting or separation due to shock, vibration, and so forth, when manufacturing the battery or using the battery, for example. Thus, reliability of the battery can be improved even further.

Note that the fifth electrode layer 325 and second counter electrode layer 322 may be formed in a narrower range than the third electroconductive portion 113 and sixth electroconductive portion 212, as illustrated in FIGS. 20 and 21.

Also, the fifth solid electrolyte layer 326 may be disposed over a greater area than that of the fifth electrode layer 325 and second counter electrode layer 322, as illustrated in FIGS. 20 and 21. That is to say, the fifth solid electrolyte layer 326 may be disposed in a form covering the fifth electrode layer 325 and second counter electrode layer 322. Thus, short-circuiting of the fifth electrode layer 325 and second counter electrode layer 322 due to direct contact can be prevented.

Also, the fifth solid electrolyte layer 326 may be disposed over a narrower range than the third electroconductive portion 113 and sixth electroconductive portion 212, as illustrated in FIGS. 20 and 21. Alternatively, the range of formation of the fifth solid electrolyte layer 326 may be the same range as that of the third electroconductive portion 113 and sixth electroconductive portion 212.

Note that the first electrode layer 311, second electrode layer 321, fourth electrode layer 315, and fifth electrode layer 325 may be negative active material layers. The electrode material here is a negative active material. The first electroconductive portion 111 is a negative current collector. The first counter electrode layer 312, second counter electrode layer 322, fourth counter electrode layer 314, and fifth counter electrode layer 324 are positive active material layers. The counter electrode material is a positive active material. The second electroconductive portion 112, fifth electroconductive portion 211, and sixth electroconductive portion 212 are bipolar current collectors. The third electroconductive portion 113 is a positive current collector.

Note that the first electrode layer 311, second electrode layer 321, fourth electrode layer 315, and fifth electrode layer 325 may be positive active material layers. The electrode material here is a positive active material. The first electroconductive portion 111 is a positive current collector. The first counter electrode layer 312, second counter electrode layer 322, fourth counter electrode layer 314, and fifth counter electrode layer 324 are negative active material layers. The counter electrode material is a negative active material. The second electroconductive portion 112, fifth electroconductive portion 211, and sixth electroconductive portion 212 are bipolar current collectors. The third electroconductive portion 113 is a negative current collector.

Figure 22:
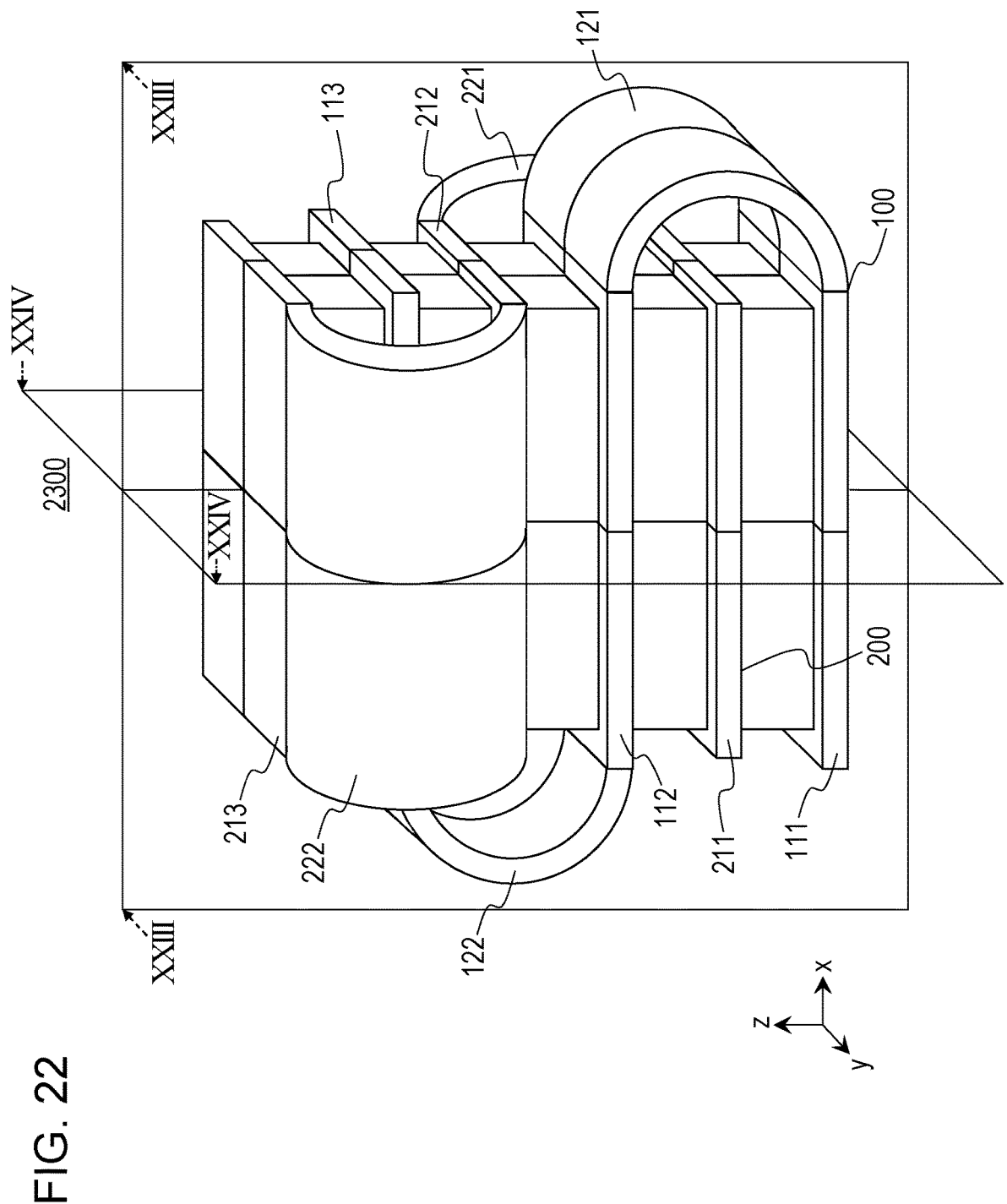
FIG. 22 is a perspective view illustrating a schematic configuration of a battery according to the second embodiment.

FIG. 22 is a perspective view illustrating a schematic configuration of a battery 2300 according to the second embodiment.

Figure 23:
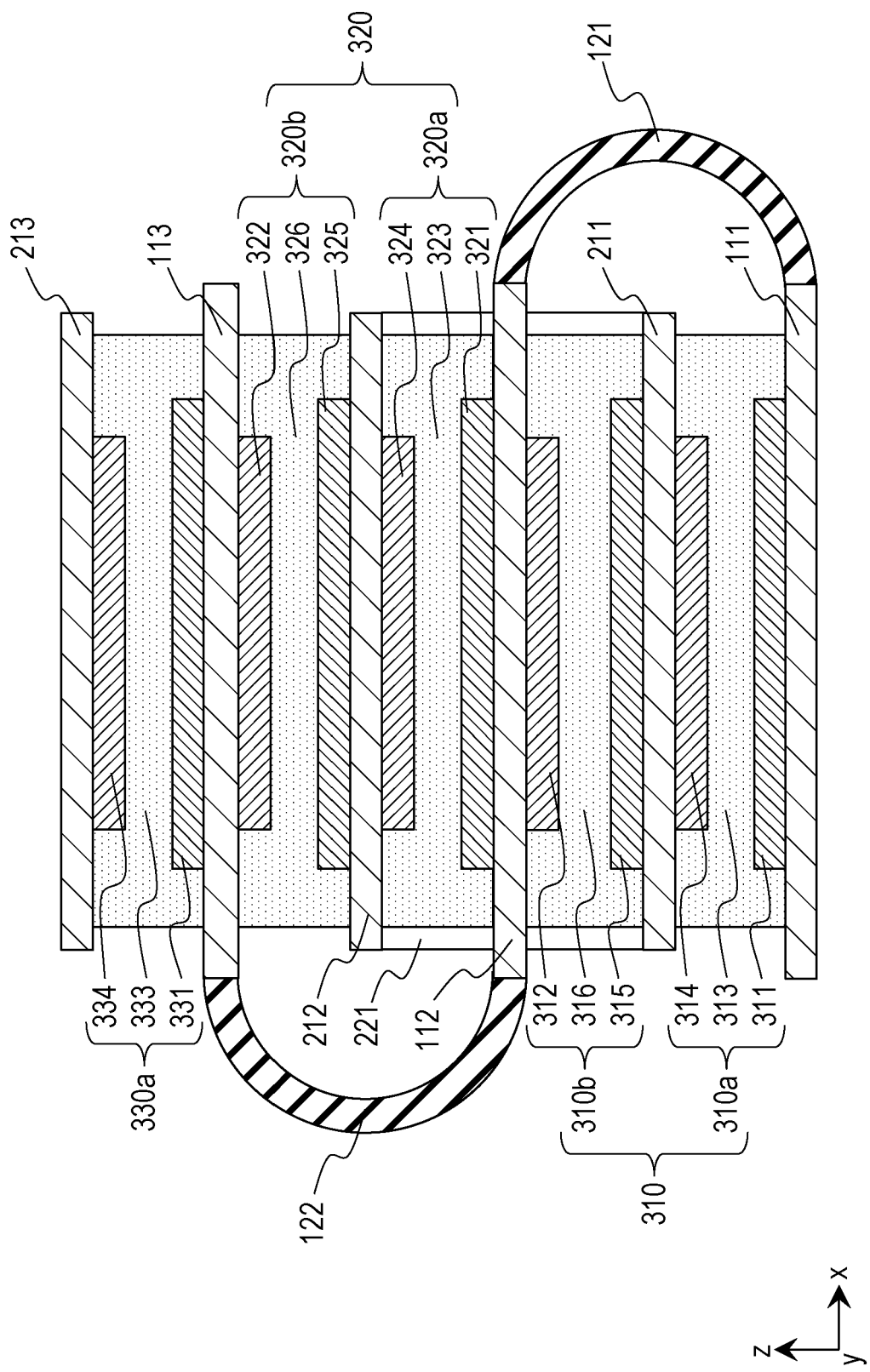
FIG. 23 is an x-z diagram (cross-sectional view taken along XXIII-XXIII in FIG. 22) illustrating a schematic configuration of the battery according to the second embodiment.

FIG. 23 is an x-z diagram (cross-sectional view taken along XXIII-XXIII in FIG. 22) illustrating a schematic configuration of the battery 2300 according to the second embodiment.

Figure 24:
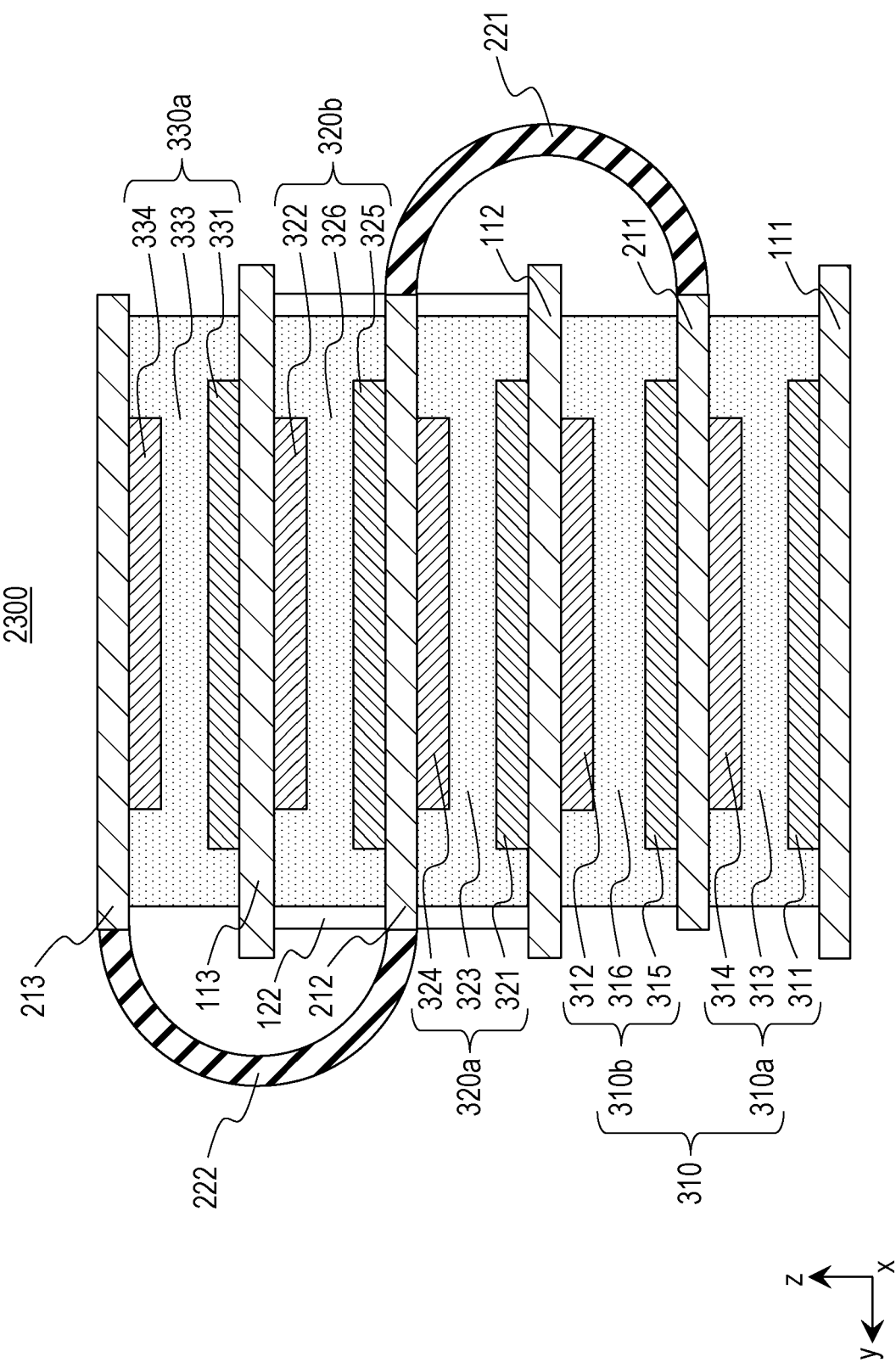
FIG. 24 is a y-z diagram (cross-sectional view taken along XXIV-XXIV in FIG. 22) illustrating a schematic configuration of the battery according to the second embodiment.

FIG. 24 is a y-z diagram (cross-sectional view taken along XXIV-XXIV in FIG. 22) illustrating a schematic configuration of the battery 2300 according to the second embodiment.

The battery 2300 according to the second embodiment further includes the following configuration, in addition to the configuration of the above-described battery 2200 according to the second embodiment.

That is to say, the battery 2300 according to the second embodiment further includes the third electrode layer 331 and a sixth counter electrode layer 334.

The sixth counter electrode layer 334 is a counter electrode of the first electrode layer 311, second electrode layer 321, third electrode layer 331, fourth electrode layer 315, and fifth electrode layer 325.

The second current collector 200 has a seventh electroconductive portion 213 and a fifth insulating portion 222.

The third electrode layer 331 is disposed in contact with the third electroconductive portion 113.

The sixth counter electrode layer 334 is disposed in contact with the seventh electroconductive portion 213.

The fifth insulating portion 222 is a member linking the sixth electroconductive portion 212 and seventh electroconductive portion 213.

The second current collector 200 is folded at the fifth insulating portion 222, whereby the third electrode layer 331 and sixth counter electrode layer 334 are positioned facing each other.

According to the above configuration, the strength of bonding between components of the battery can be further improved. That is to say, the fifth electrode layer 325 and sixth counter electrode layer 334 can each be respectively disposed to the sixth electroconductive portion 212 and seventh electroconductive portion 213 linked to each other by the fifth insulating portion 222. Thus, the positional relationship between the fifth electrode layer 325 disposed on the sixth electroconductive portion 212 and the sixth counter electrode layer 334 disposed on the seventh electroconductive portion 213 can be strongly maintained by the fifth insulating portion 222 (in other words, by the second current collector 200 that is one component). Accordingly, the layers (e.g., the fifth electrode layer 325 and sixth counter electrode layer 334) making up the battery can be prevented from exhibiting positional shifting or separation due to shock, vibration, and so forth, when manufacturing the battery or using the battery, for example.

Also, according to the above configuration, a laminated battery can be configured using the first current collector 100 and second current collector 200. That is to say, a power-generating element (power-generating element 320b) including the fifth electrode layer 325 and second counter electrode layer 322, and a power-generating element (power-generating element 330a) including the third electrode layer 331 and sixth counter electrode layer 334, can be laminated by serial connection via the first current collector 100 (i.e., the third electroconductive portion 113 of the first current collector 100). Accordingly, the positional relationship between the components of the power-generating element 320b and power-generating element 330a can be strongly maintained by the fifth insulating portion 222 (in other words, by the second current collector 200 that is one component). Accordingly, the power-generating elements (e.g., the power-generating element 320b and power-generating element 330a) making up the battery can be prevented from exhibiting positional shifting or separation due to shock, vibration, and so forth, when manufacturing the battery or using the battery, for example. Thus, the reliability of the battery can be improved while raising the battery voltage by the serial connection of the power-generating element 320b and power-generating element 330a.

Also, according to the above configuration, out of the side faces of the battery, the side face where the fifth insulating portion 222 is situated can be covered by the fifth insulating portion 222. Accordingly, mutual contact between members that may exist outside of the battery (e.g., another battery, etc.), and the side face of the battery where the fifth insulating portion 222 is situated, can be prevented by the fifth insulating portion 222. Thus, short-circuiting among batteries due to contact can be suppressed. Also, partial destruction of the side face of the battery by contact between the battery and members that may exist outside of the battery can be suppressed. Even if a part of components (e.g., electrode material included in the third electrode layer 331 or fifth electrode layer 325, counter electrode material included in the second counter electrode layer 322 or sixth counter electrode layer 334, and so forth) of the battery falls loose, the fallen component can be suppressed by the fifth insulating portion 222 from moving to another cell portion within the battery (e.g., first power-generating element 310, power-generating element 320a, etc.) or to the outside of the battery, due to part of the side face of the battery being covered by the fifth insulating portion 222. Accordingly, short-circuiting within the battery due to fallen components of the battery can be suppressed. This enables the reliability of the battery to be further improved.

Note that the battery 2300 according to the second embodiment may further include the third solid electrolyte layer 333, as illustrated in FIGS. 23 and 24.

The third solid electrolyte layer 333 is disposed between the third electrode layer 331 and sixth counter electrode layer 334.

According to the above configuration, one solid battery cell (power-generating element 330a) can be configured from the third electrode layer 331, sixth counter electrode layer 334, and third solid electrolyte layer 333.

The third solid electrolyte layer 333 may be disposed in the battery 2300 according to the second embodiment in contact with the third electroconductive portion 113 and seventh electroconductive portion 213.

According to the above configuration, the strength of bonding between components of the battery can be further improved. That is to say, the strength of bonding between the third electroconductive portion 113 and seventh electroconductive portion 213 can be improved by the third solid electrolyte layer 333. Accordingly, the sixth counter electrode layer 334 can be suppressed from peeling loose from the seventh electroconductive portion 213. Further, the third electrode layer 331 can be suppressed from peeling loose from the third electroconductive portion 113. Thus, the layers making up the power-generating element 330a can be prevented from exhibiting positional shifting or separation due to shock, vibration, and so forth, when manufacturing the battery or using the battery, for example. Thus, reliability of the battery can be improved even further.

Note that the third electrode layer 331 and sixth counter electrode layer 334 may be formed in a narrower range than the third electroconductive portion 113 and seventh electroconductive portion 213, as illustrated in FIGS. 23 and 24.

Also, the third solid electrolyte layer 333 may be disposed over a greater area than that of the third electroconductive layer 331 and sixth counter electrode layer 334, as illustrated in FIGS. 23 and 24. That is to say, the third solid electrolyte layer 333 may be disposed in a form covering the third electroconductive layer 331 and sixth counter electrode layer 334. Thus, short-circuiting of the third electroconductive layer 331 and sixth counter electrode layer 334 due to direct contact can be prevented.

Also, the third solid electrolyte layer 333 may be disposed over a narrower range than the third electroconductive portion 113 and seventh electroconductive portion 213, as illustrated in FIGS. 23 and 24. Alternatively, the range of formation of the third solid electrolyte layer 333 may be the same range as that of the third electroconductive portion 113 and seventh electroconductive portion 213.

The fifth insulating portion 222 is linked to the sixth electroconductive portion 212 and seventh electroconductive portion 213. That is to say, one end of the fifth insulating portion 222 is connected (e.g., bonded) to the sixth electroconductive portion 212 (e.g., an end of the sixth electroconductive portion 212). Another end of the fifth insulating portion 222 is connected (e.g., bonded) to the seventh electroconductive portion 213 (e.g., an end of the seventh electroconductive portion 213).

A connection method of at least one (e.g., both) of the sixth electroconductive portion 212 and seventh electroconductive portion 213 to the fifth insulating portion 222 may be different from the connection method of at least one (e.g., both) of the fifth electroconductive portion 211 and sixth electroconductive portion 212 to the fourth insulating portion 221, or may be the same.

Note that the end of the sixth electroconductive portion 212 (i.e., in a case where the sixth electroconductive portion 212 is rectangular, one side of the rectangle) to which the fifth insulating portion 222 is connected may be different from the end of the sixth electroconductive portion 212 to which the fourth insulating portion 221 is connected, or may be the same. That is to say, the end of the sixth electroconductive portion 212 to which the fifth insulating portion 222 is connected may be an end situated across from the end of the sixth electroconductive portion 212 to which the fourth insulating portion 221 is connected, as illustrated in FIGS. 23 and 24. Alternatively, the end of the sixth electroconductive portion 212 to which the fifth insulating portion 222 is connected may be an end adjacent to the end of the sixth electroconductive portion 212 to which the fourth insulating portion 221 is connected.

Note that the first electrode layer 311, second electrode layer 321, third electrode layer 331, fourth electrode layer 315, and fifth electrode layer 325 may be negative active material layers. The electrode material here is a negative active material. The first electroconductive portion 111 is a negative current collector. The first counter electrode layer 312, second counter electrode layer 322, fourth counter electrode layer 314, fifth counter electrode layer 324, and sixth counter electrode layer 334 are positive active material layers. The counter electrode material is a positive active material. The second electroconductive portion 112, third electroconductive portion 113, fifth electroconductive portion 211, and sixth electroconductive portion 212 are bipolar current collectors. The seventh electroconductive portion 213 is a positive current collector.

Alternatively, the first electrode layer 311, second electrode layer 321, third electrode layer 331, fourth electrode layer 315, and fifth electrode layer 325 may be positive active material layers. The electrode material here is a positive active material. The first electroconductive portion 111 is a positive current collector. The first counter electrode layer 312, second counter electrode layer 322, fourth counter electrode layer 314, fifth counter electrode layer 324, and sixth counter electrode layer 334 are negative active material layers. The counter electrode material is a negative active material. The second electroconductive portion 112, third electroconductive portion 113, fifth electroconductive portion 211, and sixth electroconductive portion 212 are bipolar current collectors. The seventh electroconductive portion 213 is a negative current collector.

Figure 25:
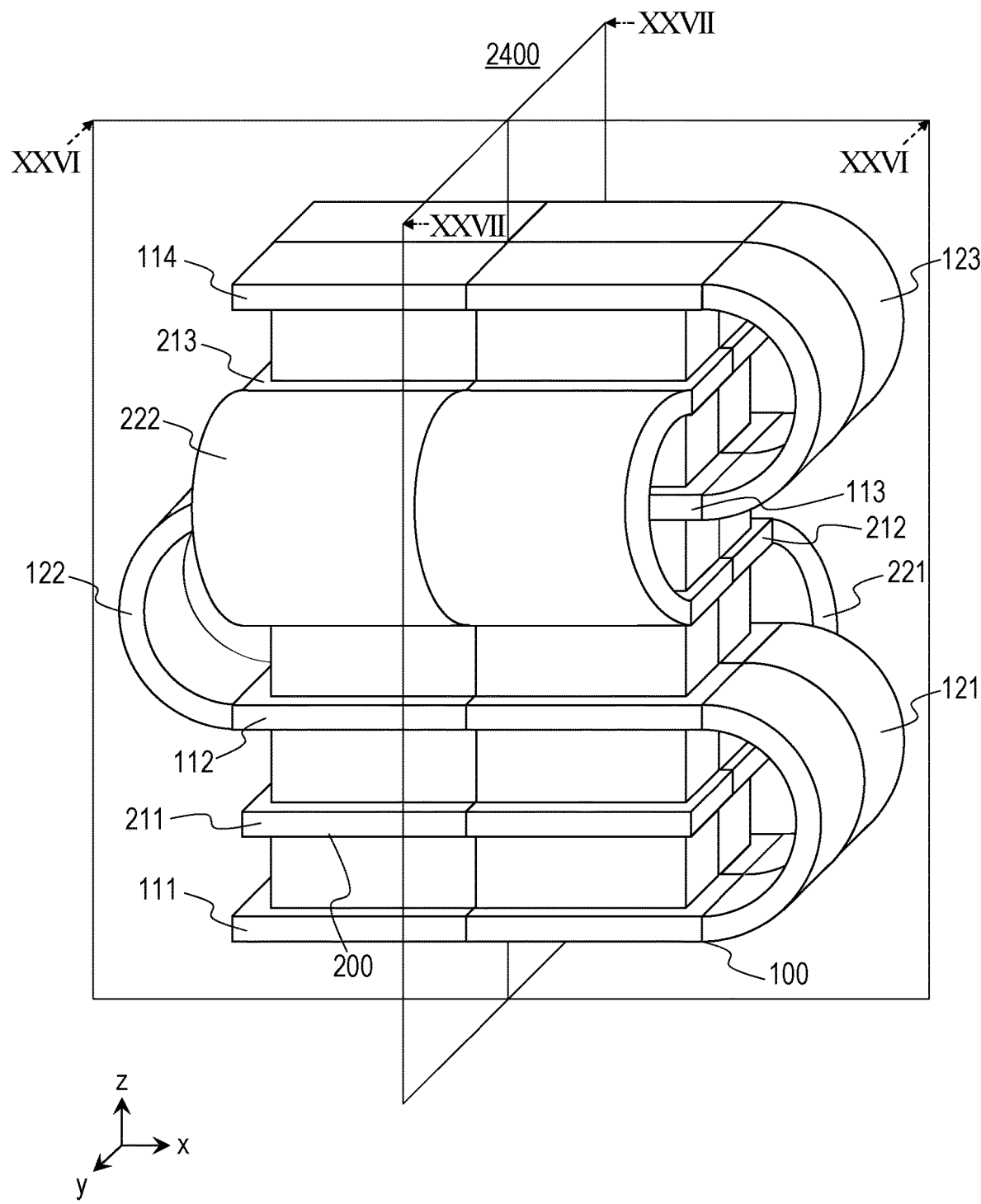
FIG. 25 is a perspective view illustrating a schematic configuration of a battery according to the second embodiment.

FIG. 25 is a perspective view illustrating a schematic configuration of a battery 2400 according to the second embodiment.

Figure 26:
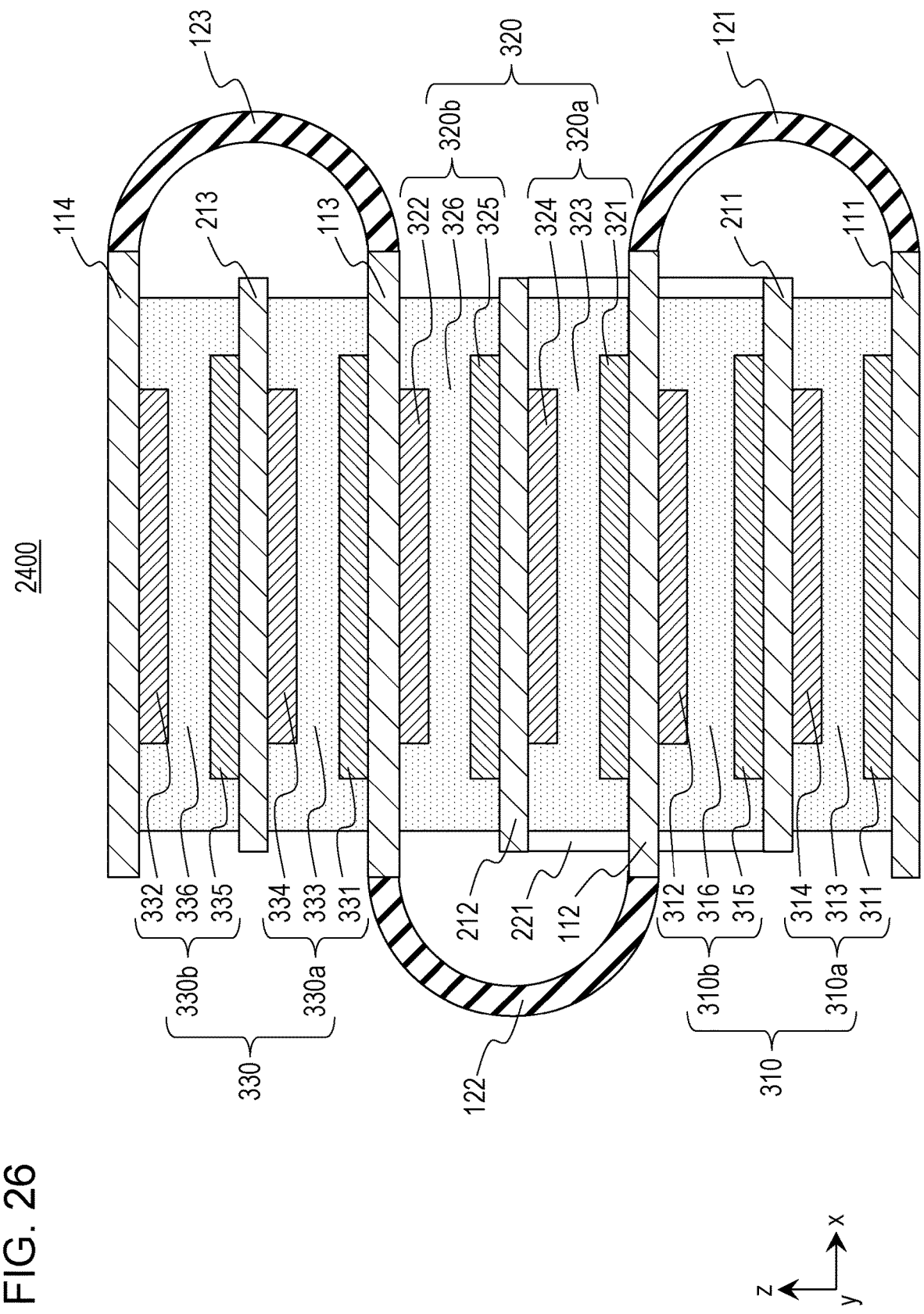
FIG. 26 is an x-z diagram (cross-sectional view taken along XXVI-XXVI in FIG. 25) illustrating a schematic configuration of the battery according to the second embodiment.

FIG. 26 is an x-z diagram (cross-sectional view taken along XXVI-XXVI in FIG. 25) illustrating a schematic configuration of the battery 2400 according to the second embodiment.

Figure 27:
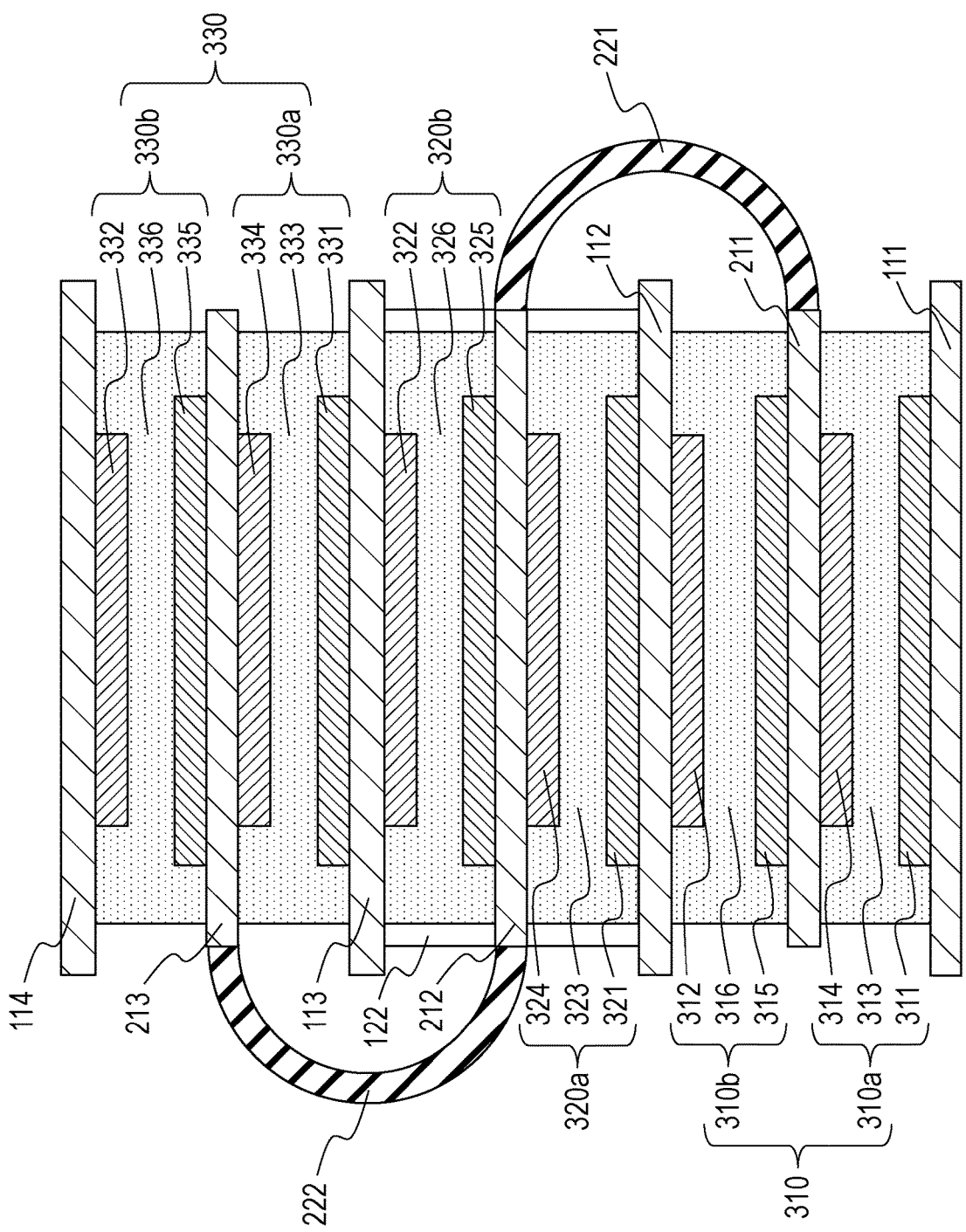
FIG. 27 is a y-z diagram (cross-sectional view taken along XXVII-XXVII in FIG. 25) illustrating a schematic configuration of the battery according to the second embodiment.

FIG. 27 is a y-z diagram (cross-sectional view taken along XXVII-XXVII in FIG. 25) illustrating a schematic configuration of the battery 2400 according to the second embodiment.

The battery 2400 according to the second embodiment further includes the following configuration, in addition to the configuration of the above-described battery 2300 according to the second embodiment.

That is to say, the battery 2400 according to the second embodiment further includes the sixth electrode layer 335 and third counter electrode layer 332.

The third counter electrode layer 332 is a counter electrode of the first electrode layer 311, second electrode layer 321, third electrode layer 331, fourth electrode layer 315, fifth electrode layer 325, and sixth electrode layer 335.

The first current collector 100 has the third insulating portion 123 and fourth electroconductive portion 114.

The sixth electrode layer 335 is disposed in contact with the seventh electroconductive portion 213.

The third counter electrode layer 332 is disposed in contact with the fourth electroconductive portion 114.

The third insulating portion 123 is a member linking the third electroconductive portion 113 and fourth electroconductive portion 114.

The first current collector 100 is folded at the third insulating portion 123, whereby the sixth electrode layer 335 and third counter electrode layer 332 are positioned facing each other.

According to the above configuration, the strength of bonding between components of the battery can be further improved. That is to say, the third electrode layer 331 and third counter electrode layer 332 can each be respectively disposed to the third electroconductive portion 113 and fourth electroconductive portion 114 linked to each other by the third insulating portion 123. Thus, the positional relationship between the third electrode layer 331 disposed on the third electroconductive portion 113 and the third counter electrode layer 332 disposed on the fourth electroconductive portion 114 can be strongly maintained by the third insulating portion 123 (in other words, by the first current collector 100 that is one component). Accordingly, the layers (e.g., the third electrode layer 331 and third counter electrode layer 332) making up the battery can be prevented from exhibiting positional shifting or separation due to shock, vibration, and so forth, when manufacturing the battery or using the battery, for example.

Also, according to the above configuration, a laminated battery can be configured using the first current collector 100 and second current collector 200. That is to say, a power-generating element (power-generating element 330a) including the third electrode layer 331 and sixth counter electrode layer 334, and a power-generating element (power-generating element 330b) including the sixth electrode layer 335 and third counter electrode layer 332, can be laminated by serial connection via the second current collector 200 (i.e., the seventh electroconductive portion 213 of the second current collector 200). Accordingly, the positional relationship between the components of the power-generating element 330a and power-generating element 330b can be strongly maintained by the third insulating portion 123 (in other words, by the first current collector 100 that is one component). Accordingly, the power-generating elements (e.g., the power-generating element 330a and power-generating element 330b) making up the battery can be prevented from exhibiting positional shifting or separation due to shock, vibration, and so forth, when manufacturing the battery or using the battery, for example. Thus, the reliability of the battery can be improved while raising the battery voltage by the serial connection of the power-generating element 330a and power-generating element 330b.

Also, according to the above configuration, out of the side faces of the battery, the side face where the third insulating portion 123 is situated can be covered by the third insulating portion 123. Accordingly, mutual contact between members that may exist outside of the battery (e.g., another battery, etc.), and the side face of the battery where the third insulating portion 123 is situated, can be prevented by the third insulating portion 123. Thus, short-circuiting among batteries can be suppressed. Also, partial destruction of the side face of the battery by contact between the battery and members that may exist outside of the battery can be suppressed. Even if a part of components (e.g., electrode material included in the third electrode layer 331 or sixth electrode layer 335, counter electrode material included in the third counter electrode layer 332 or sixth counter electrode layer 334, and so forth) of the battery falls loose, the fallen component can be suppressed by the third insulating portion 123 from moving to another cell portion within the battery (e.g., first power-generating element 310, second power-generating element 320, etc.) or to the outside of the battery, due to part of the side face of the battery being covered by the third insulating portion 123. Accordingly, short-circuiting within the battery due to fallen components of the battery can be suppressed. This enables the reliability of the battery to be further improved.

Note that the battery 2400 according to the second embodiment may further include a sixth solid electrolyte layer 336, as illustrated in FIGS. 26 and 27.

The sixth solid electrolyte layer 336 is disposed between the sixth electrode layer 335 and third counter electrode layer 332.

According to the above configuration, one solid battery cell (power-generating element 330b) can be configured from the sixth electrode layer 335, third counter electrode layer 332, and fifth solid electrolyte layer 326.

The sixth solid electrolyte layer 336 may be disposed in the battery 2400 according to the second embodiment in contact with the fourth electroconductive portion 114 and seventh electroconductive portion 213.

According to the above configuration, the strength of bonding between components of the battery can be further improved. That is to say, the strength of bonding between the fourth electroconductive portion 114 and seventh electroconductive portion 213 can be improved by the sixth solid electrolyte layer 336. Accordingly, the third counter electrode layer 332 can be suppressed from peeling loose from the fourth electroconductive portion 114. Further, the sixth electrode layer 335 can be suppressed from peeling loose from the seventh electroconductive portion 213. Thus, the layers making up the power-generating element 330b can be prevented from exhibiting positional shifting or separation due to shock, vibration, and so forth, when manufacturing the battery or using the battery, for example. Thus, reliability of the battery can be improved even further.

Note that the sixth electrode layer 335 and third counter electrode layer 332 may be formed in a narrower range than the fourth electroconductive portion 114 and sixth electroconductive portion 212 as illustrated in FIGS. 26 and 27.

Also, the sixth solid electrolyte layer 336 may be disposed over a greater area than that of the sixth electrode layer 335 and third counter electrode layer 332, as illustrated in FIGS. 26 and 27. That is to say, the sixth solid electrolyte layer 336 may be disposed in a form covering the sixth electrode layer 335 and third counter electrode layer 332. Thus, short-circuiting of the sixth electrode layer 335 and third counter electrode layer 332 due to direct contact can be prevented.

Also, the sixth solid electrolyte layer 336 may be disposed over a narrower range than the fourth electroconductive portion 114 and seventh electroconductive portion 213, as illustrated in FIGS. 26 and 27. Alternatively, the range of formation of the sixth solid electrolyte layer 336 may be the same range as that of the fourth electroconductive portion 114 and seventh electroconductive portion 213.

Note that the first electrode layer 311, second electrode layer 321, third electrode layer 331, fourth electrode layer 315, fifth electrode layer 325, and sixth electrode layer 335 may be negative active material layers. The electrode material here is a negative active material. The first electroconductive portion 111 is a negative current collector. The first counter electrode layer 312, second counter electrode layer 322, third counter electrode layer 332, fourth counter electrode layer 314, fifth counter electrode layer 324, and sixth counter electrode layer 334 are positive active material layers. The counter electrode material is a positive active material. The second electroconductive portion 112, third electroconductive portion 113, fifth electroconductive portion 211, sixth electroconductive portion 212, and seventh electroconductive portion 213 are bipolar current collectors. The fourth electroconductive portion 114 is a positive current collector.

Alternatively, the first electrode layer 311, second electrode layer 321, third electrode layer 331, fourth electrode layer 315, fifth electrode layer 325, and sixth electrode layer 335 may be positive active material layers. The electrode material here is a positive active material. The first electroconductive portion 111 is a positive current collector. The first counter electrode layer 312, second counter electrode layer 322, third counter electrode layer 332, fourth counter electrode layer 314, fifth counter electrode layer 324, and sixth counter electrode layer 334 are negative active material layers. The counter electrode material is a negative active material. The second electroconductive portion 112, third electroconductive portion 113, fifth electroconductive portion 211, sixth electroconductive portion 212, and seventh electroconductive portion 213 are bipolar current collectors. The fourth electroconductive portion 114 is a negative current collector.

Figure 28:
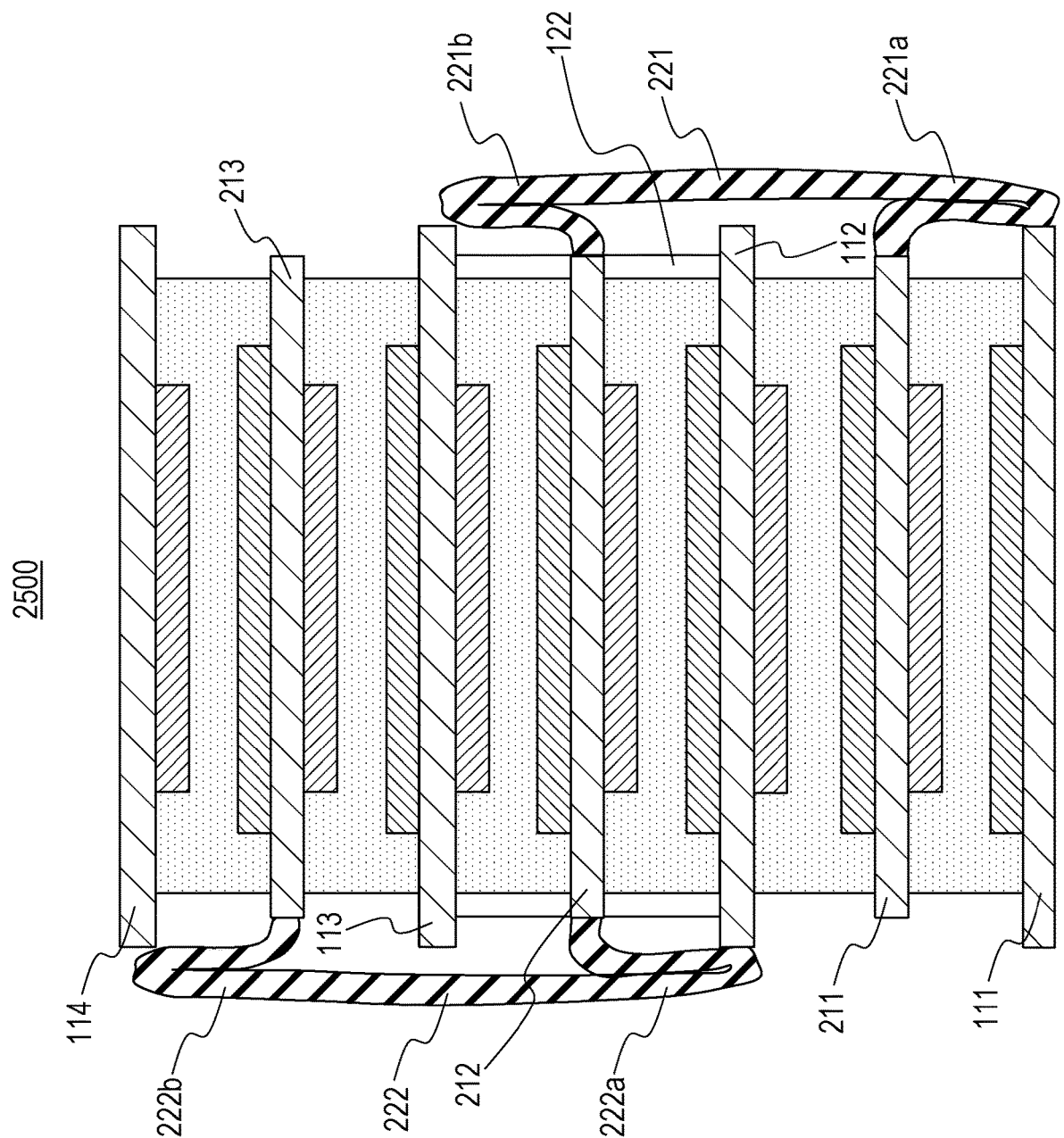
FIG. 28 is a y-z diagram (cross-sectional view) illustrating a schematic configuration of a battery according to the second embodiment.

FIG. 28 is a y-z diagram (cross-sectional view) illustrating a schematic configuration of a battery 2500 according to the second embodiment.

Figure 29:
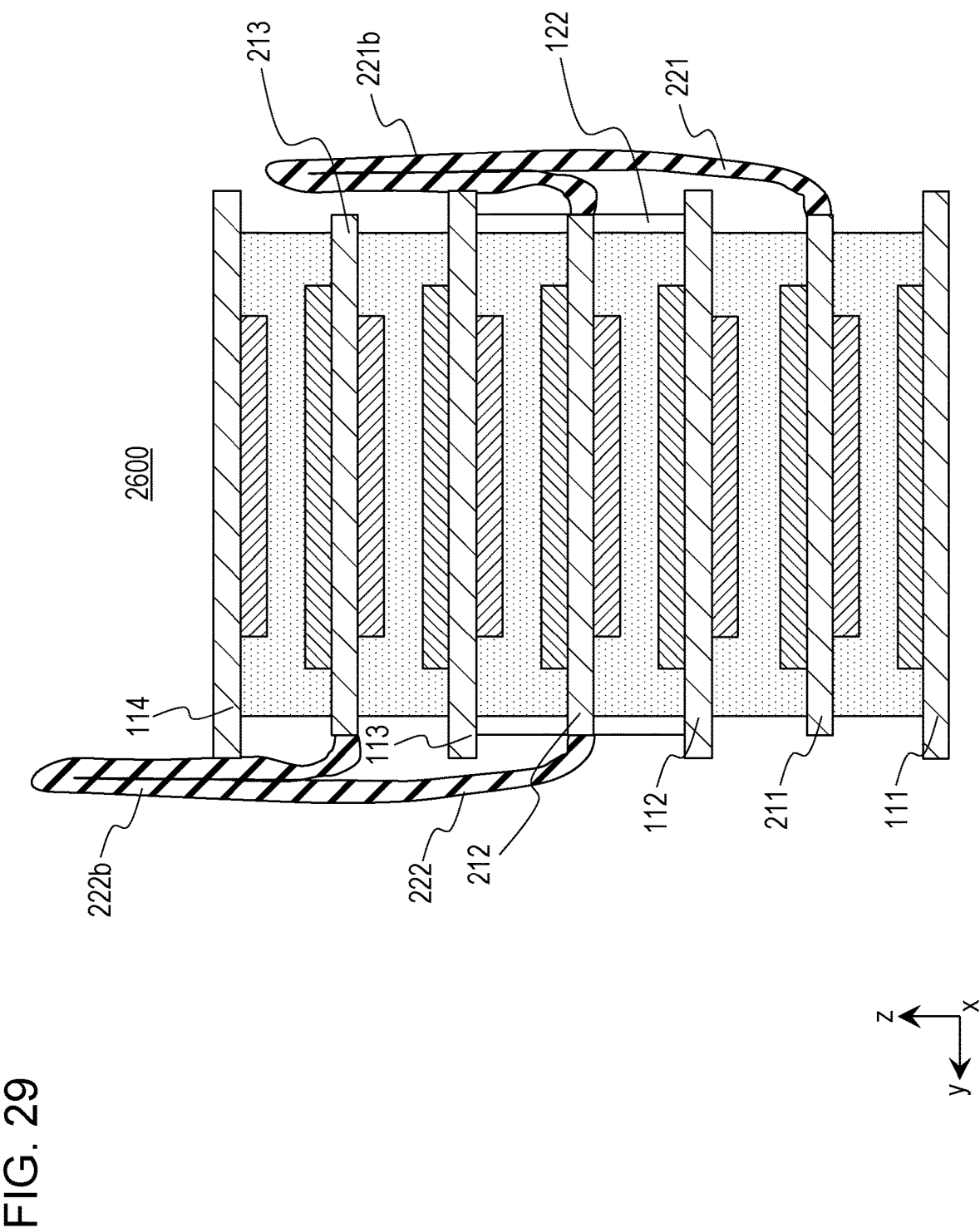
FIG. 29 is a y-z diagram (cross-sectional view) illustrating a schematic configuration of a battery according to the second embodiment.

FIG. 29 is a y-z diagram (cross-sectional view) illustrating a schematic configuration of a battery 2600 according to the second embodiment.

Figure 30:
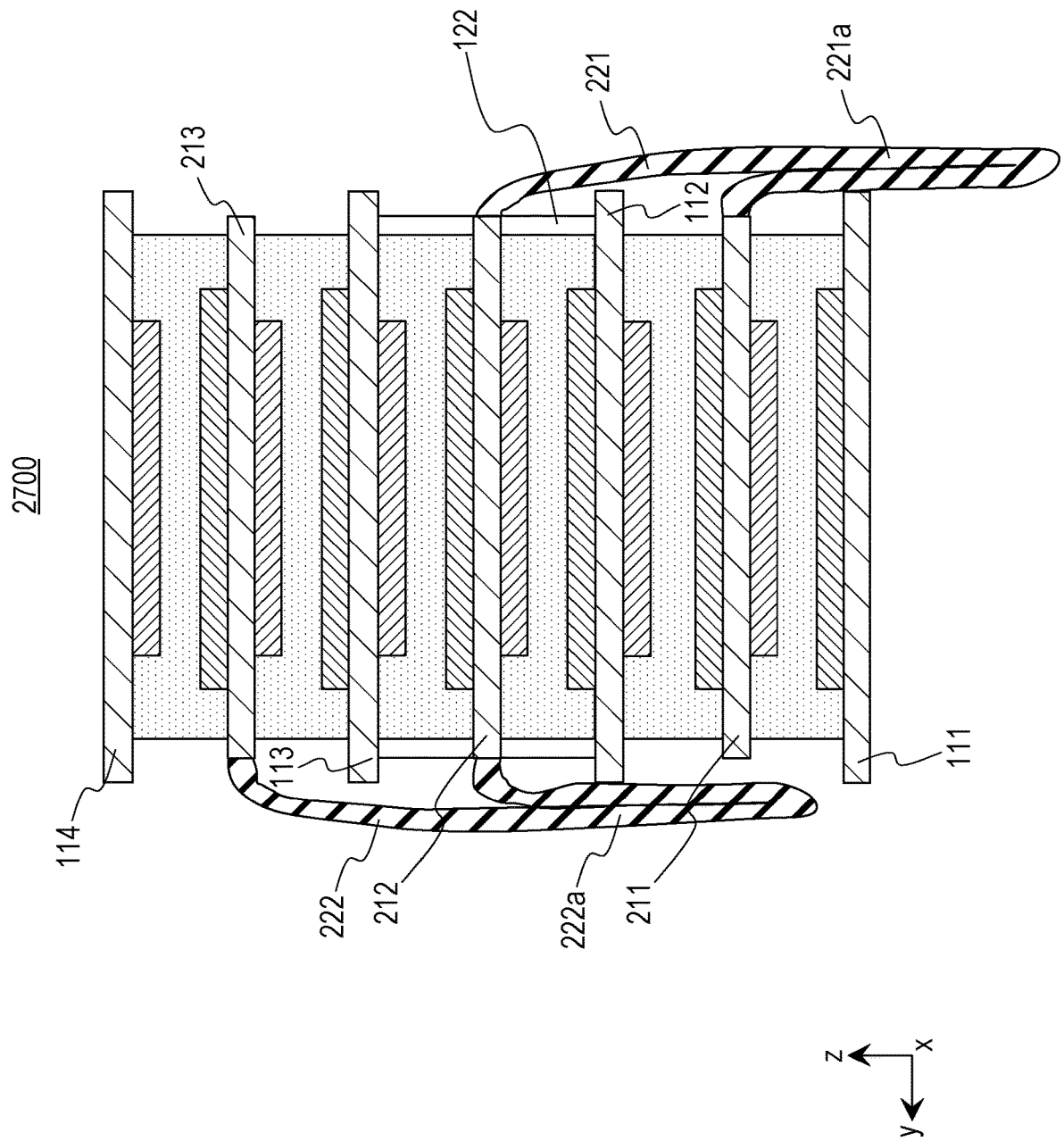
FIG. 30 is a y-z diagram (cross-sectional view) illustrating a schematic configuration of a battery according to the second embodiment.

FIG. 30 is a y-z diagram (cross-sectional view) illustrating a schematic configuration of a battery 2700 according to the second embodiment.

The fourth insulating portion 221 may have at least one of a fourth overhang portion 221a and a fourth overhang portion 221b.

The fourth overhang portion 221a is a portion that overhangs from the fifth electroconductive portion 211 toward the side where the fourth counter electrode layer 314 is disposed (part of the fourth insulating portion 221), as illustrated in FIGS. 28 and 30.

According to the above configuration, the side faces of component members situated toward the side where the fourth counter electrode layer 314 is disposed from the fifth electroconductive portion 211 (e.g., power-generating element 310a, first electroconductive portion 111, etc.) can be covered by the fourth overhang portion 221a of the fourth insulating portion 221, while covering the side faces of component members interposed between the fifth electroconductive portion 211 and sixth electroconductive portion 212 (e.g., power-generating element 310b, power-generating element 320a, second electroconductive portion 112, etc.) by the fourth insulating portion 221. Accordingly, mutual contact between members that may exist outside of the battery (e.g., another battery, etc.), and the side faces of component members interposed between the fifth electroconductive portion 211 and sixth electroconductive portion 212, and component members situated toward the side where the fourth counter electrode layer 314 is disposed from the fifth electroconductive portion 211, can be prevented by the fourth insulating portion 221.

The fourth overhang portion 221b is a portion that overhangs from the sixth electroconductive portion 212 toward the side where the fifth electrode layer 325 is disposed (part of the fourth insulating portion 221), as illustrated in FIGS. 28 and 29.

According to the above configuration, the side faces of component members situated toward the side where the fifth electrode layer 325 is disposed from the sixth electroconductive portion 212 (e.g., power-generating element 320b, power-generating element 330a, third electroconductive portion 113, etc.) can be covered by the fourth overhang portion 221b of the fourth insulating portion 221, while covering the side faces of component members interposed between the fifth electroconductive portion 211 and sixth electroconductive portion 212 (e.g., power-generating element 310b, power-generating element 320a, sixth electroconductive portion 212, etc.) the fourth insulating portion 221. Accordingly, mutual contact between members that may exist outside of the battery (e.g., another battery, etc.), and the side faces of component members interposed between the fifth electroconductive portion 211 and sixth electroconductive portion 212, and component members situated toward the side where the fifth electrode layer 325 is disposed from the sixth electroconductive portion 212, can be prevented by the fourth insulating portion 221.

The fifth insulating portion 222 may have at least one of a fifth overhang portion 222a and a fifth overhang portion 222b.

The fifth overhang portion 222a is a portion that overhangs from the sixth electroconductive portion 212 toward the side where the fifth counter electrode layer 324 is disposed (part of the fifth insulating portion 222), as illustrated in FIGS. 28 and 30.

According to the above configuration, the side faces of component members situated toward the side where the fifth counter electrode layer 324 is disposed from the sixth electroconductive portion 212 (e.g., power-generating element 310b, power-generating element 320a, second electroconductive portion 112, etc.) can be covered by the fifth overhang portion 222a of the fifth insulating portion 222, while covering the side faces of component members interposed between the sixth electroconductive portion 212 and seventh electroconductive portion 213 (e.g., power-generating element 320b, power-generating element 330a, third electroconductive portion 113, etc.) by the fifth insulating portion 222. Accordingly, mutual contact between members that may exist outside of the battery (e.g., another battery, etc.), and the side faces of component members interposed between the sixth electroconductive portion 212 and seventh electroconductive portion 213, and component members situated toward the side where the fifth counter electrode layer 324 is disposed from the sixth electroconductive portion 212, can be prevented by the fifth insulating portion 222.

The fifth overhang portion 222b is a portion that overhangs from the seventh electroconductive portion 213 toward the side where the sixth electrode layer 335 is disposed (part of the fifth insulating portion 222), as illustrated in FIGS. 28 and 29.

According to the above configuration, the side faces of component members situated toward the side where the sixth electrode layer 335 is disposed from the seventh electroconductive portion 213 (e.g., power-generating element 330b, fourth electroconductive portion 114, etc.) can be covered by the fifth overhang portion 222b of the fifth insulating portion 222, while covering the side faces of component members interposed between the sixth electroconductive portion 212 and seventh electroconductive portion 213 (e.g., power-generating element 320b, power-generating element 330a, third electroconductive portion 113, etc.) by the fifth insulating portion 222. Accordingly, mutual contact between members that may exist outside of the battery (e.g., another battery, etc.), and the side faces of component members interposed between the sixth electroconductive portion 212 and seventh electroconductive portion 213, and component members situated toward the side where the fifth counter electrode layer 324 is disposed from the sixth electroconductive portion 212, can be prevented by the fifth insulating portion 222.

Figure 31:
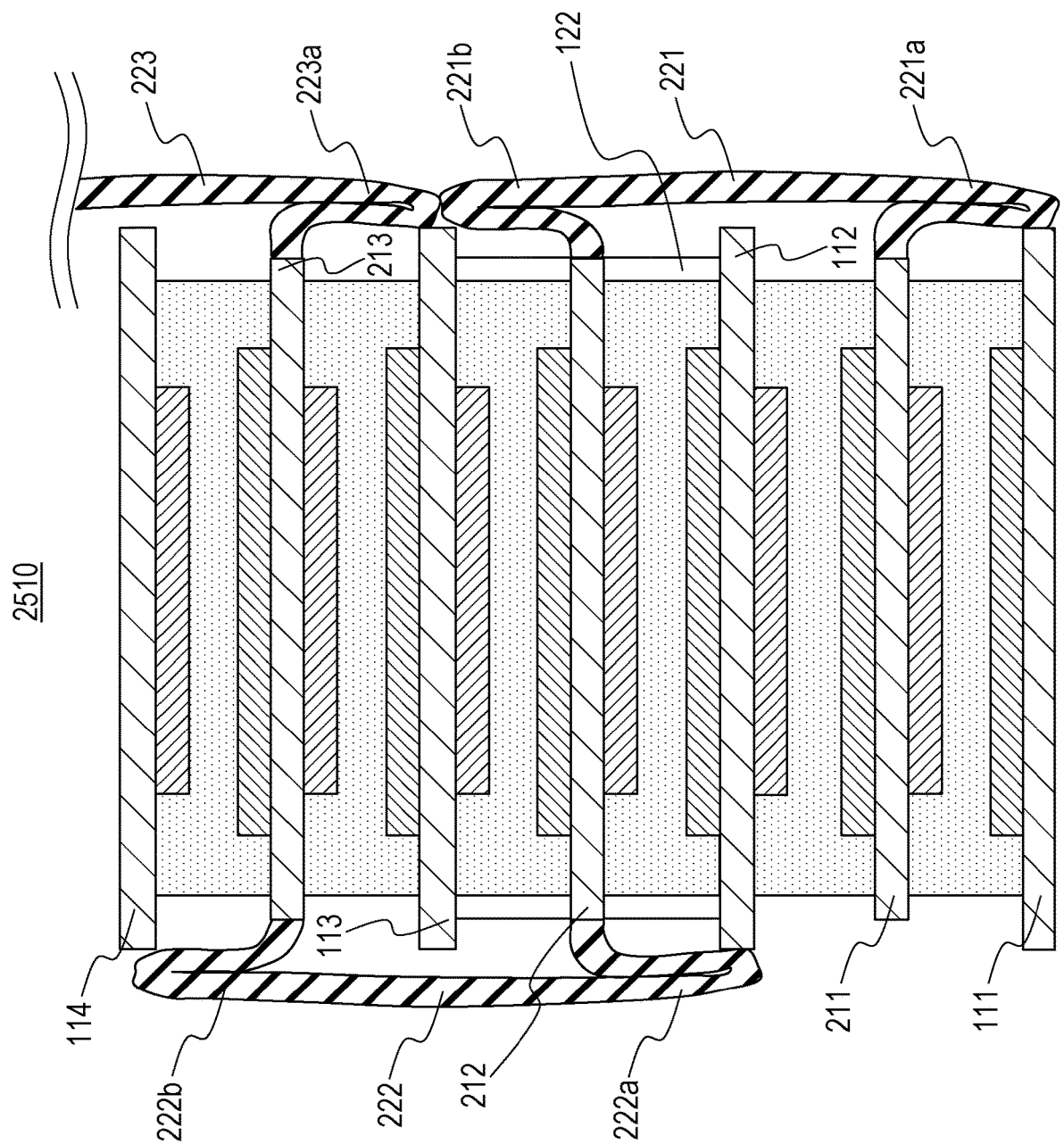
FIG. 31 is a y-z diagram (cross-sectional view) illustrating a schematic configuration of a battery according to the second embodiment.

FIG. 31 is a y-z diagram (cross-sectional view) illustrating a schematic configuration of a battery 2510 according to the second embodiment.

Figure 32:
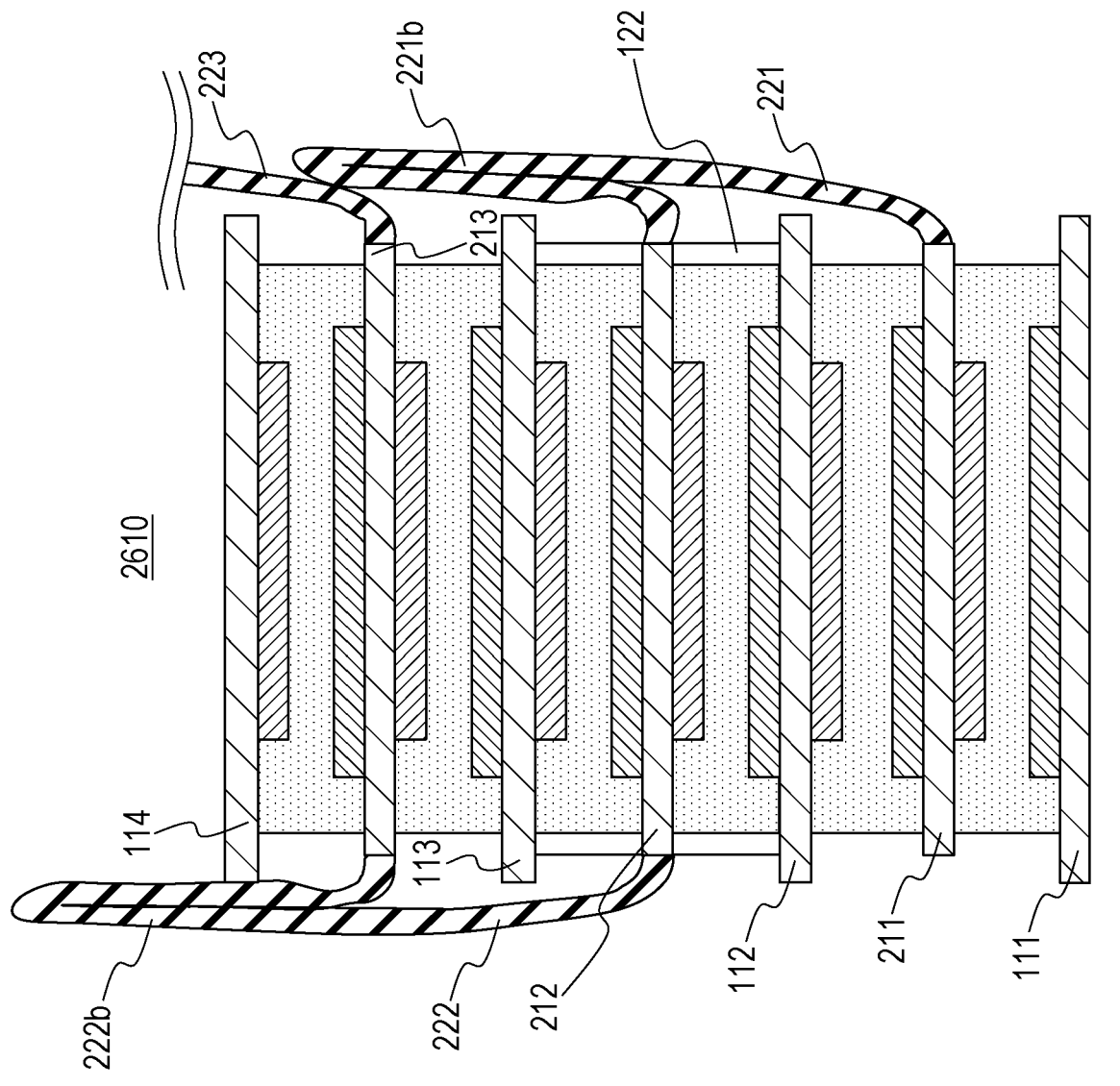
FIG. 32 is a y-z diagram (cross-sectional view) illustrating a schematic configuration of a battery according to the second embodiment.

FIG. 32 is a y-z diagram (cross-sectional view) illustrating a schematic configuration of a battery 2610 according to the second embodiment.

Figure 33:
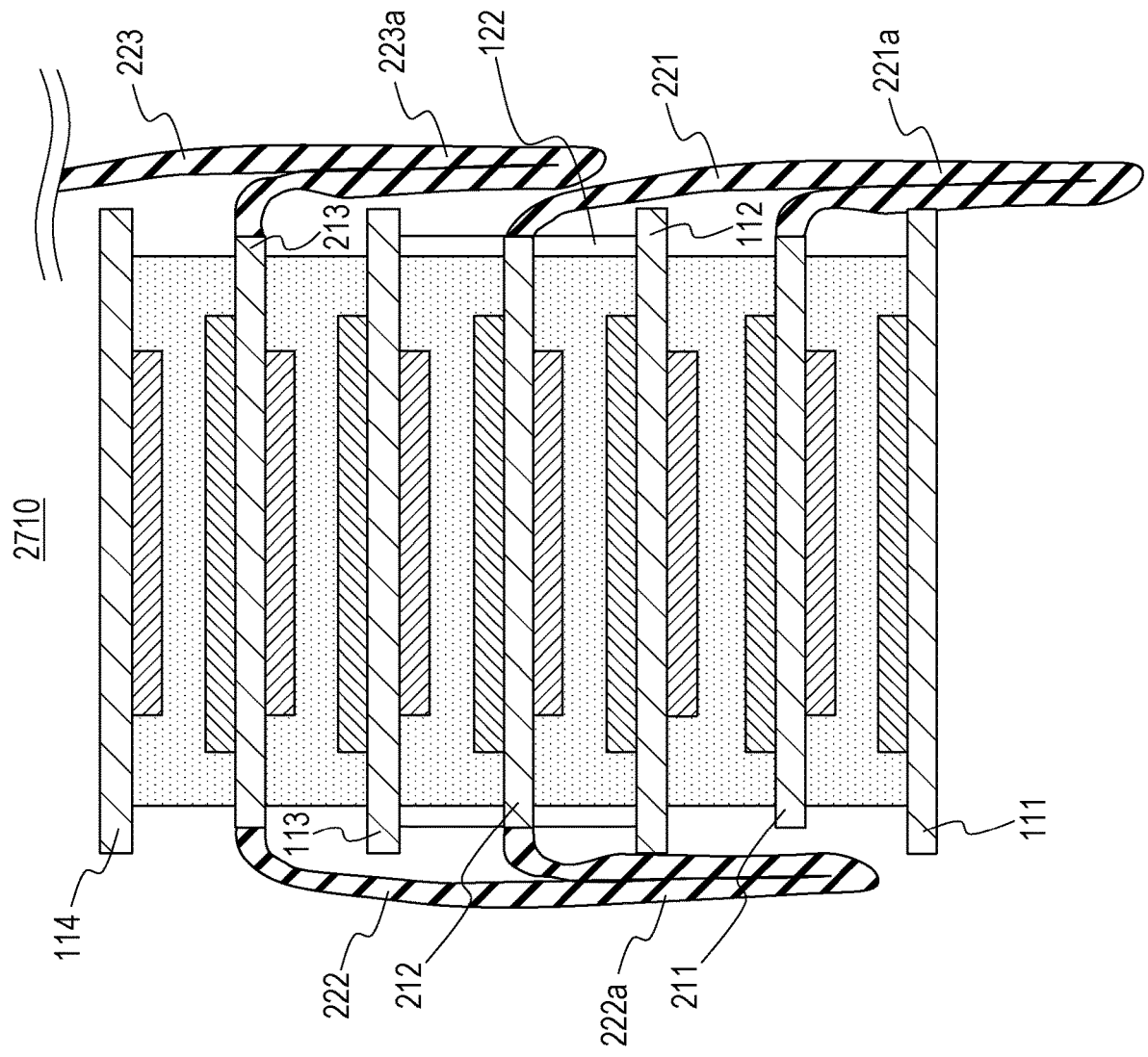
FIG. 33 is a y-z diagram (cross-sectional view) illustrating a schematic configuration of a battery according to the second embodiment.

FIG. 33 is a y-z diagram (cross-sectional view) illustrating a schematic configuration of a battery 2710 according to the second embodiment.

The second current collector 200 may have a sixth insulating portion 223 linked with the seventh electroconductive portion 213, as illustrated in FIGS. 31 through 33.

The fourth insulating portion 221 and sixth insulating portion 223 may come into contact with each other, as illustrated in FIGS. 31 through 33.

According to the above configuration, the side faces of component members interposed between the sixth electroconductive portion 212 and seventh electroconductive portion 213 (e.g., power-generating element 320b, power-generating element 330a, third electroconductive portion 113, etc.) can be covered by at least one of the fourth insulating portion 221 and sixth insulating portion 223, while covering the side faces of component members interposed between the fifth electroconductive portion 211 and sixth electroconductive portion 212 (e.g., power-generating element 310b, power-generating element 320a, second electroconductive portion 112, etc.) by the fourth insulating portion 221. In other words, of the side faces of component members interposed between the sixth electroconductive portion 212 and seventh electroconductive portion 213, side faces different from the side faces covered by the fifth insulating portion 222, can be covered by at least one of the fourth insulating portion 221 and sixth insulating portion 223. Accordingly, mutual contact between members that may exist outside of the battery (e.g., another battery, etc.), and the side faces of component members interposed between the fifth electroconductive portion 211 and seventh electroconductive portion 213 can be prevented by the fourth insulating portion 221 and sixth insulating portion 223. Even if a part of components (e.g., counter electrode material included in the power-generating element 320b or power-generating element 330a, and so forth) of the battery falls loose, the fallen component can be suppressed by the fourth insulating portion 221 and sixth insulating portion 223 from moving to another cell portion (e.g., power-generating element 320a, power-generating element 330b, etc.) within the battery or to the outside of the battery, due to part of the side of the battery being covered by the fourth insulating portion 221 and sixth insulating portion 223. Accordingly, short-circuiting within the battery due to fallen components of the battery can be suppressed. This enables the reliability of the battery to be further improved.

The sixth insulating portion 223 may have a sixth overhang portion 223a, as illustrated in FIGS. 31 and 33.

The sixth overhang portion 223a is a portion that overhangs from the sixth electroconductive portion 212 toward the side where the third counter electrode layer 332 is disposed (part of the sixth insulating portion 223), as illustrated in FIGS. 31 and 33.

Note that the fourth insulating portion 221 and sixth insulating portion 223 may come into contact with each other, by the fourth overhang portion 221b and sixth overhang portion 223a coming into contact, as illustrated in FIG. 31.

Alternatively, the fourth insulating portion 221 and sixth insulating portion 223 may come into contact with each other, by the fourth overhang portion 221b and sixth insulating portion 223 coming into contact, as illustrated in FIG. 32.

Alternatively, the fourth insulating portion 221 and sixth insulating portion 223 may come into contact with each other, by the fourth insulating portion 221 and sixth overhang portion 223a coming into contact, as illustrated in FIG. 33.

Note that the fifth electroconductive portion 211, sixth electroconductive portion 212, and seventh electroconductive portion 213 are members having electroconductivity. The configurations of the first electroconductive portion 111, second electroconductive portion 112, third electroconductive portion 113, fourth electroconductive portion 114, fifth electroconductive portion 211, sixth electroconductive portion 212, and seventh electroconductive portion 213 (e.g., thicknesses, area, shape, materials included, etc.) may be the same as each other, or may be different.

The fourth insulating portion 221, fifth insulating portion 222, and sixth insulating portion 223 are members formed of insulating material (i.e., material having no electroconductivity or sufficiently low electroconductivity). Configurations of the first insulating portion 121, second insulating portion 122, and third insulating portion 123, fourth insulating portion 221, fifth insulating portion 222, and sixth insulating portion 223 (e.g., thicknesses, area, shape, materials included, etc.) may be the same as each other, or may be different.

The fourth electrode layer 315, fifth electrode layer 325, and sixth electrode layer 335 are layers including electrode material (e.g., active material). Configurations of the first electrode layer 311, second electrode layer 321, third electrode layer 331, fourth electrode layer 315, fifth electrode layer 325, and sixth electrode layer 335 (e.g., thicknesses, area, shape, materials included, etc.) may be the same as each other, or may be different.

The fourth counter electrode layer 314, fifth counter electrode layer 324, and sixth counter electrode layer 334 are layers including counter electrode material (e.g., active material). Counter electrode material is material making up counter electrodes to the electrode material. Configurations of the first counter electrode layer 312, second counter electrode layer 322, third counter electrode layer 332, fourth counter electrode layer 314, fifth counter electrode layer 324, and sixth counter electrode layer 334 (e.g., thicknesses, area, shape, materials included, etc.) may be the same as each other, or may be different.

The fourth solid electrolyte layer 316, fifth solid electrolyte layer 326, and sixth solid electrolyte layer 336 are solid electrolyte layers including a solid electrolyte. Configurations of the first solid electrolyte layer 313, second solid electrolyte layer 323, third solid electrolyte layer 333, fourth solid electrolyte layer 316, fifth solid electrolyte layer 326, and sixth solid electrolyte layer 336 (e.g., thicknesses, area, shape, materials included, etc.) may be the same as each other, or may be different.

A manufacturing method of the battery according to the second embodiment will be described later as a third embodiment.

Note that in the first and second embodiments, part (or all) of the side faces of the laminated battery (e.g., portions further on the outer side from the insulating portions) may be covered by an insulating material (e.g., a sealant) that differs from the insulating portions. Accordingly, the serially-connected power-generating elements can be sealed more strongly. The sealant here may be a moisture-preventing laminating sheet. Thus, the sealant can prevent the power-generating elements from deteriorating due to moisture. The laminated battery may be contained within a sealing case. Commonly known battery cases (e.g., laminating sacks, metal cans, resin cases, etc.) may be used as a sealing case.

Also, the battery according to the first and second embodiments may further have a pair of external electrodes. The pair of external electrodes may protrude to the outer side of the top and bottom faces (or side faces) of the laminated battery, in a case where the entirety of the laminated battery is to be sealed by the sealant. One of the external electrodes may be connected to the first electroconductive portion 111 situated at one end of the laminated battery, for example. The other of the external electrodes may be connected to, for example, the an electroconductive portion situated at the other end of the laminated battery. This enables discharge to a load connected to the pair of external electrodes, and charging of the battery (the power-generating elements) by a charging device connected to the pair of external electrodes.

Third Embodiment

A third embodiment will be described below. Description that is redundant with that of the above-described first and second embodiments will be omitted as appropriate.

Figure 34:
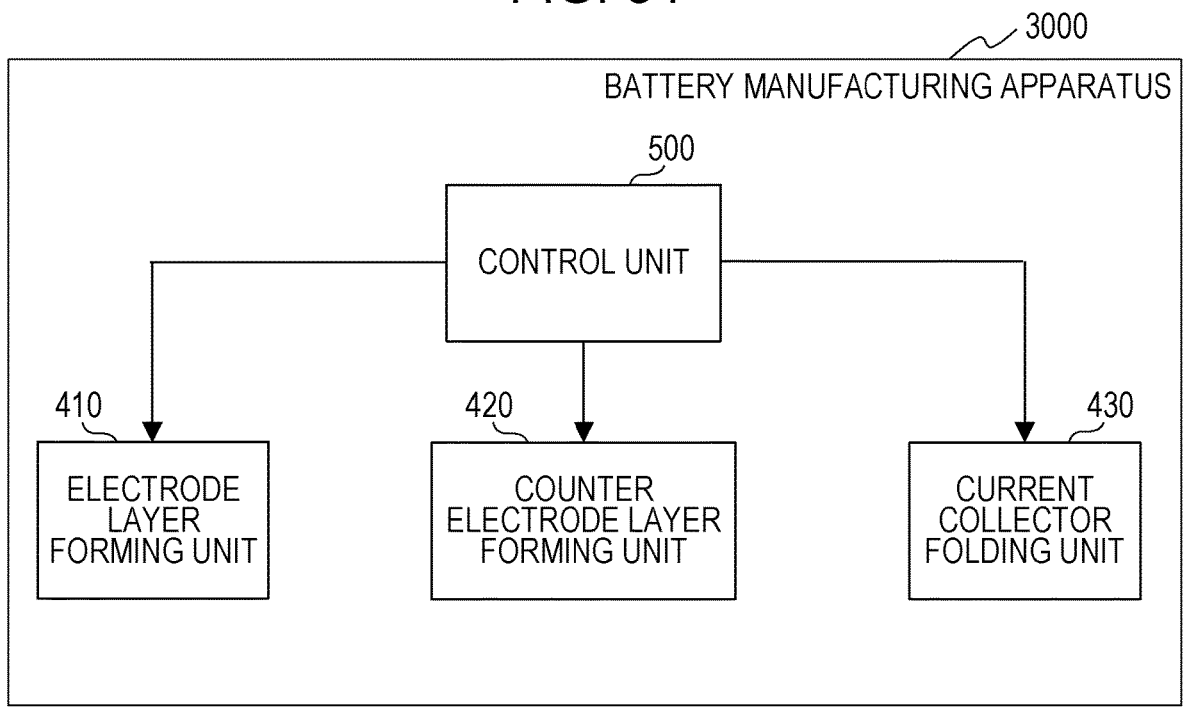
FIG. 34 is a diagram illustrating a schematic configuration of a battery manufacturing apparatus according to a third embodiment.

FIG. 34 is a diagram illustrating a schematic configuration of a battery manufacturing apparatus 3000 according to the third embodiment.

The battery manufacturing apparatus 3000 according to the third embodiment is provided with an electrode layer forming unit 410, a counter electrode layer forming unit 420, and a current collector folding unit 430.

The current collector folding unit 430 folds the first current collector 100.

The first current collector 100 has the first electroconductive portion 111, second electroconductive portion 112, and first insulating portion 121.

The first insulating portion 121 is a member linking the first electroconductive portion 111 and second electroconductive portion 112.

The electrode layer forming unit 410 forms the first electrode layer 311 in contact with the first electroconductive portion 111.

The counter electrode layer forming unit 420 forms the first counter electrode layer 312 in contact with the second electroconductive portion 112.

The first counter electrode layer 312 is a counter electrode of the first electrode layer 311.

Figure 35:
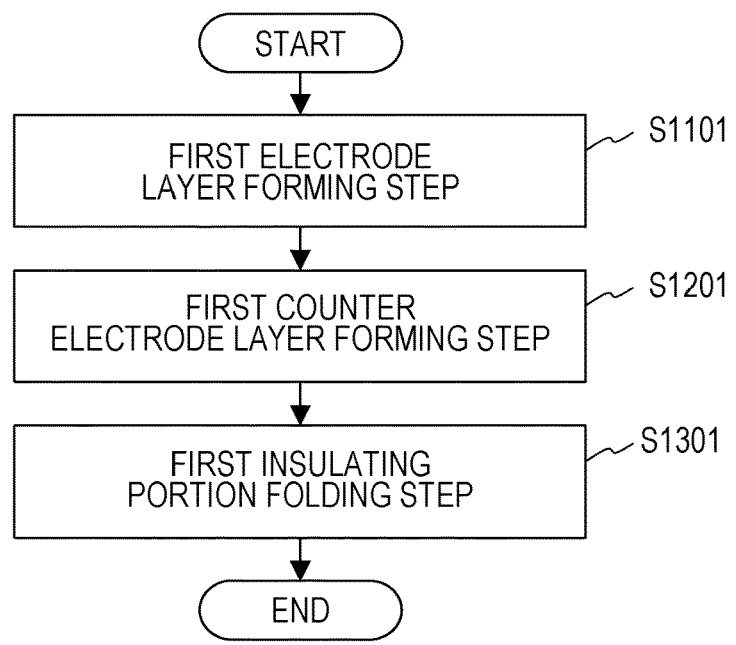
FIG. 35 is a flowchart illustrating an example of a battery manufacturing method according to the third embodiment.

FIG. 35 is a flowchart illustrating an example of a battery manufacturing method according to the third embodiment.

The battery manufacturing method according to the third embodiment is a battery manufacturing method using the battery manufacturing apparatus according to the third embodiment. For example, the battery manufacturing method according to the third embodiment is a battery manufacturing method executed at the battery manufacturing apparatus according to the third embodiment.

The battery manufacturing method according to the third embodiment includes a first electrode layer forming step S1101 (i.e., a step (a1)), a first counter electrode layer forming step S1201 (i.e., a step (b1)), and a first insulating portion folding step S1301 (i.e., a step (c1)).

The first electrode layer forming step S1101 is a step in which the first electrode layer 311 is formed in contact with the first electroconductive portion 111 by the electrode layer forming unit 410.

The first counter electrode layer forming step S1201 is a step in which the first counter electrode layer 312 is formed in contact with the second electroconductive portion 112 by the counter electrode layer forming unit 420.

The first insulating portion folding step S1301 is a step in which the first insulating portion 121 is folded by the current collector folding unit 430.

The first insulating portion folding step S1301 is a step that is executed after the first electrode layer forming step S1101 and first counter electrode layer forming step S1201.

The first electrode layer 311 and first counter electrode layer 312 are positioned facing each other, due to the first current collector 100 being folded at the first insulating portion 121 by the current collector folding unit 430 in the first insulating portion folding step S1301.

According to the above configuration, the bonding strength among the component members of the battery can be further improved. That is to say, first electrode layer 311 and first counter electrode layer 312 can each be formed on the first electroconductive portion 111 and second electroconductive portion 112 that are linked to each other by the first insulating portion 121. Accordingly, the positional relationship between the first electrode layer 311 disposed on the first electroconductive portion 111 and the first counter electrode layer 312 disposed on the second electroconductive portion 112 can be strongly maintained by the first insulating portion 121 (in other words, by the first current collector 100 that is a single component member). Accordingly, the layers (or cells) making up the battery can be prevented from exhibiting positional shifting or separation due to shock, vibration, and so forth, when manufacturing the battery, for example. Thus, yield when manufacturing the battery can be improved.

The configurations illustrated as the first current collector 100 in the above-described first and second embodiments may be used for the configuration of the first current collector 100 (e.g., materials, thicknesses, etc.) as appropriate.

Figure 36:
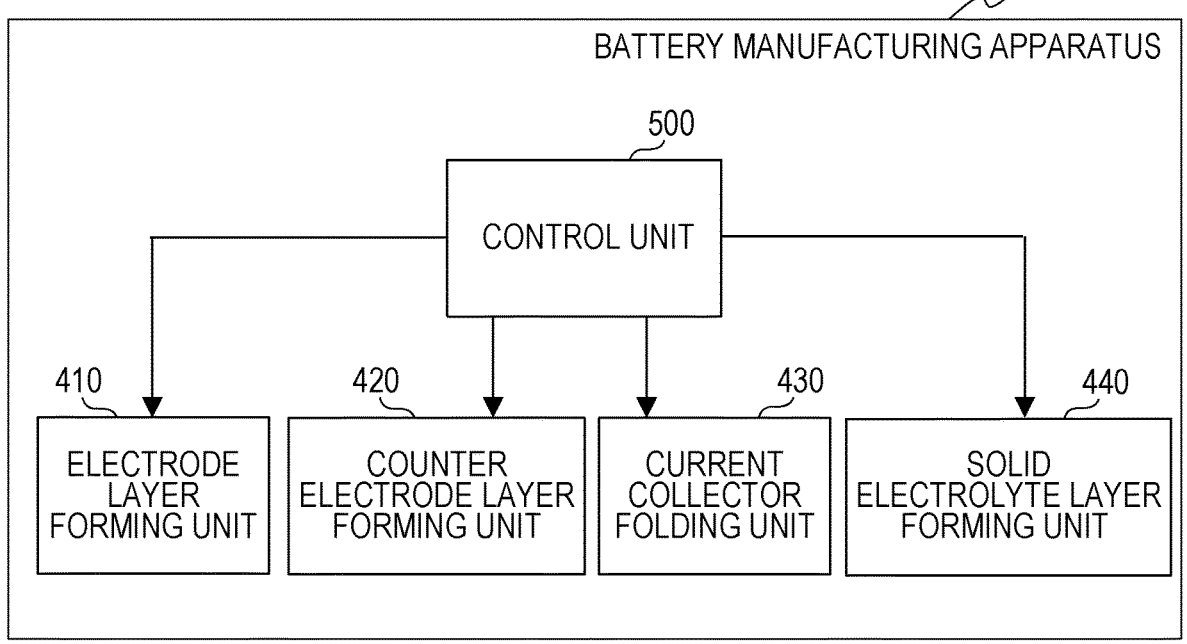
FIG. 36 is a diagram illustrating a schematic configuration of a battery manufacturing apparatus according to the third embodiment.

FIG. 36 is a diagram illustrating a schematic configuration of a battery manufacturing apparatus 3100 according to the third embodiment.

The battery manufacturing apparatus 3100 according to the third embodiment further has the following configuration, in addition to the configuration of the above-described battery manufacturing apparatus 3000 according to the third embodiment.

That is to say, the battery manufacturing apparatus 3100 according to the third embodiment is provided with a solid electrolyte layer forming unit 440.

The solid electrolyte layer forming unit 440 forms the first solid electrolyte layer 313 on at least one of the first electrode layer 311 and first counter electrode layer 312.

Figure 37:
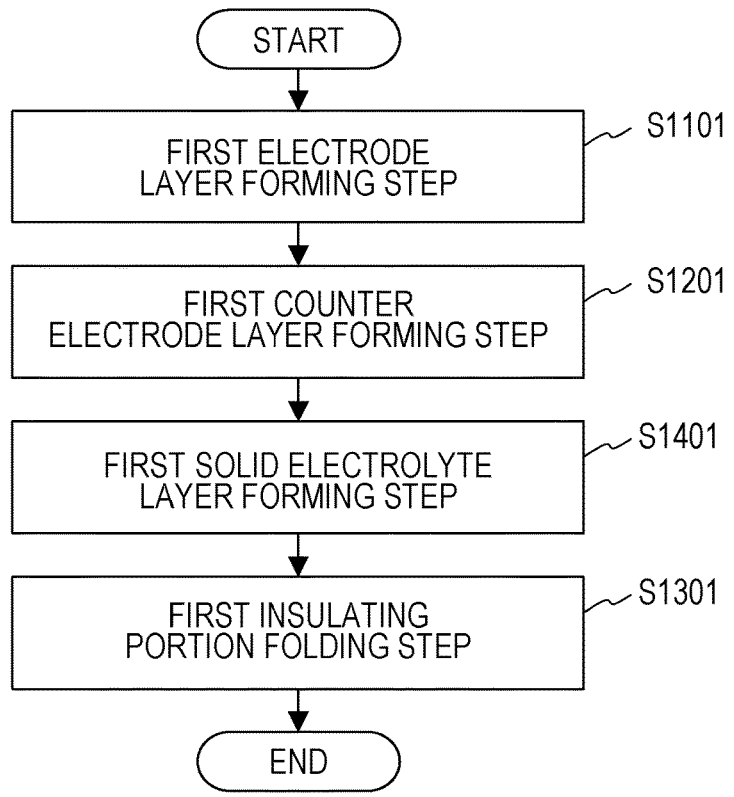
FIG. 37 is a flowchart illustrating an example of a battery manufacturing method according to the third embodiment.

FIG. 37 is a flowchart illustrating an example of a battery manufacturing method according to the third embodiment.

The battery manufacturing method illustrated in FIG. 37 further includes the following steps, in addition to the steps of the above-described battery manufacturing method illustrated in FIG. 35.

That is to say, the battery manufacturing method illustrated in FIG. 37 further includes a first solid electrolyte layer forming step S1401 (i.e., a step (f1)).

The first solid electrolyte layer forming step S1401 is a step in which the first solid electrolyte layer 313 is formed on at least one of the first electrode layer 311 and first counter electrode layer 312 by the solid electrolyte layer forming unit 440.

According to the above configuration, a solid battery cell (first power-generating element 310) can be fabricated by a convenient folding process. Thus, the first power-generating element 310 can be fabricated with suppressed positional deviation of the component members, as compared with a case of using a process of laminating a great number of individual component members.

According to the above-described manufacturing apparatus or manufacturing method, the battery 1000 according to the first embodiment can be manufactured.

Note that the first current collector 100 may have the third electroconductive portion 113 and second insulating portion 122.

The second insulating portion 122 is a member linking the second electroconductive portion 112 and third electroconductive portion 113.

The electrode layer forming unit 410 may form the second electrode layer 321 in contact with the second electroconductive portion 112 at this time.

The counter electrode layer forming unit 420 may form the second counter electrode layer 322 in contact with the third electroconductive portion 113. The second counter electrode layer 322 is a counter electrode of the second electrode layer 321.

Figure 38:
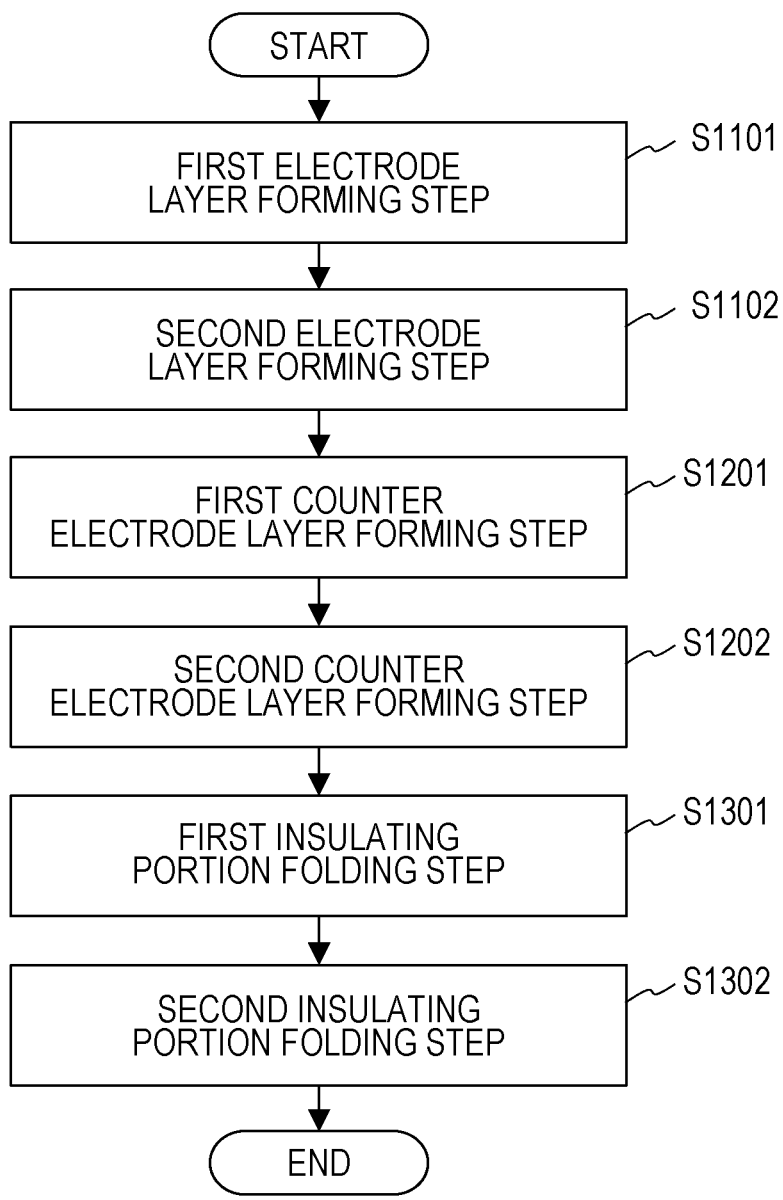
FIG. 38 is a flowchart illustrating an example of a battery manufacturing method according to the third embodiment.

FIG. 38 is a flowchart illustrating an example of a battery manufacturing method according to the third embodiment.

The battery manufacturing method illustrated in FIG. 38 further includes the following steps, in addition to the steps of the above-described battery manufacturing method illustrated in FIG. 35.

That is to say, the battery manufacturing method illustrated in FIG. 38 further includes a second electrode layer forming step S1102 (i.e., a step (a2)), a second counter electrode layer forming step S1202 (i.e., a step (b2)), and a second insulating portion folding step S1302 (i.e., a step (c2)).

The second electrode layer forming step S1102 is a step in which the second electrode layer 321 is formed in contact with the second electroconductive portion 112 by the electrode layer forming unit 410.

The second counter electrode layer forming step S1202 is a step in which the second counter electrode layer 322 is formed in contact with the third electroconductive portion 113 by the counter electrode layer forming unit 420.

The second insulating portion folding step S1302 is a step in which the second insulating portion 122 is folded by the current collector folding unit 430.

The second insulating portion folding step S1302 is a step that is executed after the second electrode layer forming step S1102 and second counter electrode layer forming step S1202.

The second electrode layer 321 and second counter electrode layer 322 are positioned facing each other, due to the first current collector 100 being folded at the second insulating portion 122 by the current collector folding unit 430 in the second insulating portion folding step S1302.

According to the above configuration, the bonding strength among the component members of the battery can be further improved. That is to say, the second electrode layer 321 and second counter electrode layer 322 can each be formed on the second electroconductive portion 112 and third electroconductive portion 113 that are linked to each other by the second insulating portion 122. Accordingly, the positional relationship between the second electrode layer 321 disposed on the second electroconductive portion 112 and the second counter electrode layer 322 disposed on the third electroconductive portion 113 can be strongly maintained by the second insulating portion 122 (in other words, by the first current collector 100 that is a single component member). Accordingly, the layers (e.g., second electrode layer 321 and second counter electrode layer 322) making up the battery can be prevented from exhibiting positional shifting or separation due to shock, vibration, and so forth, when manufacturing the battery, for example.

According to the above configuration, a laminated battery, where electrodes having a bipolar structure have been laminated, can be fabricated by a convenient folding process. That is to say, a laminated battery where power-generating elements are serially laminated can be fabricated by the step of folding at the first insulating portion 121 and second insulating portion 122 of the first current collector 100 where bipolar-structure electrodes (e.g., electrodes fabricated by the steps of forming the counter electrode layers and electrode layers on the first current collector 100) have been provided. Thus, a serial-structure laminated battery can be fabricated more conveniently and less expensively as compared to a case of using a process of laminating multiple individually separated bipolar-structure electrodes, while suppressing positional deviation of the component members.

Note that the solid electrolyte layer forming unit 440 may form the second solid electrolyte layer 323 on at least one of the second electrode layer 321 and second counter electrode layer 322.

Figure 39:
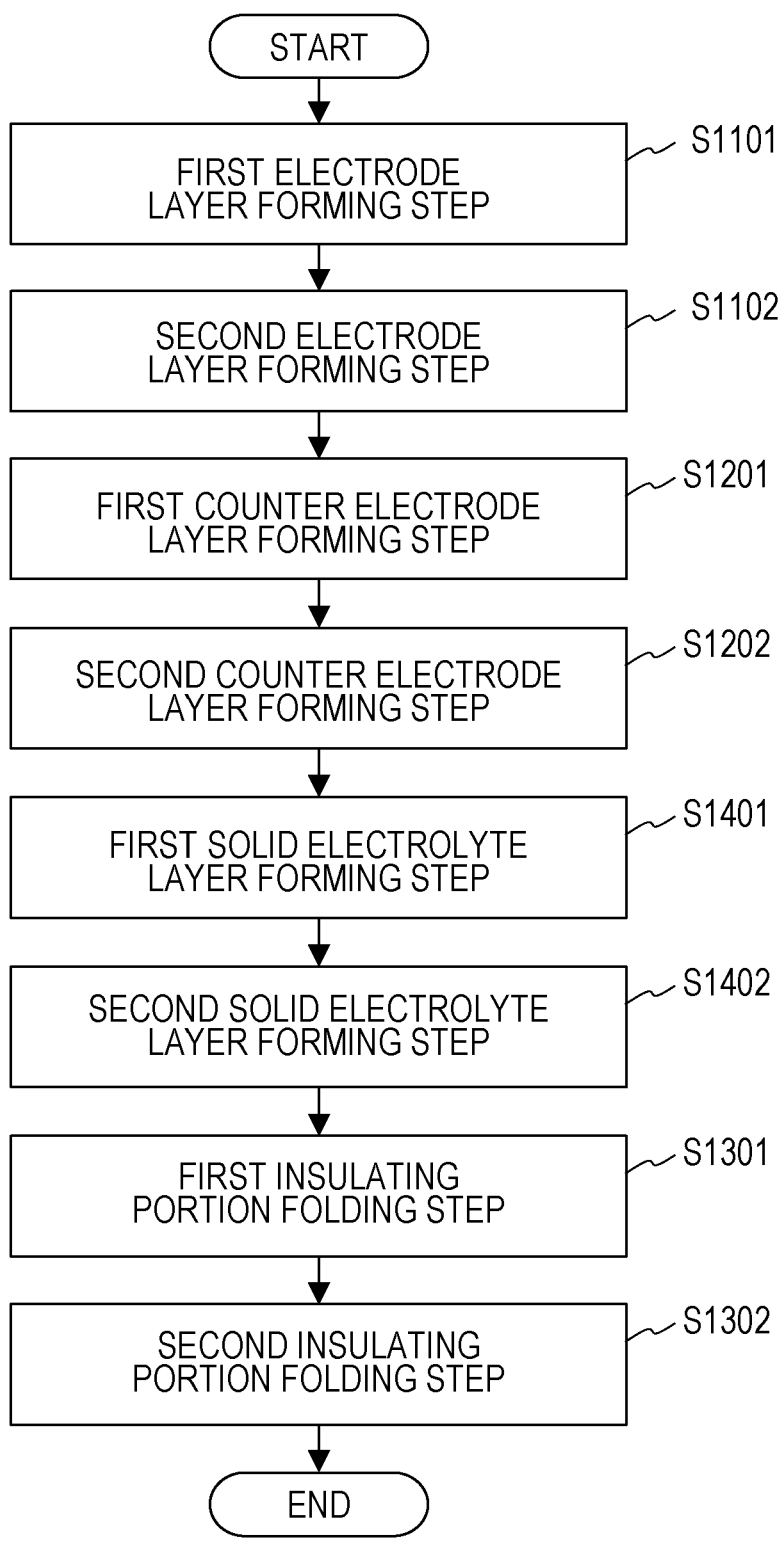
FIG. 39 is a flowchart illustrating an example of a battery manufacturing method according to the third embodiment.

FIG. 39 is a flowchart illustrating an example of a battery manufacturing method according to the third embodiment.

The battery manufacturing method illustrated in FIG. 39 further includes the following steps, in addition to the steps of the above-described battery manufacturing method illustrated in FIG. 38.

That is to say, the battery manufacturing method illustrated in FIG. 39 further includes the above-described first solid electrolyte layer forming step S1401, and a second solid electrolyte layer forming step S1402 (i.e., a step (f2)).

The second solid electrolyte layer forming step S1402 is a step in which the second solid electrolyte layer 323 is formed on at least one of the second electrode layer 321 and second counter electrode layer 322 by the solid electrolyte layer forming unit 440.

According to the above configuration, the solid battery cells (first power-generating element 310 and second power-generating element 320) can be fabricated by a convenient folding process. Thus, a laminated battery where the multiple solid battery cells (first power-generating element 310 and second power-generating element 320) have been serially laminated can be fabricated with suppressed positional deviation of the component members, as compared with a case of using a process of laminating a great number of individual component members.

According to the above-described manufacturing apparatus or manufacturing method, the battery 1100 according to the first embodiment can be manufactured.

Note that the first current collector 100 may have the fourth electroconductive portion 114 and third insulating portion 123.

The third insulating portion 123 is a member linking the third electroconductive portion 113 and fourth electroconductive portion 114.

The electrode layer forming unit 410 may form the third electrode layer 331 in contact with the third electroconductive portion 113 at this time.

The counter electrode layer forming unit 420 may form the third counter electrode layer 332 in contact with the fourth electroconductive portion 114. The third counter electrode layer 332 is a counter electrode of the third electrode layer 331.

Figure 40:
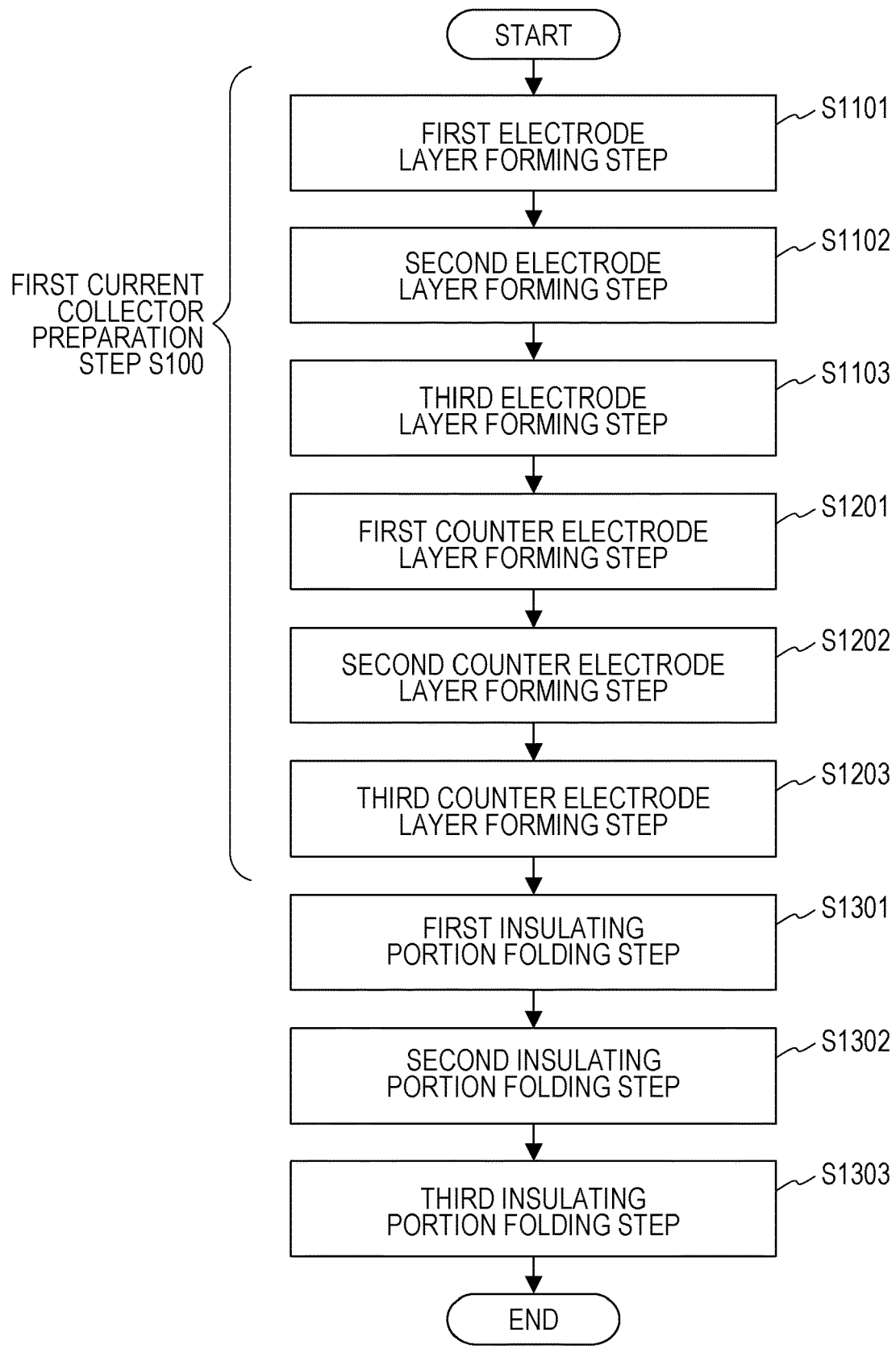
FIG. 40 is a flowchart illustrating an example of a battery manufacturing method according to the third embodiment.

FIG. 40 is a flowchart illustrating an example of a battery manufacturing method according to the third embodiment.

The battery manufacturing method illustrated in FIG. 40 further includes the following steps, in addition to the steps of the above-described battery manufacturing method illustrated in FIG. 38.

That is to say, the battery manufacturing method illustrated in FIG. 40 further includes a third electrode layer forming step S1103 (i.e., a step (a3)), a third counter electrode layer forming step S1203 (i.e., a step (b3)), and a third insulating portion folding step S1303 (i.e., a step (c3)).

The third electrode layer forming step S1103 is a step in which the third electrode layer 331 is formed in contact with the third electroconductive portion 113 by the electrode layer forming unit 410.

The third counter electrode layer forming step S1203 is a step in which the third counter electrode layer 332 is formed in contact with the fourth electroconductive portion 114.

The third insulating portion folding step S1303 is a step in which the third insulating portion 123 is folded by the current collector folding unit 430.

The third insulating portion folding step S1303 is a step that is executed after the third electrode layer forming step S1103 and third counter electrode layer forming step S1203.

The third electrode layer 331 and third counter electrode layer 332 are positioned facing each other, due to the first current collector 100 being folded at the third insulating portion 123 by the current collector folding unit 430 in the third insulating portion folding step S1303.

According to the above configuration, the bonding strength among the component members of the battery can be further improved. That is to say, third electrode layer 331 and third counter electrode layer 332 can each be formed on the third electroconductive portion 113 and fourth electroconductive portion 114 that are linked to each other by the third insulating portion 123. Accordingly, the positional relationship between the third electrode layer 331 disposed on the third electroconductive portion 113 and the third counter electrode layer 332 disposed on the fourth electroconductive portion 114 can be strongly maintained by the third insulating portion 123 (in other words, by the first current collector 100 that is a single component member). Accordingly, the layers (e.g., the third electrode layer 331 and third counter electrode layer 332) making up the battery can be prevented from exhibiting positional shifting or separation due to shock, vibration, and so forth, when manufacturing the battery, for example.

According to the above configuration, a laminated battery, where electrodes having a bipolar structure have been laminated, can be fabricated by a convenient folding process. That is to say, a laminated battery where power-generating elements are serially laminated can be fabricated by the step of folding at the first insulating portion 121, second insulating portion 122, and third insulating portion 123 of the first current collector 100 where bipolar-structure electrodes (e.g., electrodes fabricated by the steps of forming the counter electrode layers and electrode layers on the first current collector 100) have been provided. Thus, a serial-structure laminated battery can be fabricated more conveniently and less expensively as compared to a case of using a process of laminating multiple individually-separated bipolar-structure electrodes, while suppressing positional deviation of the component members.

Note that the solid electrolyte layer forming unit 440 may form the second third solid electrolyte layer 333 on at least one of the third electrode layer 331 and third counter electrode layer 332.

Figure 41:
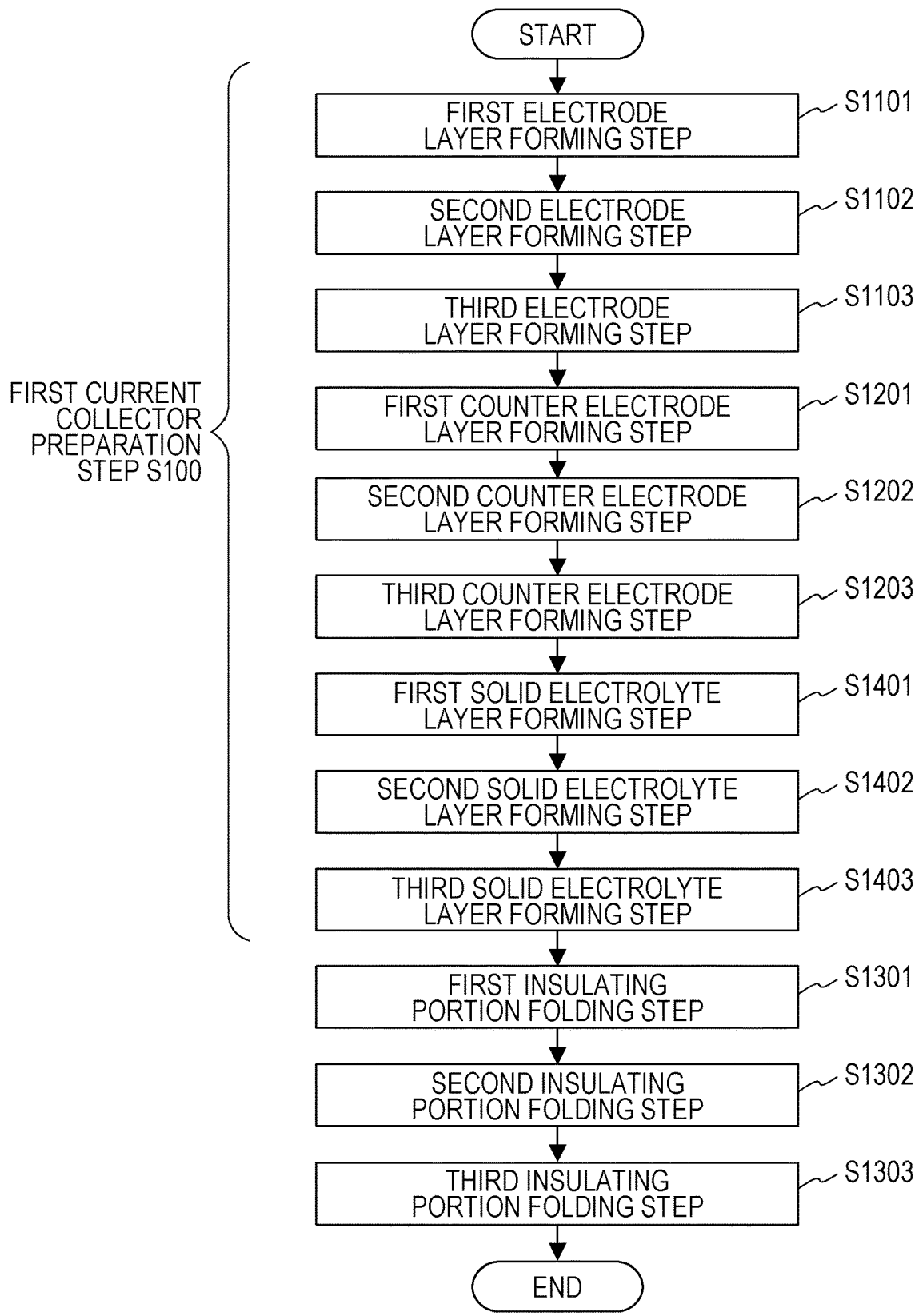
FIG. 41 is a flowchart illustrating an example of a battery manufacturing method according to the third embodiment.

FIG. 41 is a flowchart illustrating an example of a battery manufacturing method according to the third embodiment.

The battery manufacturing method illustrated in FIG. 41 further includes the following steps, in addition to the steps of the above-described battery manufacturing method illustrated in FIG. 39.

That is to say, the battery manufacturing method illustrated in FIG. 41 further includes the above-described first solid electrolyte layer forming step S1401, the above-described second solid electrolyte layer forming step S1402, and a third solid electrolyte layer forming step S1403 (i.e., a step (f3)).

The third solid electrolyte layer forming step S1403 is a step in which the third solid electrolyte layer 333 is formed on at least one of the third electrode layer 331 and third counter electrode layer 332 by the solid electrolyte layer forming unit 440.

According to the above configuration, the solid battery cells (first power-generating element 310, second power-generating element 320, and third power-generating element 330) can be fabricated by a convenient folding process. Thus, a laminated battery where the multiple solid battery cells (i.e., first power-generating element 310, second power-generating element 320 and third power-generating element 330) have been serially laminated can be fabricated with suppressed positional deviation of the component members, as compared with a case of using a process of laminating a great number of individual component members.

According to the above-described manufacturing apparatus or manufacturing method, the battery 1200 according to the first embodiment can be manufactured.

A specific example of the battery manufacturing method according to the third embodiment will be described below.

First, an example of a first current collector preparation step S100 will be described.

The first current collector preparation step S100 is a step encompassing the first electrode layer forming step S1101, second electrode layer forming step S1102, third electrode layer forming step S1103, first counter electrode layer forming step S1201, second counter electrode layer forming step S1202, and third counter electrode layer forming step S1203, as illustrated in FIG. 40.

Note that the first current collector preparation step S100 may further encompass the first solid electrolyte layer forming step S1401, second solid electrolyte layer forming step S1402, and third solid electrolyte layer forming step S1403, as illustrated in FIG. 41.

Figure 42:
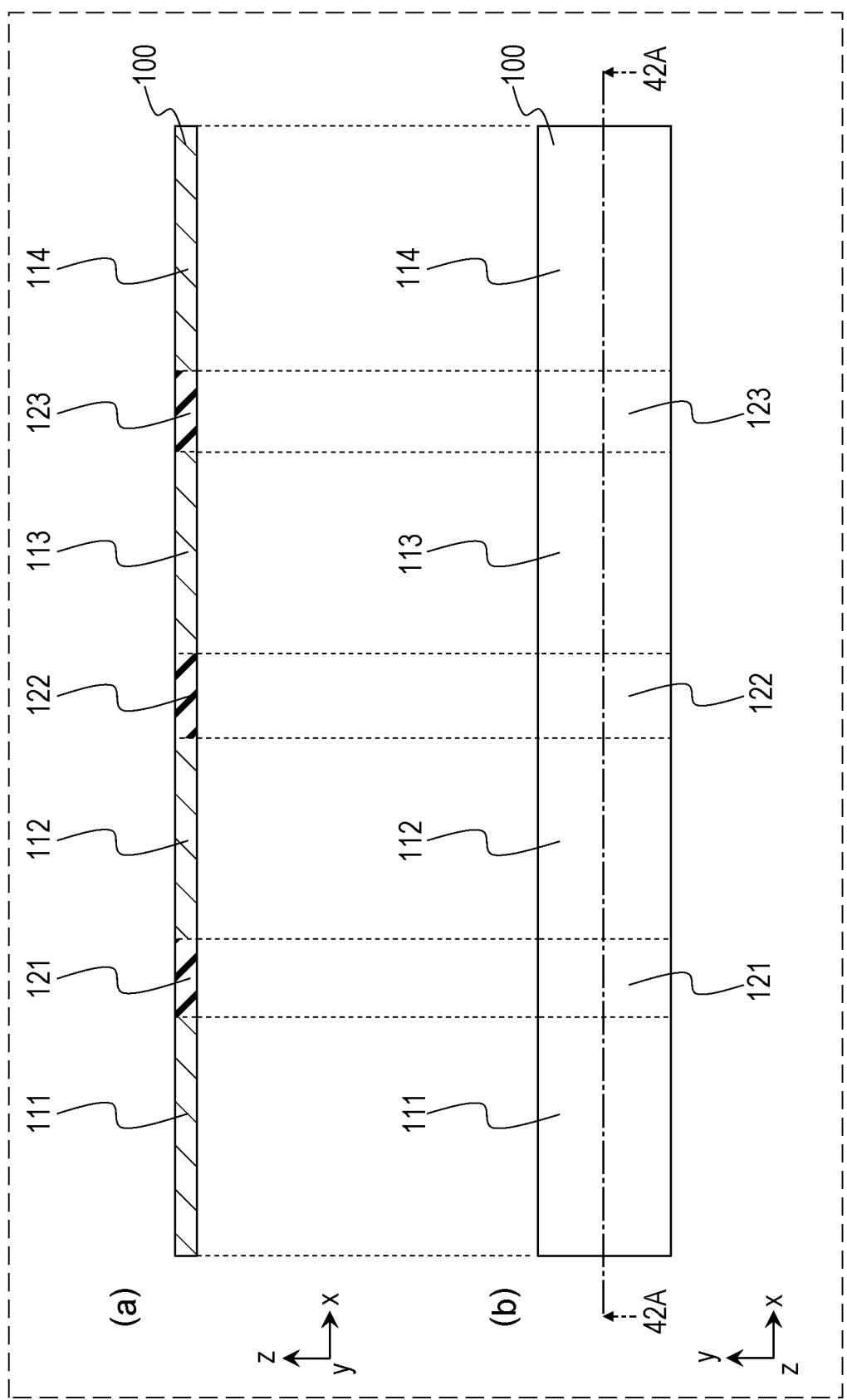
FIG. 42 is a diagram illustrating a schematic configuration of an example of a first current collector according to the third embodiment.

FIG. 42 is a diagram illustrating a schematic configuration of an example of the first current collector 100 according to the third embodiment.

Indicated by (a) in FIG. 42 is an x-z diagram (cross-sectional view taken along 42A in FIG. 42) illustrating a schematic configuration of an example of the first current collector 100 according to the third embodiment.

Indicated by (b) in FIG. 42 is an x-y diagram (plan view) illustrating a schematic configuration of an example of the first current collector 100 according to the third embodiment.

Figure 43:
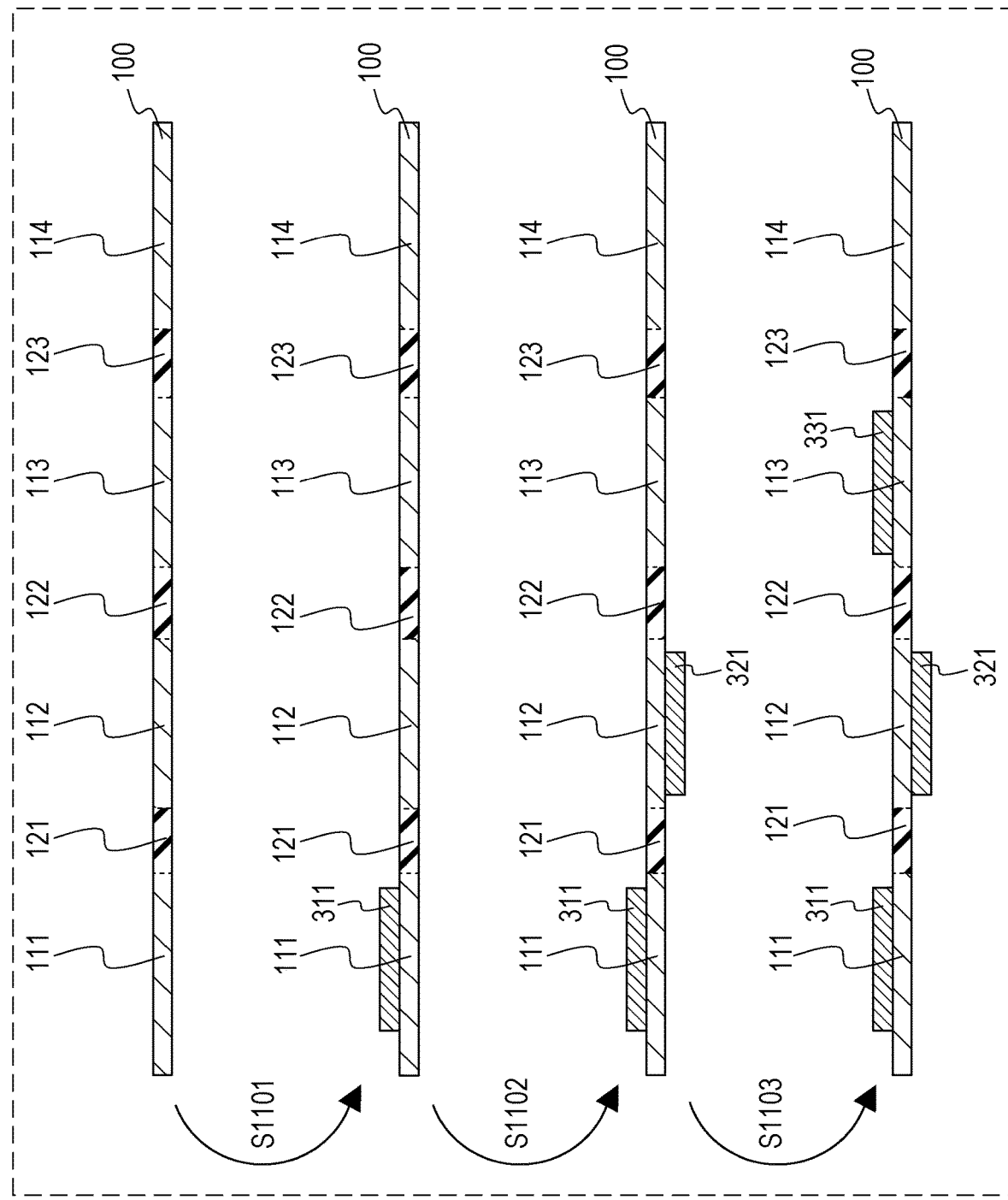
FIG. 43 is a diagram illustrating an example of a first electrode layer forming step, a second electrode layer forming step, and a third electrode layer forming step.

FIG. 43 is a diagram illustrating an example of the first electrode layer forming step S1101, second electrode layer forming step S1102, and third electrode layer forming step S1103.

The first electrode layer 311 and third electrode layer 331 are each formed in contact with one principal face (e.g., the front face) of the first current collector 100, by the first electrode layer forming step S1101 and third electrode layer forming step S1103 being performed.

The second electrode layer 321 is formed in contact with the other principal face (e.g., the rear face) of the first current collector 100, by the second electrode layer forming step S1102 being performed.

The electrode layer forming unit 410 may apply a coating material (a paste-like coating agent, in which the electrode materials making up the electrode layers have been kneaded with a solvent) on a principal face of the first current collector 100 prepared beforehand. The coating material may then be dried. The coating material may be pressed after drying. This enables the density of the material of the electrode layers to be increased.

Note that the order in which the first electrode layer forming step S1101, second electrode layer forming step S1102, and third electrode layer forming step S1103 are executed may be optionally decided.

Thus, the electrode layers may be intermittently formed, having a regularity, on the principal face of the first current collector 100. For example, the electrode layers may be formed in rectangular regions at predetermined intervals, as illustrated in FIG. 43.

Figure 44:
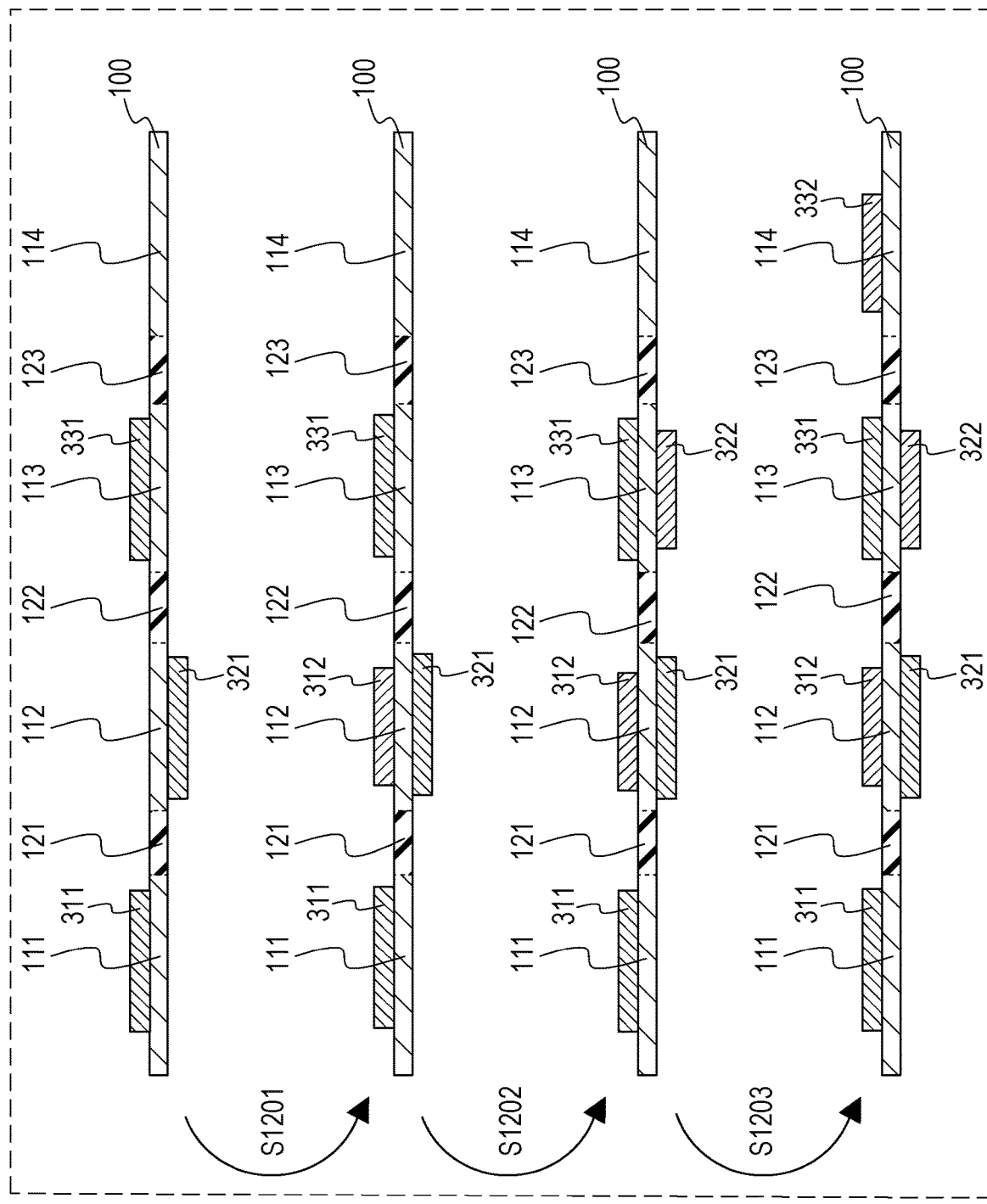
FIG. 44 is a diagram illustrating an example of a first counter electrode layer forming step, a second counter electrode layer forming step, and a third counter electrode layer forming step.

FIG. 44 is a diagram illustrating an example of the first counter electrode layer forming step S1201, second counter electrode layer forming step S1202, and third counter electrode layer forming step S1203.

The first counter electrode layer 312 and third counter electrode layer 332 are each formed in contact with one principal face (e.g., the front face) of the first current collector 100, by the first counter electrode layer forming step S1201 and third counter electrode layer forming step S1203 being performed.

The second counter electrode layer 322 is formed in contact with the other principal face (e.g., the rear face) of the first current collector 100, by the second counter electrode layer forming step S1202 being performed.

The counter electrode layer forming unit 420 may apply a coating material (i.e., a paste-like coating agent, in which the counter electrode materials making up the counter electrode layers have been kneaded with a solvent) on a principal face of the first current collector 100 prepared beforehand, for example. The coating material may then be dried. The coating material may be pressed after drying. This enables the density of the material of the counter electrode layers to be increased.

Note that the order in which the first counter electrode layer forming step S1201, second counter electrode layer forming step S1202, and third counter electrode layer forming step S1203 are executed may be optionally decided.

Thus, the counter electrode layers may be intermittently formed, having a regularity, on the principal face of the first current collector 100. For example, the counter electrode layers may be formed in rectangular regions at predetermined intervals, as illustrated in FIG. 44.

Note that the first counter electrode layer forming step S1201, second counter electrode layer forming step S1202, and third counter electrode layer forming step S1203 may be executed before the first electrode layer forming step S1101, second electrode layer forming step S1102, and third electrode layer forming step S1103, or after.

Figure 45:
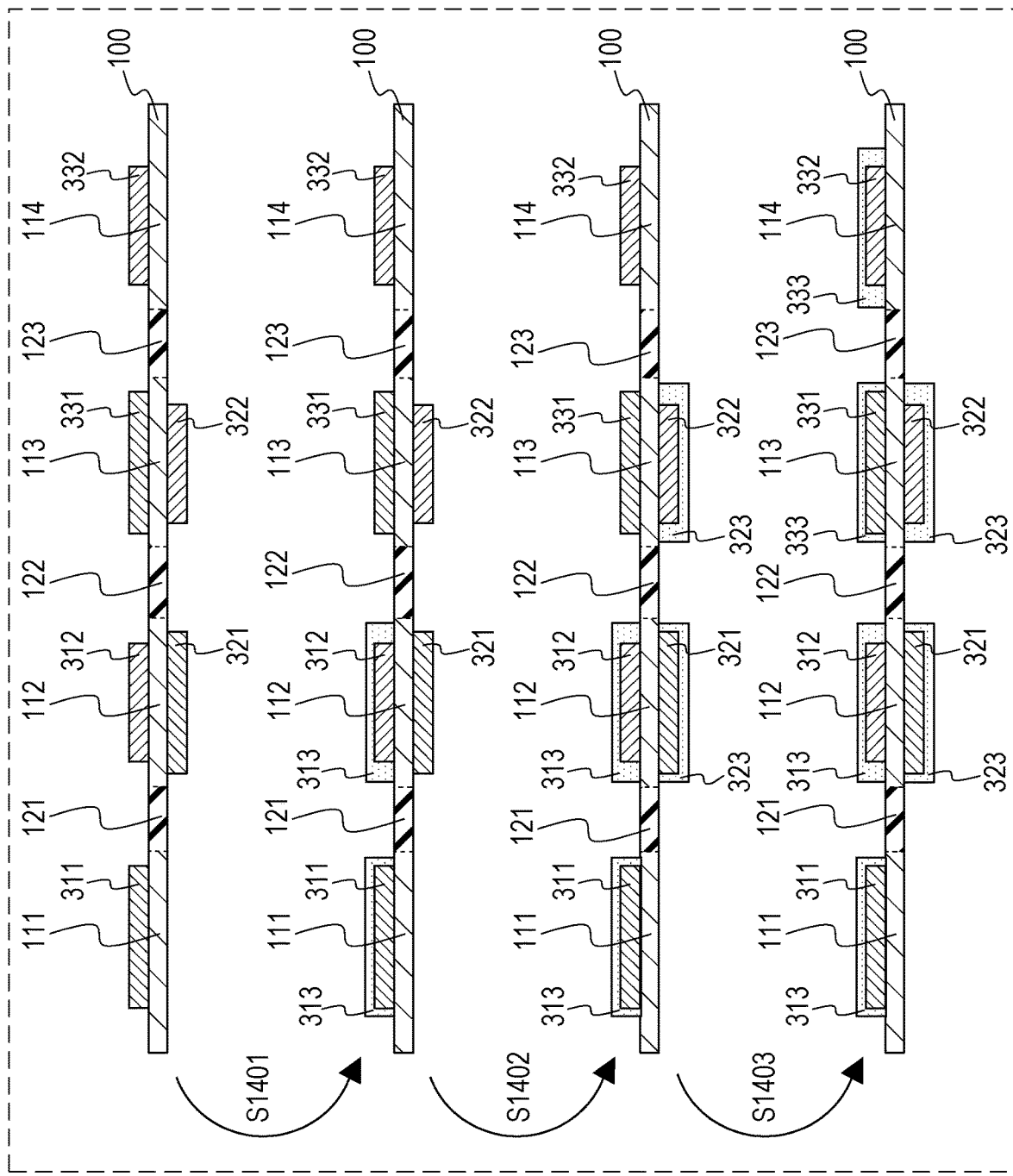
FIG. 45 is a diagram illustrating an example of a first solid electrolyte layer forming step, a second solid electrolyte layer forming step, and a third solid electrolyte layer forming step.

FIG. 45 is a diagram illustrating an example of the first solid electrolyte layer forming step S1401, second solid electrolyte layer forming step S1402, and third solid electrolyte layer forming step S1403.

The solid electrolyte layer forming unit 440 may apply a coating material (i.e., a paste-like coating agent, in which the materials making up the solid electrolyte layers have been kneaded with a solvent) on at least one of the counter electrode layers and the electrode layers. The coating material may then be dried. The coating material may be pressed after drying. This enables the density of the material of the solid electrolyte layers to be increased.

Note that in the first solid electrolyte layer forming step S1401, the first solid electrolyte layer 313 may be formed over a greater area than the first electrode layer 311 and third electrode layer 331, as illustrated in FIG. 45. Accordingly, the first solid electrolyte layer 313 can be disposed in contact with the first electroconductive portion 111 and second electroconductive portion 112.

Also, in the second solid electrolyte layer forming step S1402, the second solid electrolyte layer 323 may be formed over a greater area than the second electrode layer 321 and second counter electrode layer 322, as illustrated in FIG. 45. Accordingly, the second solid electrolyte layer 323 can be disposed in contact with the second electroconductive portion 112 and third electroconductive portion 113.

Also, in the third solid electrolyte layer forming step S1403, the third solid electrolyte layer 333 may be formed over a greater area than the third electrode layer 331 and third counter electrode layer 332, as illustrated in FIG. 45. Accordingly, the third solid electrolyte layer 333 can be disposed in contact with third electroconductive portion 113 and fourth electroconductive portion 114.

Note that the order in which the first solid electrolyte layer forming step S1401, second solid electrolyte layer forming step S1402, and third solid electrolyte layer forming step S1403 are executed may be optionally decided.

Note that the solid electrolyte layers may be formed on both the electrode layers and counter electrode layers due to the solid electrolyte layer forming steps being executed, as illustrated in FIG. 45. In this case, the solid electrolyte layer forming steps are executed after the electrode layer forming steps and counter electrode layer forming steps.

FIGS. 46A through 46C are x-z diagrams (cross-sectional views) illustrating schematic configurations of the first current collector 100 where electrode layers, counter electrode layers, and solid electrolyte layers have been formed.

The solid electrolyte layers may be formed only on the electrode layers due to the solid electrolyte layer forming steps being executed, as illustrated in FIG. 46A. In this case, the solid electrolyte layer forming steps are executed after the electrode layer forming steps.

Alternatively, the solid electrolyte layers may be formed only on the counter electrode layers due to the solid electrolyte layer forming steps being executed, as illustrated in FIG. 46B. In this case, the solid electrolyte layer forming steps are executed after counter electrode layer forming steps.

Alternatively, the solid electrolyte layers may be formed on both the electrode layers and counter electrode layers, and moreover upon the electroconductive portions and the insulating portions, due to the solid electrolyte layer forming steps being executed, as illustrated in FIG. 46C. In this case, the solid electrolyte layer forming steps are executed after the electrode layer forming steps and counter electrode layer forming steps. Thus, the solid electrolyte layers can be consecutively formed. Accordingly, the steps of forming the solid electrolyte layers can be further simplified. Moreover, in a case where the material making up the first solid electrolyte layer 313 and the third solid electrolyte layer 333 is the same (i.e., the coating material to become the first solid electrolyte layer 313 and the third solid electrolyte layer 333 is the same), the first solid electrolyte layer forming step S1401 and third solid electrolyte layer forming step S1403 may be executed consecutively. This enables the steps for forming the solid electrolyte layers to be further simplified.

In a case where the solid electrolyte layers are non-continuously formed, as illustrated in FIGS. 46A and 46B, the amount of material being coated can be reduced. Further, by not coating the solid electrolyte layers on the insulating portions, cracks occur less readily in the solid electrolyte layers when folding at the insulating portions.

Figure 47:
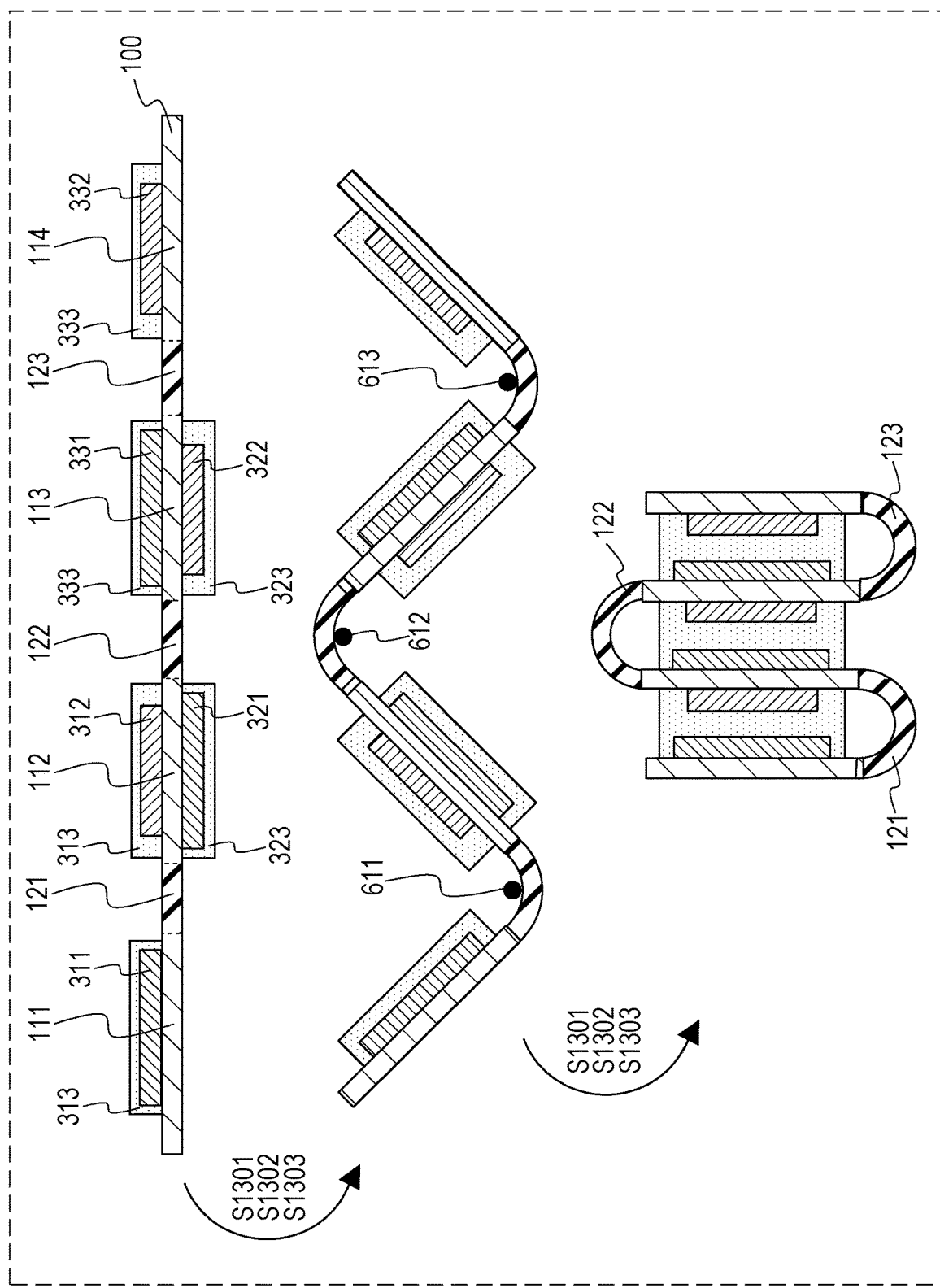
FIG. 47 is an x-z diagram (cross-sectional view) illustrating an example of a first insulating portion folding step, a second insulating portion folding step, and a third insulating portion folding step.

FIG. 47 is an x-z diagram (cross-sectional view) illustrating an example of the first insulating portion folding step S1301, second insulating portion folding step S1302, and third insulating portion folding step S1303.

The current collector folding unit 430 may have a first folding member 611, a second folding member 612, and a third folding member 613 (e.g., rod members, wire members, etc.), for example. The current collector folding unit 430 may at this time apply the folding members against the insulating portions, and move at least one of the first current collector 100 and the folding members, thereby folding at the insulating portion.

The order of executing the first insulating portion folding step S1301, second insulating portion folding step S1302, and third insulating portion folding step S1303 may be optionally decided.

For example, first insulating portion folding step S1301, second insulating portion folding step S1302, and third insulating portion folding step S1303 may be executed at the same time, as illustrated in FIG. 47.

Figure 48:
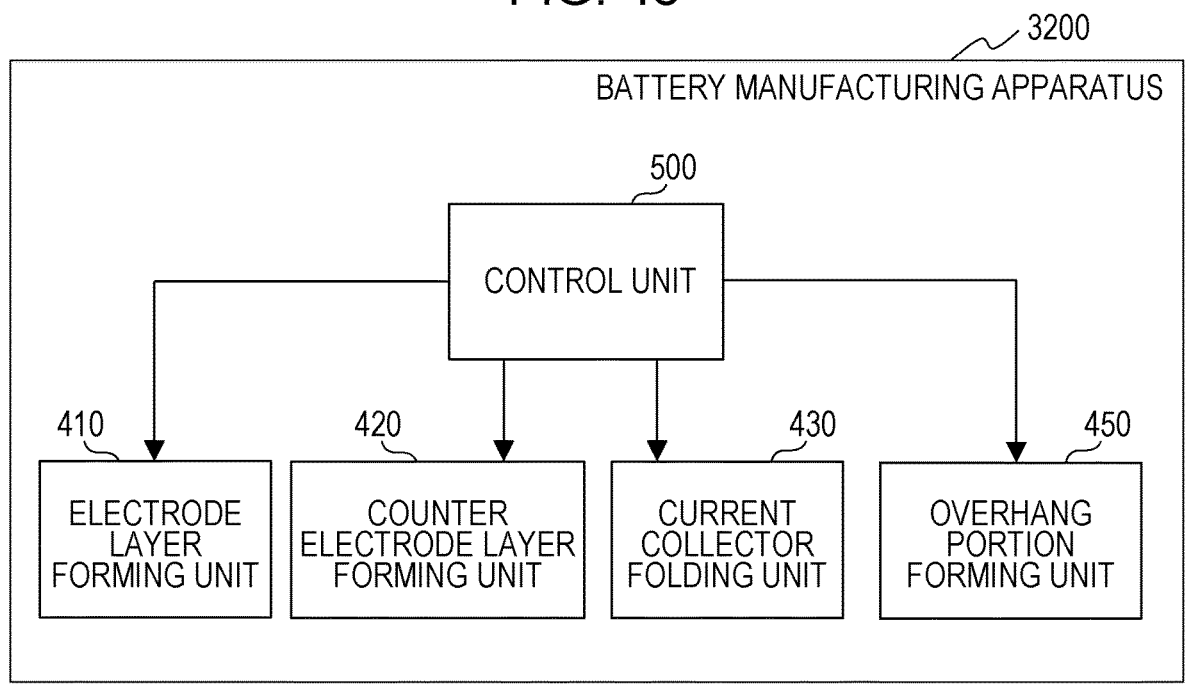
FIG. 48 is a diagram illustrating a schematic configuration of a battery manufacturing apparatus according to the third embodiment.

FIG. 48 is a diagram illustrating a schematic configuration of a battery manufacturing apparatus 3200 according to the third embodiment.

The battery manufacturing apparatus 3200 according to the third embodiment further has, in addition to the configuration of the above-described battery manufacturing apparatus 3000 according to the third embodiment, the following configuration.

That is to say, the battery manufacturing apparatus 3200 according to the third embodiment further includes an overhang portion forming unit 450.

The overhang portion forming unit 450 forms the first overhang portion 121a, second overhang portion 122a (or second overhang portion 122b), and third overhang portion 123a.

Figure 49:
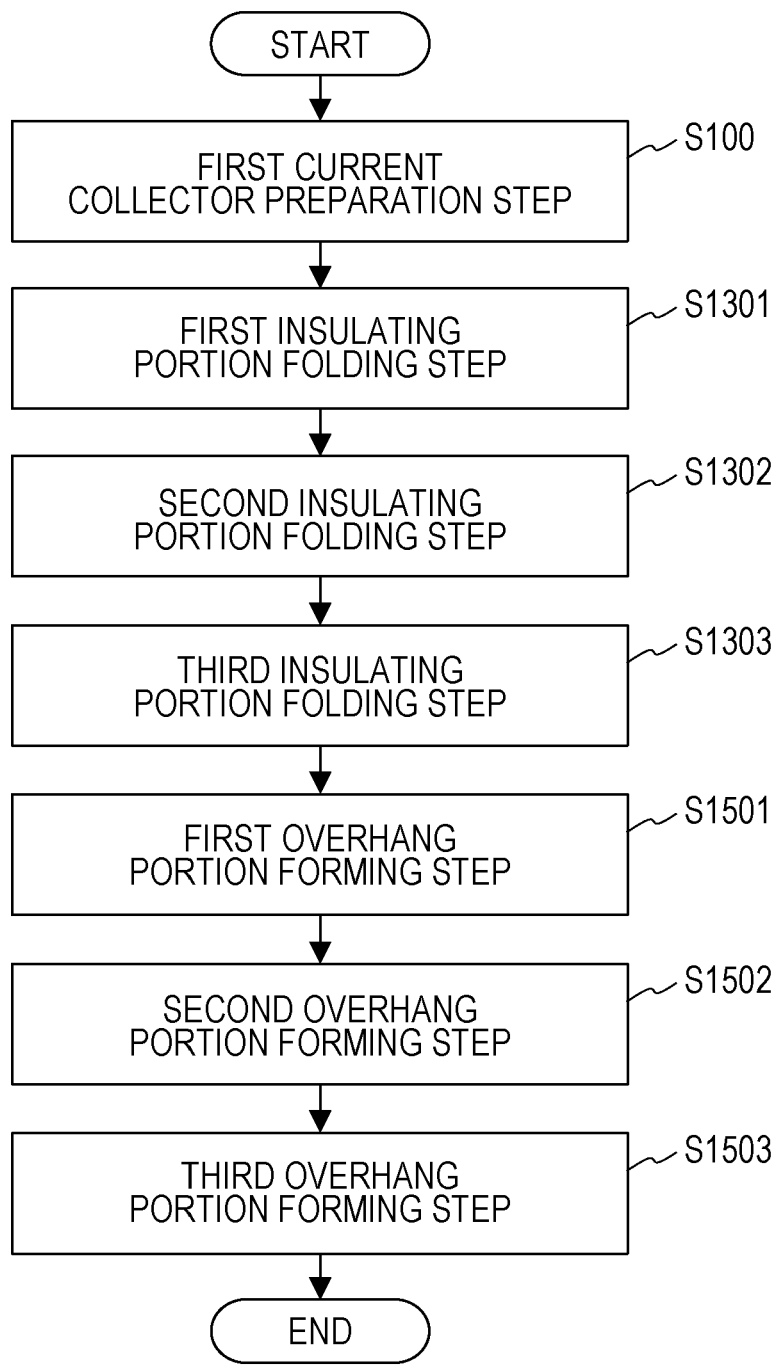
FIG. 49 is a flowchart illustrating an example of a battery manufacturing method according to the third embodiment.

FIG. 49 is a flowchart illustrating an example of a battery manufacturing method according to the third embodiment.

The battery manufacturing method illustrated in FIG. 49 further includes the following steps, in addition to the steps of the above-described battery manufacturing method illustrated in FIGS. 40 and 41.

That is to say, the battery manufacturing method illustrated in FIG. 49 further includes a first overhang portion forming step S1501 (i.e., a step (d1)), a second overhang portion forming step S1502 (i.e., a step (d2)), and a third overhang portion forming step S1503 (i.e., a step (d3)).

The first overhang portion forming step S1501 is a step executed after the first insulating portion folding step S1301. The first overhang portion forming step S1501 is a step in which a portion of the first insulating portion 121 is caused to overhang from the second electroconductive portion 112 toward the side where the second electrode layer 321 is disposed, thereby forming the first overhang portion 121a by the overhang portion forming unit 450.

According to the above configuration, the side faces of component members situated toward the side where the second electrode layer 321 is disposed from the second electroconductive portion 112 (e.g., second electrode layer 321, second counter electrode layer 322, second solid electrolyte layer 323, etc.) can be covered by the first overhang portion 121a of the first insulating portion 121. Accordingly, a configuration where side faces of the battery are covered can be realized more conveniently and less expensively as compared to a case of using a process where individual insulating members (i.e., members different from the first insulating portion 121) are separately attached, while suppressing positional deviation of the component members.

The second overhang portion forming step S1502 is a step executed after the second insulating portion folding step S1302. The second overhang portion forming step S1502 is a step in which a portion of the second insulating portion 122 is caused by the overhang portion forming unit 450 to overhang from the second electroconductive portion 112 toward the side where the first counter electrode layer 312 is disposed, thereby forming the second overhang portion 122a.

According to the above configuration, the side faces of component members situated toward the side where the first counter electrode layer 312 is disposed from the second electroconductive portion 112 (e.g., first electrode layer 311, first counter electrode layer 312, first solid electrolyte layer 313, etc.) can be covered by the second overhang portion 122a of the second insulating portion 122. Accordingly, a configuration where side faces of the battery are covered can be realized more conveniently and less expensively as compared to a case of using a process where individual insulating members (i.e., members different from the second insulating portion 122) are separately attached, while suppressing positional deviation of the component members.

Alternatively, the second overhang portion forming step S1502 may be a step in which a portion of the second insulating portion 122 is caused by the overhang portion forming unit 450 to overhang from the third electroconductive portion 113 toward the side where the third electrode layer 331 is disposed, thereby forming the second overhang portion 122b.

According to the above configuration, the side faces of component members situated toward the side where the third electrode layer 331 is disposed from the third electroconductive portion 113 (e.g., third electrode layer 331, third counter electrode layer 332, third solid electrolyte layer 333, etc.) can be covered by the second overhang portion 122b of the second insulating portion 122. Accordingly, a configuration where side faces of the battery are covered can be realized more conveniently and less expensively as compared to a case of using a process where individual insulating members (i.e., members different from the second insulating portion 122) are separately attached, while suppressing positional deviation of the component members.

The third overhang portion forming step S1503 is a step executed after the third insulating portion folding step S1303. The third overhang portion forming step S1503 is a step in which a portion of the third insulating portion 123 is caused by the overhang portion forming unit 450 to overhang from the third electroconductive portion 113 toward the side where the second counter electrode layer 322 is disposed, thereby forming the third overhang portion 123a.

According to the above configuration, the side faces of component members situated toward the side where the second counter electrode layer 322 is disposed from the third electroconductive portion 113 (e.g., second electrode layer 321, second counter electrode layer 322, second solid electrolyte layer 323, etc.) can be covered by the third overhang portion 123a of the third insulating portion 123. Accordingly, a configuration where side faces of the battery are covered can be realized more conveniently and less expensively as compared to a case of using a process where individual insulating members (i.e., members different from the third insulating portion 123) are separately attached, while suppressing positional deviation of the component members.

Note that order of executing the first overhang portion forming step S1501, second overhang portion forming step S1502, and third overhang portion forming step S1503 may be optionally decided.

The overhang portion forming unit 450 may have overhang portion forming members (e.g., pressing plate, roller, etc.), for example, the overhang portion forming unit 450 may form the overhang portions by pressing the overhang portion forming members against the insulating portions. For example, the battery 1300 according to the first embodiment may be manufactured by pressing the insulating portions by the overhang portion forming members. Alternatively, the battery 1400 according to the first embodiment may be manufactured by pressing the insulating members by the overhang portion forming members (e.g., moving the overhang portion forming members) from the side where the first electroconductive portion 111 is situated toward the side where the fourth electroconductive portion 114 is situated, for example. Alternatively, the battery 1500 according to the first embodiment may be manufactured by pressing the insulating members by the overhang portion forming members (e.g., moving the overhang portion forming members) from the side where the fourth electroconductive portion 114 is situated toward the side where the first electroconductive portion 111 is situated, for example.

Note that the first insulating portion 121 and third insulating portion 123 may come into contact with each other, due to at least one of the first overhang portion forming step S1501 and the third overhang portion forming step S1503 having been performed.

According to the above configuration, the side faces of component members interposed between the second electroconductive portion 112 and third electroconductive portion 113 (e.g., second electrode layer 321, second counter electrode layer 322, second solid electrolyte layer 323, etc.) can be covered by at least one of the first insulating portion 121 and third insulating portion 123. That is to say, a configuration where side faces of the battery are covered can be realized more conveniently and less expensively as compared to a case of using a process where individual insulating members (i.e., members different from the first insulating portion 121 and third insulating portion 123) are separately attached, while suppressing positional deviation of the component members.

Note that the first overhang portion 121a and third overhang portion 123a may be formed in the first overhang portion forming step S1501 and third overhang portion forming step S1503, and the first insulating portion 121 and third insulating portion 123 may come into contact with each other by the first overhang portion 121*a* and third overhang portion 123*a* coming into contact with each other (e.g., FIG. 10).

Alternatively, the first overhang portion 121*a* may be formed in the first overhang portion forming step S1501, and first insulating portion 121 and third insulating portion 123 may come into contact with each other by the first overhang portion 121*a* and third insulating portion 123 coming into contact with each other (e.g., FIG. 11).

Alternatively, the third overhang portion 123*a* may be formed in the third overhang portion forming step S1503, and first insulating portion 121 and third insulating portion 123 may come into contact with each other by the first insulating portion 121 and third overhang portion 123*a* coming into contact with each other (e.g., FIG. 12).

Figure 50:
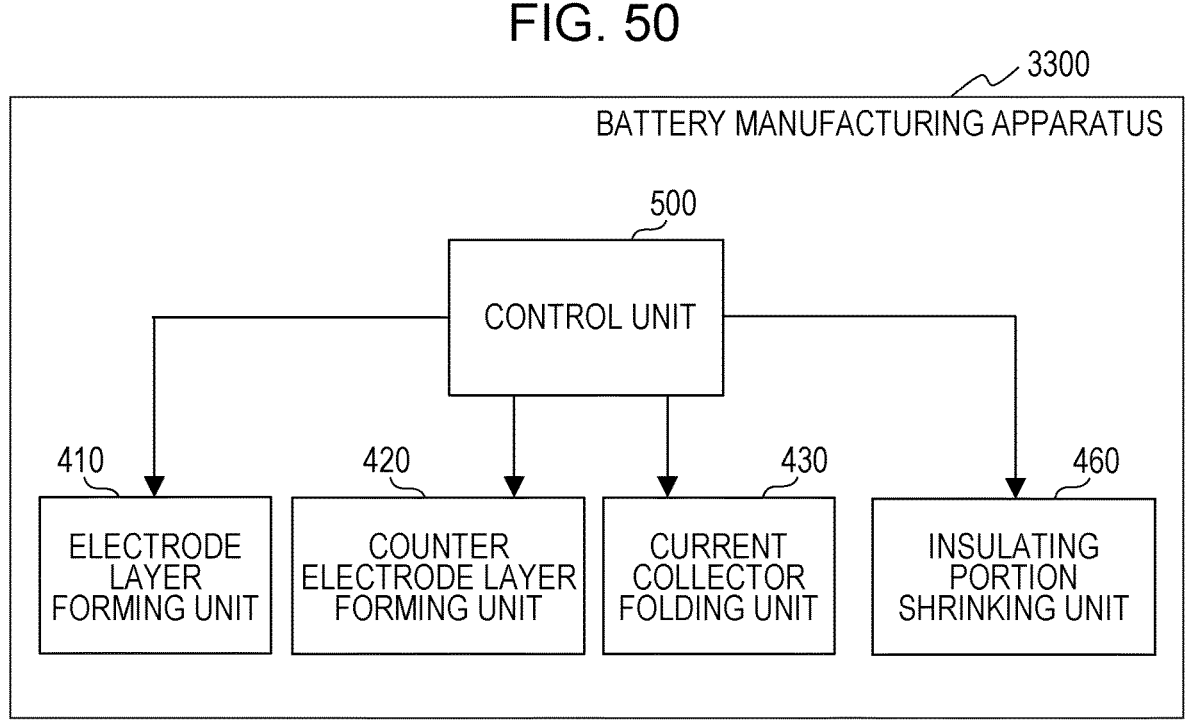
FIG. 50 is a diagram illustrating a schematic configuration of a battery manufacturing apparatus according to the third embodiment.

FIG. 50 is a diagram illustrating a schematic configuration of a battery manufacturing apparatus 3300 according to the third embodiment.

The battery manufacturing apparatus 3300 according to the third embodiment further has, in addition to the configuration of the above-described battery manufacturing apparatus 3000 according to the third embodiment, the following configuration.

That is to say, the battery manufacturing apparatus 3300 according to the third embodiment further includes an insulating portion shrinking unit 460.

The insulating portion shrinking unit 460 serves to shrink the first insulating portion 121, second insulating portion 122, and third insulating portion 123.

Figure 51:
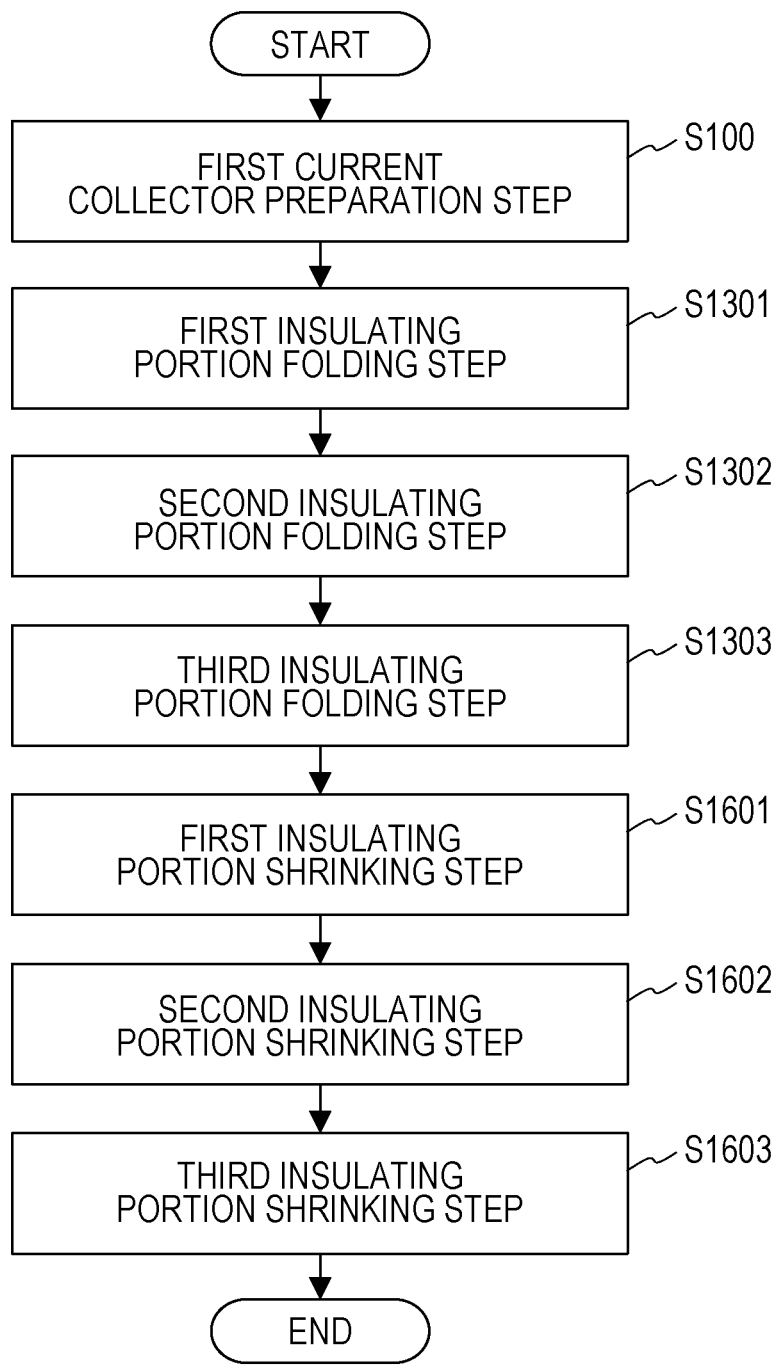
FIG. 51 is a flowchart illustrating an example of a battery manufacturing method according to the third embodiment.

FIG. 51 is a flowchart illustrating an example of a battery manufacturing method according to the third embodiment.

The battery manufacturing method illustrated in FIG. 51 further includes the following steps, in addition to the steps of the above-described battery manufacturing method illustrated in FIGS. 40 and 41.

That is to say, the battery manufacturing method illustrated in FIG. 51 further includes a first insulating portion shrinking step S1601 (i.e., a step (e1)), a second insulating portion shrinking step S1602 (i.e., a step (e2)), and a third insulating portion shrinking step S1603 (i.e., a step (e3)).

The first insulating portion shrinking step S1601 is a step executed after the first insulating portion folding step S1301. The first insulating portion shrinking step S1601 is a step in which the first insulating portion 121 is shrunk by the insulating portion shrinking unit 460.

According to the above configuration, the first insulating portion 121 is shrunk, whereby the bonding among the component members of the battery can be made stronger by the first insulating portion 121.

The second insulating portion shrinking step S1602 is a step executed after the second insulating portion folding step S1302. The second insulating portion shrinking step S1602 is a step in which the second insulating portion 122 is shrunk by the insulating portion shrinking unit 460.

According to the above configuration, the second insulating portion 122 is shrunk, whereby the bonding among the component members of the battery can be made stronger by the second insulating portion 122.

The third insulating portion shrinking step S1603 is a step executed after the third insulating portion folding step S1303. The third insulating portion shrinking step S1603 is a step in which the third insulating portion 123 is shrunk by the insulating portion shrinking unit 460.

According to the above configuration, the third insulating portion 123 is shrunk, whereby the bonding among the component members of the battery can be made stronger by the third insulating portion 123.

Figure 52:
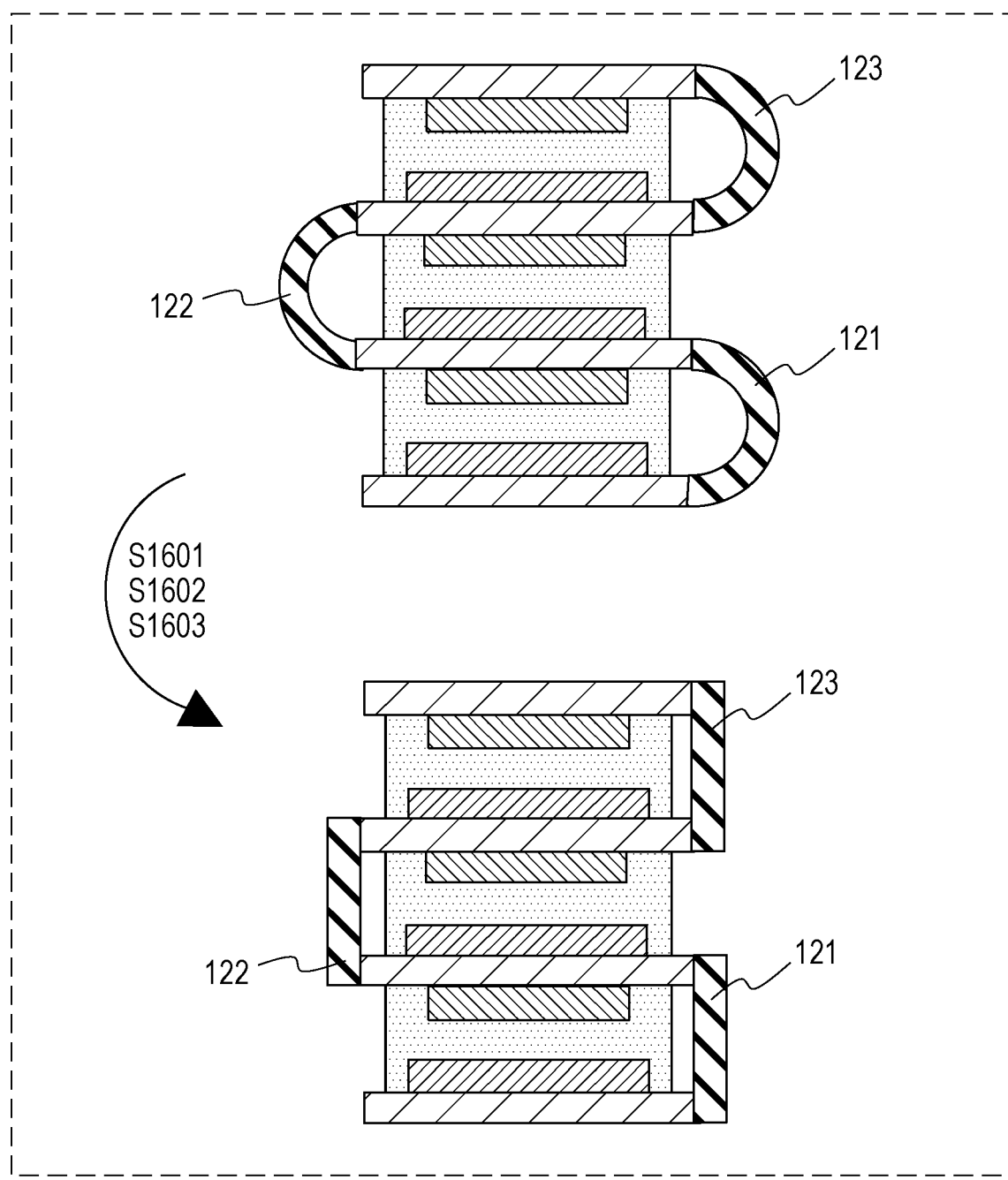
FIG. 52 is an x-z diagram (cross-sectional view) illustrating an example of a first insulating portion shrinking step, a second insulating portion shrinking step, and a third insulating portion shrinking step.

FIG. 52 is an x-z diagram (cross-sectional view) illustrating an example of the first insulating portion shrinking step S1601, second insulating portion shrinking step S1602, and third insulating portion shrinking step S1603.

The insulating portion shrinking unit 460 may include insulating portion shrinking members (e.g., heating device, etc.), for example. The insulating portions may include thermal-shrinking material. The insulating portion shrinking unit 460 may heat the insulating portions by the heating device to cause the thermal-shrinking material to shrink at this time, thereby shrinking the insulating portions.

Note that the order of executing the first insulating portion shrinking step S1601, second insulating portion shrinking step S1602, and third insulating portion shrinking step S1603 may be optionally decided.

For example, the first insulating portion shrinking step S1601, second insulating portion shrinking step S1602, and third insulating portion shrinking step S1603 may be executed at the same time, as illustrated in FIG. 52.

Figure 53:
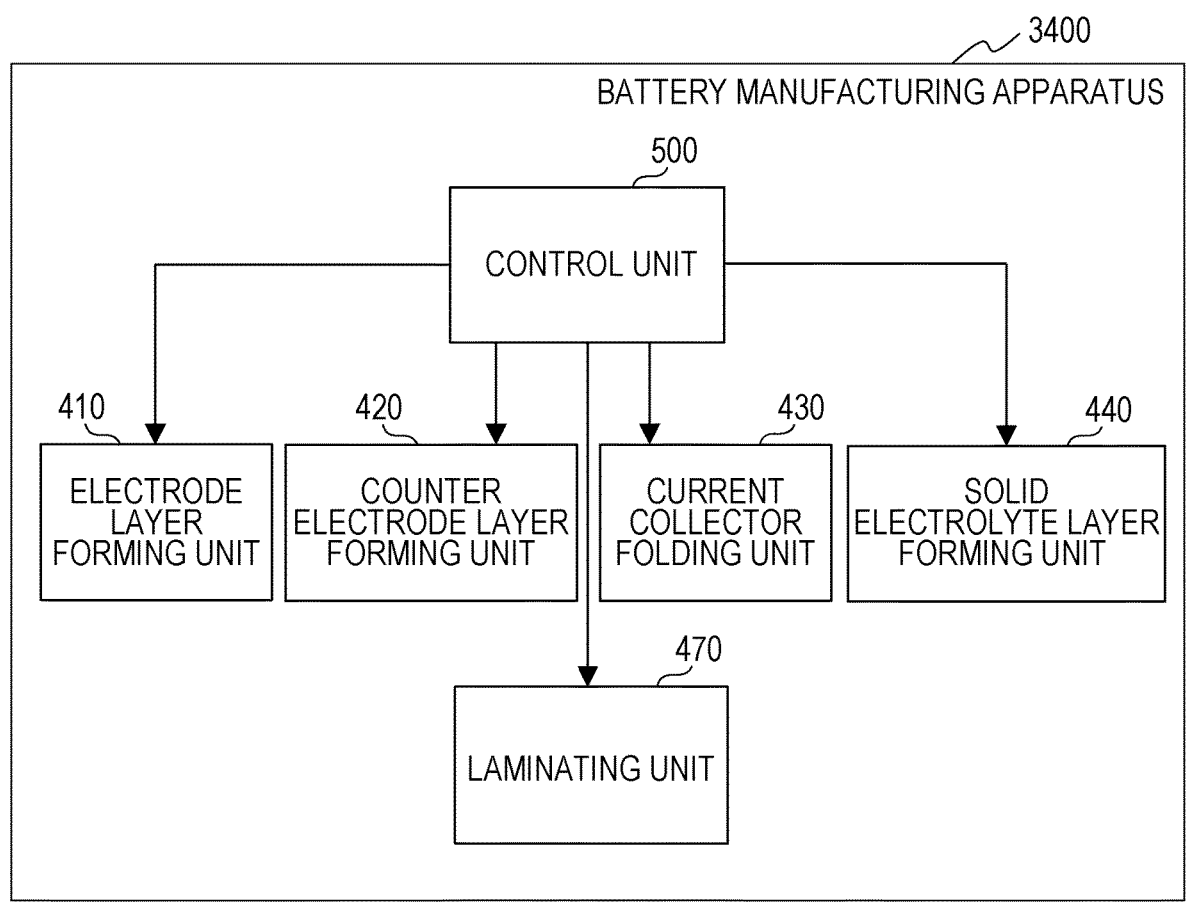
FIG. 53 is a diagram illustrating a schematic configuration of a battery manufacturing apparatus according to the third embodiment.

FIG. 53 is a diagram illustrating a schematic configuration of a battery manufacturing apparatus 3400 according to the third embodiment.

The battery manufacturing apparatus 3400 according to the third embodiment further has, in addition to the configuration of the above-described battery manufacturing apparatus 3100 according to the third embodiment, the following configuration.

That is to say, the battery manufacturing apparatus 3400 according to the third embodiment further includes a laminating unit 470.

The laminating unit 470 laminates the first current collector 100 and second current collector 200.

The second current collector 200 includes the fifth electroconductive portion 211. The second current collector 200 may also further include the sixth electroconductive portion 212, seventh electroconductive portion 213, fourth insulating portion 221, fifth insulating portion 222, and sixth insulating portion 223.

The fourth insulating portion 221 is a member linking the fifth electroconductive portion 211 and sixth electroconductive portion 212.

The fifth insulating portion 222 is a member linking the sixth electroconductive portion 212 and seventh electroconductive portion 213.

The sixth insulating portion 223 is a member linked to the seventh electroconductive portion 213.

Figure 54:
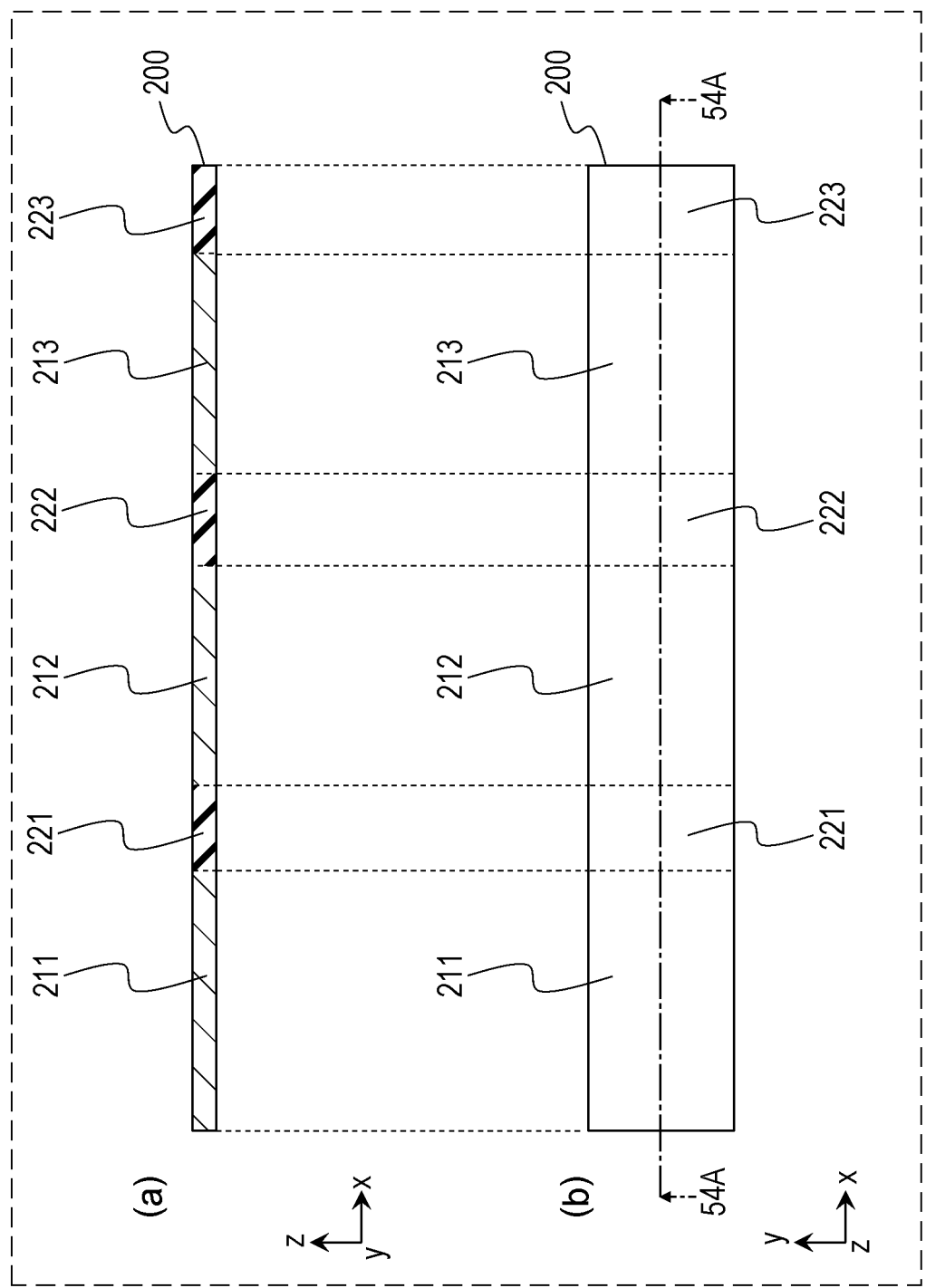
FIG. 54 is a diagram illustrating a schematic configuration of an example of a second current collector according to the third embodiment.

FIG. 54 is a diagram illustrating a schematic configuration of an example of the second current collector 200 according to the third embodiment.

Indicated by (a) in FIG. 54 is an x-z diagram (cross-sectional view taken along 54 in FIG. 54) illustrating a schematic configuration of an example of the second current collector 200 according to the third embodiment.

Indicated by (b) in FIG. 54 is an x-y diagram (plan view) illustrating a schematic configuration of an example of the second current collector 200 according to the third embodiment.

The electrode layer forming unit 410 may form the fourth electrode layer 315 in contact with the fifth electroconductive portion 211. The electrode layer forming unit 410 may form the fifth electrode layer 325 in contact with the sixth electroconductive portion 212. The electrode layer forming unit 410 may form the sixth electrode layer 335 in contact with the seventh electroconductive portion 213.

Also, the counter electrode layer forming unit 420 may form the fourth counter electrode layer 314 in contact with the fifth electroconductive portion 211. The counter electrode layer forming unit 420 may form the fifth counter electrode layer 324 in contact with the sixth electroconductive portion 212. The counter electrode layer forming unit 420 may form the sixth counter electrode layer 334 in contact with the seventh electroconductive portion 213. Note that the fourth counter electrode layer 314, fifth counter electrode layer 324, and sixth counter electrode layer 334 are counter electrodes of the first electrode layer 311, second electrode layer 321, third electrode layer 331, fourth electrode layer 315, fifth electrode layer 325, and sixth electrode layer 335.

Figure 55:
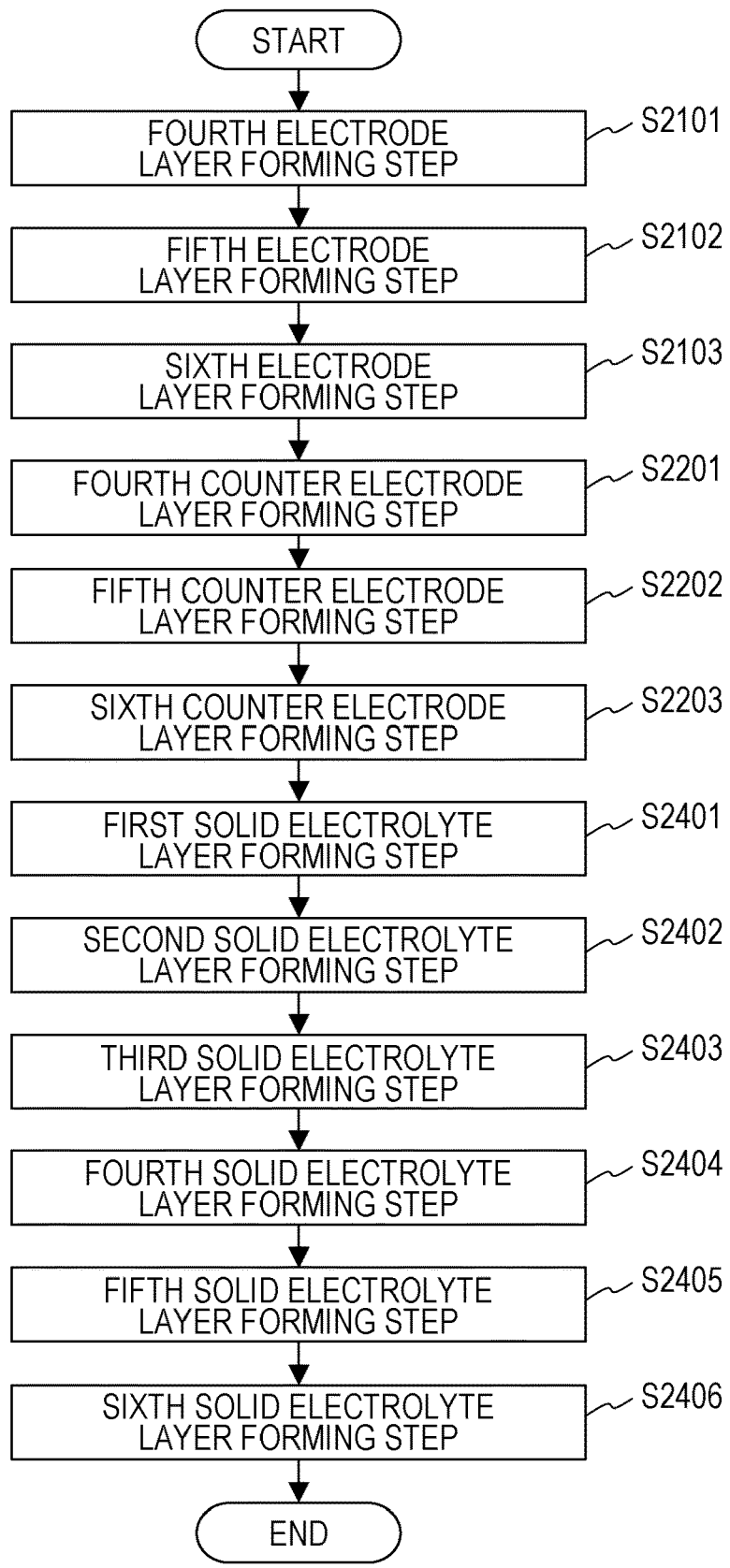
FIG. 55 is a diagram illustrating a schematic configuration of an example of a second current collector preparation step.

FIG. 55 is a diagram illustrating an example of a second current collector preparation step S200.

The second current collector preparation step S200 encompasses a fourth electrode layer forming step 2101 (i.e., a step (a4)) and a fourth counter electrode layer forming step S2201 (i.e., a step (b4)).

The fourth electrode layer forming step 2101 is a step in which the fourth electrode layer 315 is formed in contact with the fifth electroconductive portion 211 by the electrode layer forming unit 410.

The fourth counter electrode layer forming step S2201 is a step in which the fourth counter electrode layer 314 is formed in contact with the fifth electroconductive portion 211 by the counter electrode layer forming unit 420.

Note that the second current collector preparation step S200 may further encompass a fifth electrode layer forming step 2102 (i.e., step (a5)), a sixth electrode layer forming step 2103 (i.e., step (a6)), a fifth counter electrode layer forming step S2202 (i.e., step (b5)), and a sixth counter electrode layer forming step S2203 (i.e., step (b6)).

The fifth electrode layer forming step 2102 is a step in which the fifth electrode layer 325 is formed in contact with the sixth electroconductive portion 212 by the electrode layer forming unit 410.

The sixth electrode layer forming step 2103 is a step in which the sixth electrode layer 335 is formed in contact with the seventh electroconductive portion 213 by the electrode layer forming unit 410.

The fifth counter electrode layer forming step S2202 is a step in which the fifth counter electrode layer 324 is formed in contact with the sixth electroconductive portion 212 by the counter electrode layer forming unit 420.

The sixth counter electrode layer forming step S2203 is a step in which the sixth counter electrode layer 334 is formed in contact with the seventh electroconductive portion 213 by the counter electrode layer forming unit 420.

As for specific methods of the steps for forming the electrode layers on the second current collector 200, methods described as methods for forming the electrode layers on the first current collector 100 may be employed as appropriate.

As for specific methods of the steps for forming the counter electrode layers on the second current collector 200, methods described as methods for forming the counter electrode layers on the first current collector 100 may be employed as appropriate.

Note that the solid electrolyte layer forming unit 440 may form the first solid electrolyte layer 313 on at least one of the first electrode layer 311 and fourth counter electrode layer 314. The solid electrolyte layer forming unit 440 may form the second solid electrolyte layer 323 on at least one of the second electrode layer 321 and fifth counter electrode layer 324. The solid electrolyte layer forming unit 440 may form the third solid electrolyte layer 333 on at least one of the third electrode layer 331 and sixth counter electrode layer 334. The solid electrolyte layer forming unit 440 may form the fourth solid electrolyte layer 316 on at least one of the fourth electrode layer 315 and first counter electrode layer 312. The solid electrolyte layer forming unit 440 may form the fifth solid electrolyte layer 326 on at least one of the fifth electrode layer 325 and second counter electrode layer 322. The solid electrolyte layer forming unit 440 may form the sixth solid electrolyte layer 336 on at least one of the sixth electrode layer 335 and third counter electrode layer 332.

In other words, the second current collector preparation step S200 may further encompass a first solid electrolyte layer forming step S2401 (i.e., a step (g1)), a second solid electrolyte layer forming step S2402 (i.e., a step (g2)), a third solid electrolyte layer forming step S2403 (i.e., a step (g3)), a fourth solid electrolyte layer forming step S2404 (i.e., a step (g4)), a fifth solid electrolyte layer forming step S2405 (i.e., a step (g5)), and a sixth solid electrolyte layer forming step S2406 (i.e., a step (g6)), as illustrated in FIG. 55.

The first solid electrolyte layer forming step S2401 is a step in which the first solid electrolyte layer 313 is formed on at least one of the first electrode layer 311 and fourth counter electrode layer 314 by the solid electrolyte layer forming unit 440.

The second solid electrolyte layer forming step S2402 is a step in which the second solid electrolyte layer 323 is formed on at least one of the second electrode layer 321 and fifth counter electrode layer 324 by the solid electrolyte layer forming unit 440.

The third solid electrolyte layer forming step S2403 is a step in which the third solid electrolyte layer 333 is formed on at least one of the third electrode layer 331 and sixth counter electrode layer 334 by the solid electrolyte layer forming unit 440.

The fourth solid electrolyte layer forming step S2404 is a step in which the fourth solid electrolyte layer 316 is formed on at least one of the fourth electrode layer 315 and first counter electrode layer 312 by the solid electrolyte layer forming unit 440.

The fifth solid electrolyte layer forming step S2405 is a step in which the fifth solid electrolyte layer 326 is formed on at least one of the fifth electrode layer 325 and second counter electrode layer 322 by the solid electrolyte layer forming unit 440.

The sixth solid electrolyte layer forming step S2406 is a step in which the sixth solid electrolyte layer 336 is formed on at least one of the sixth electrode layer 335 and third counter electrode layer 332 by the solid electrolyte layer forming unit 440.

According to the above configuration, the respective solid battery cells (the respective power-generating elements) can be fabricated by a convenient folding process. Thus, a laminated battery where multiple solid battery cells are serially laminated can be fabricated with suppressed positional deviation of the component members, as compared with a case of using a process of laminating a great number of individual component members.

As for specific methods of the steps for forming the solid electrolyte layers on the second current collector 200, methods described as methods for forming the solid electrolyte layers on the first current collector 100 may be employed as appropriate.

Figure 56:
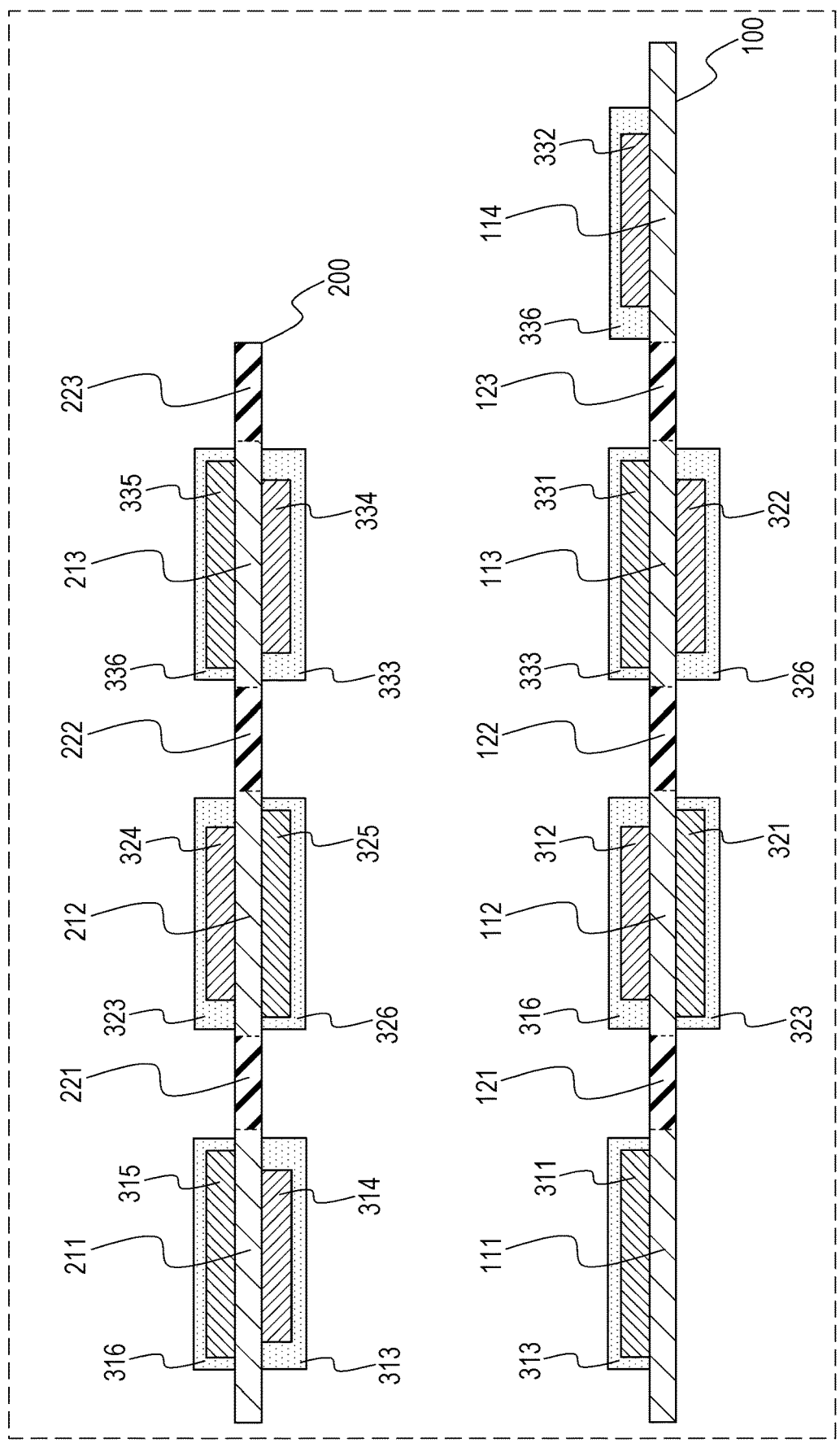
FIG. 56 is a cross-sectional view illustrating an example of a combination of the first current collector and second current collector.

FIG. 56 is a cross-sectional view illustrating an example of a combination of the first current collector 100 and second current collector 200.

As illustrated in FIG. 56, the solid electrolyte layers may be formed on all electrode layers and counter electrode layers on the first current collector 100 and second current collector 200.

Figure 57:
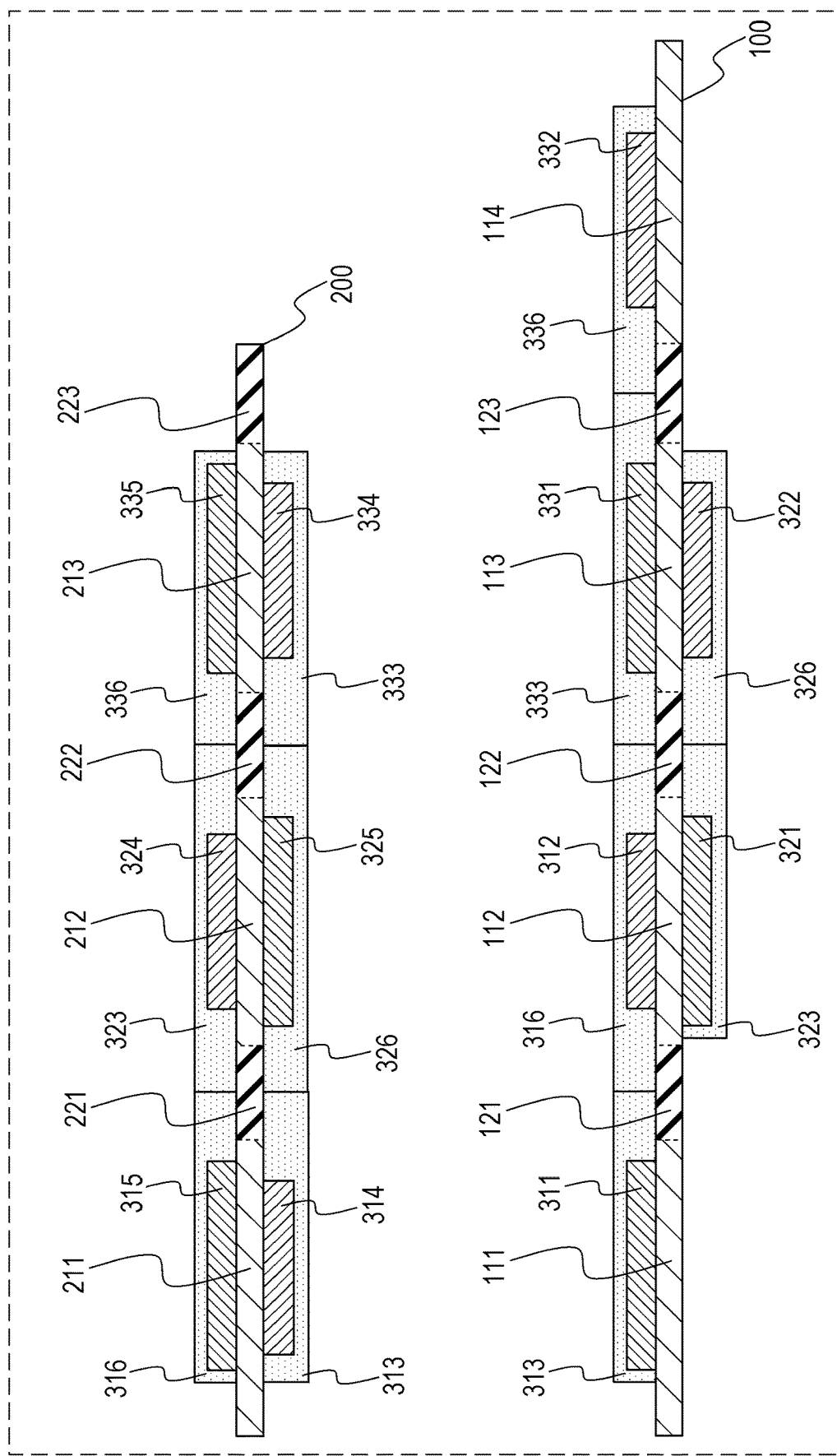
FIG. 57 is a cross-sectional view illustrating an example of a combination of the first current collector and second current collector.

FIG. 57 is a cross-sectional view illustrating an example of a combination of the first current collector 100 and second current collector 200.

As illustrated in FIG. 57, the solid electrolyte layers may be continuously formed on all electrode layers and counter electrode layers on the first current collector 100 and second current collector 200. That is to say, the solid electrolyte layers may be formed on the insulating portions on the first current collector 100 and second current collector 200 as well.

Figure 58:
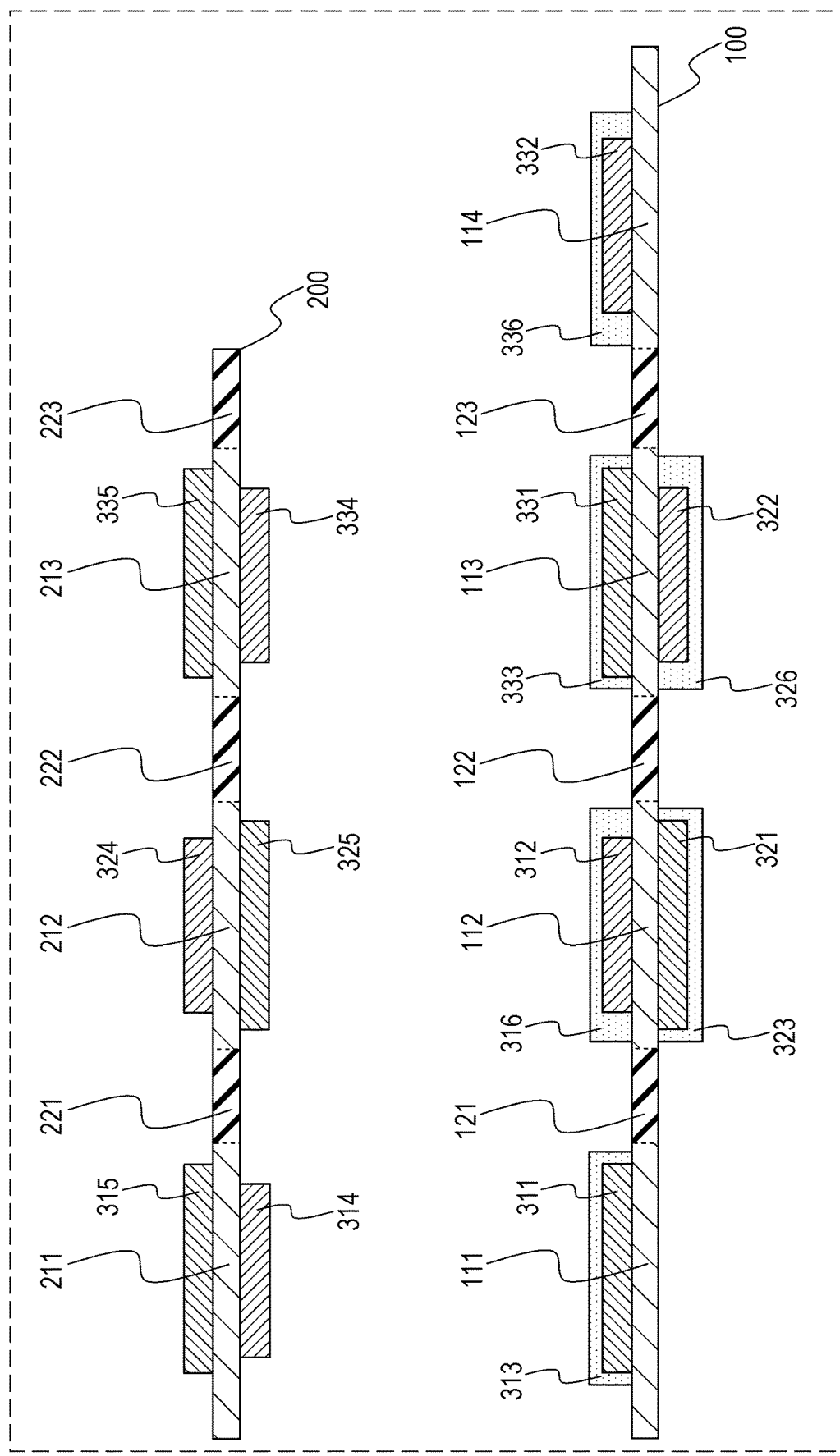
FIG. 58 is a cross-sectional view illustrating an example of a combination of the first current collector and second current collector.

FIG. 58 is a cross-sectional view illustrating an example of a combination of the first current collector 100 and second current collector 200.

As illustrated in FIG. 58, the solid electrolyte layers may be formed only on the electrode layers and counter electrode layers on the first current collector 100, without being formed on the electrode layers and counter electrode layers on the second current collector 200.

Figure 59:
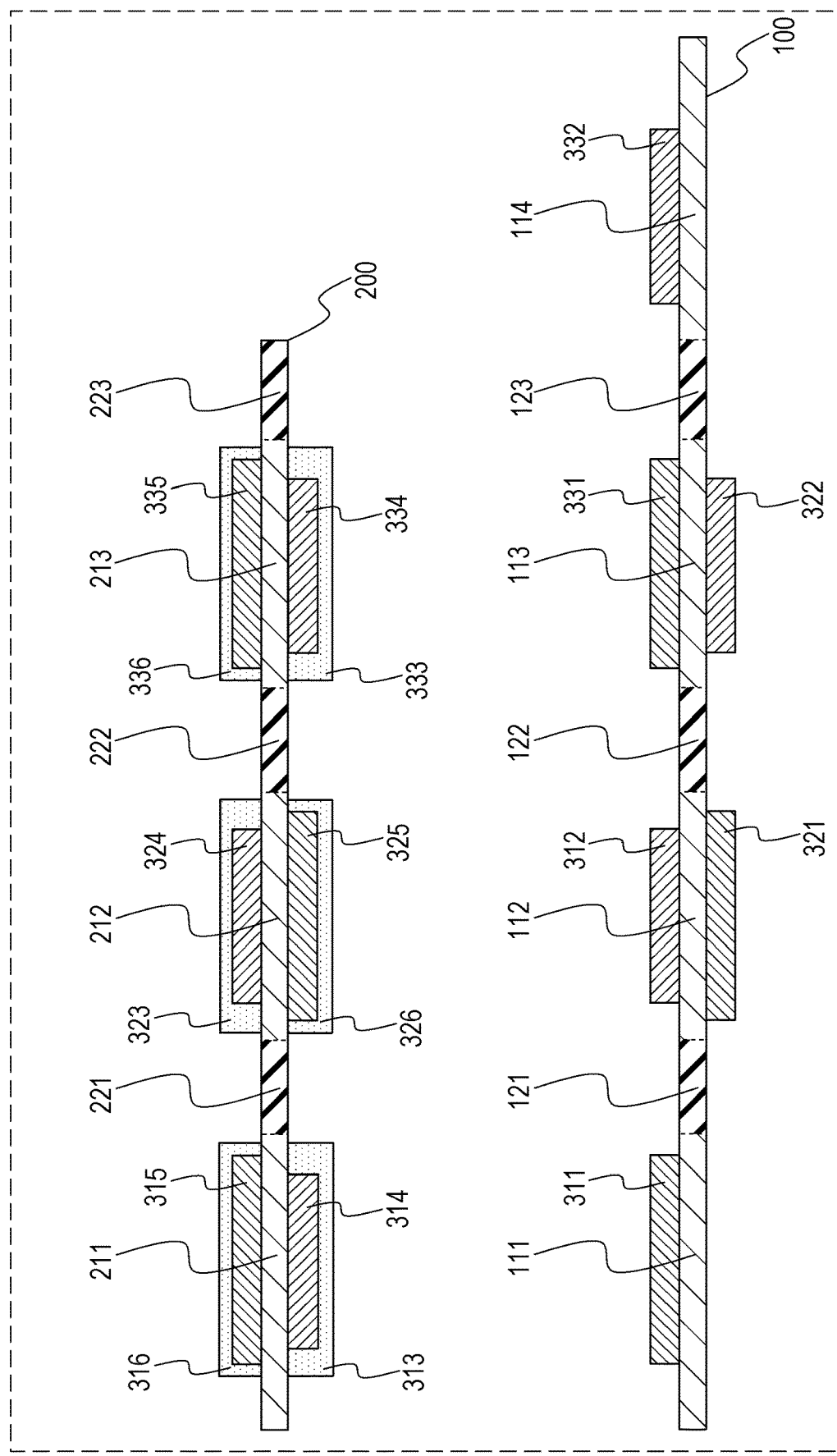
FIG. 59 is a cross-sectional view illustrating an example of a combination of the first current collector and second current collector.

FIG. 59 is a cross-sectional view illustrating an example of a combination of the first current collector 100 and second current collector 200.

As illustrated in FIG. 59, the solid electrolyte layers may be formed only on the electrode layers and counter electrode layers on the second current collector 200, without being formed on the electrode layers and counter electrode layers on the first current collector 100.

Figure 60:
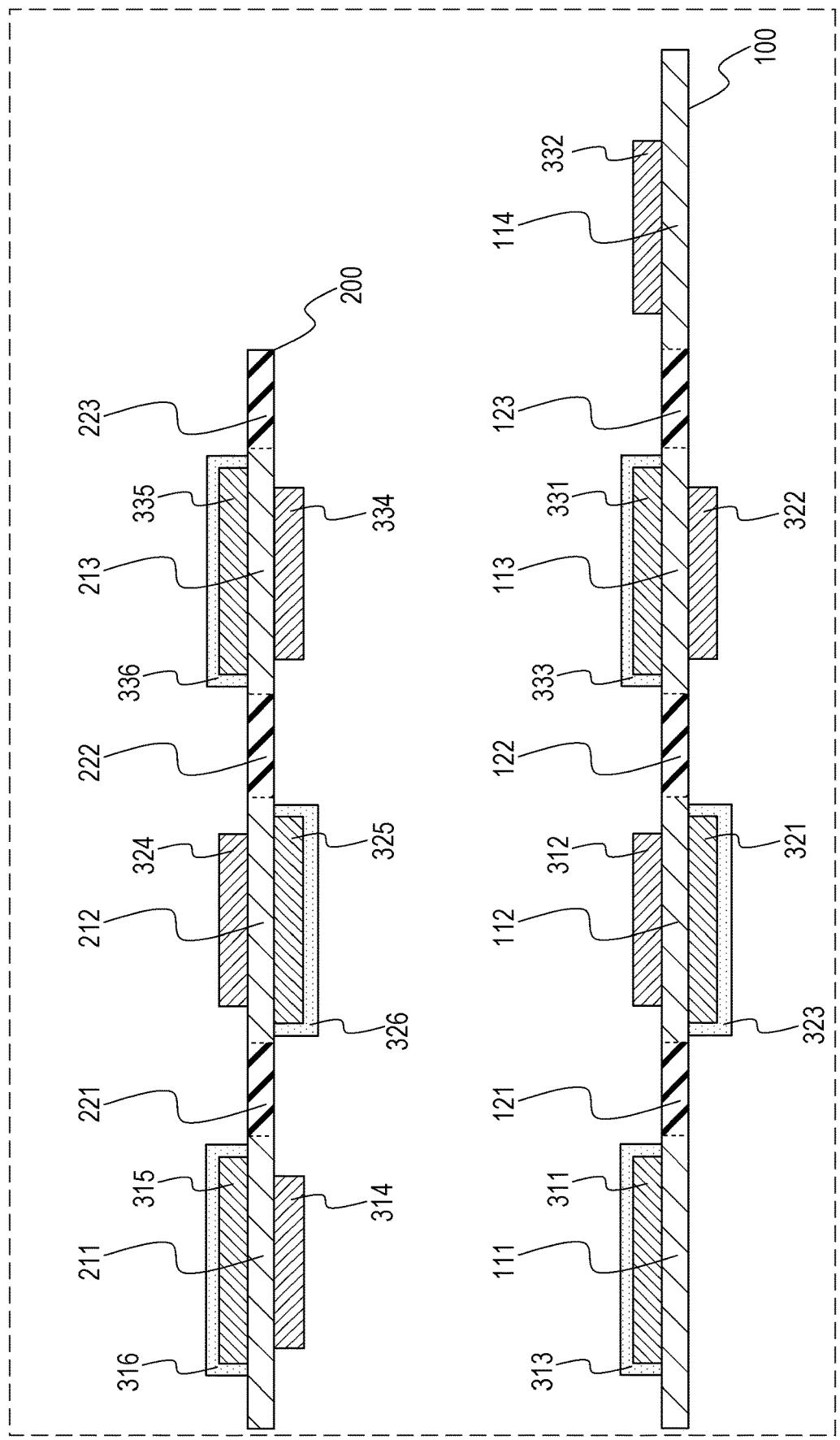
FIG. 60 is a cross-sectional view illustrating an example of a combination of the first current collector and second current collector.

FIG. 60 is a cross-sectional view illustrating an example of a combination of the first current collector 100 and second current collector 200.

As illustrated in FIG. 60, the solid electrolyte layers may be formed only on the electrode layers on the first current collector 100 and second current collector 200, without being formed on the counter electrode layers on the first current collector 100 and second current collector 200.

Figure 61:
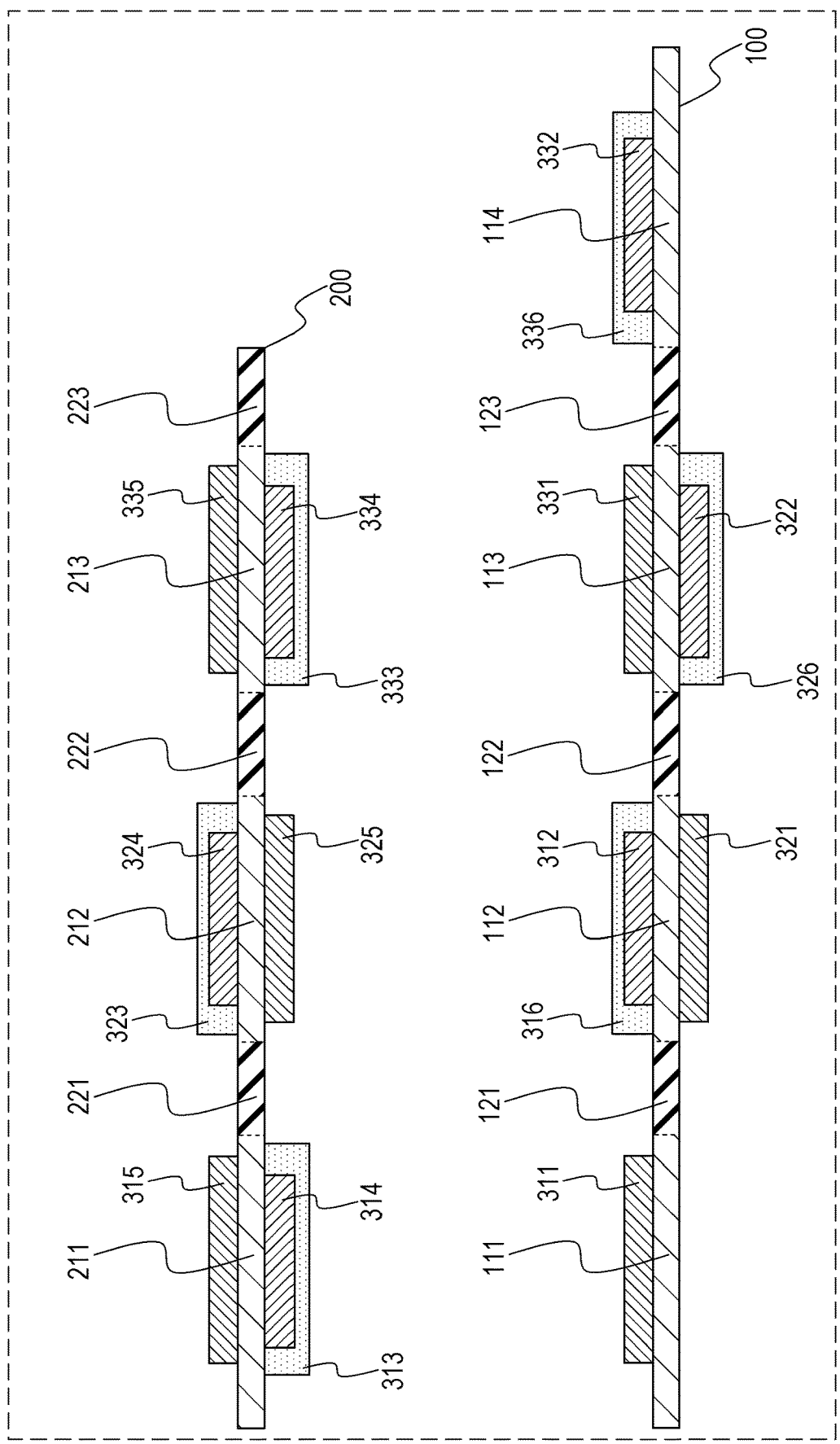
FIG. 61 is a cross-sectional view illustrating an example of a combination of the first current collector and second current collector.

FIG. 61 is a cross-sectional view illustrating an example of a combination of the first current collector 100 and second current collector 200.

As illustrated in FIG. 61, the solid electrolyte layers may be formed on the counter electrode layers on the first current collector 100 and second current collector 200, without being formed on the electrode layers on the first current collector 100 and second current collector 200.

Figure 62:
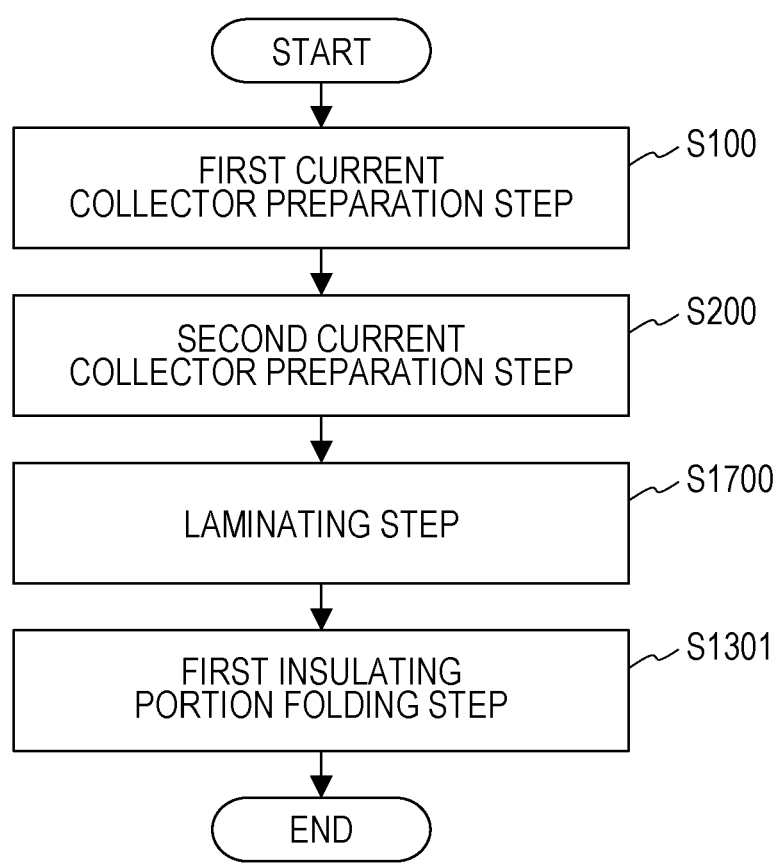
FIG. 62 is a flowchart illustrating an example of a battery manufacturing method according to the third embodiment.

FIG. 62 is a flowchart illustrating an example of a battery manufacturing method according to the third embodiment.

The battery manufacturing method illustrated in FIG. 62 includes the first current collector preparation step S100, the second current collector preparation step S200, a first laminating step S1700 (i.e., a step (s1)), and the first insulating portion folding step S1301.

The laminating step S1700 is a step in which the first current collector 100 and second current collector 200 are laminated by the laminating unit 470 with the fourth counter electrode layer 314 and first electrode layer 311 facing each other.

The first insulating portion folding step S1301 is executed after the laminating step S1700.

The fourth electrode layer 315 and first counter electrode layer 312 are positioned facing each other, due to the first current collector 100 being folded at the first insulating portion 121 by the current collector folding unit 430 in the first insulating portion folding step.

According to the above configuration, a laminated battery where bipolar-structure electrodes are laminated can be fabricated by a convenient folding process. That is to say, a laminated battery where the power-generating elements have been serially laminated can be fabricated by a step of folding the first insulating portion 121 such that the second current collector 200 where bipolar-structure electrodes (i.e., the electrodes fabricated in the steps of forming the fourth counter electrode layer 314 and fourth electrode layer 315 on the fifth electroconductive portion 211) have been provided is sandwiched by the first current collector 100. Accordingly, a serial-structure laminated battery can be fabricated more conveniently and less expensively as compared to a case of using a process of laminating multiple bipolar-structure electrodes that have been individually separated, while suppressing positional deviation of the component members.

According to the above manufacturing apparatus and manufacturing method, the battery 2000 according to the second embodiment can be manufactured.

Figure 63:
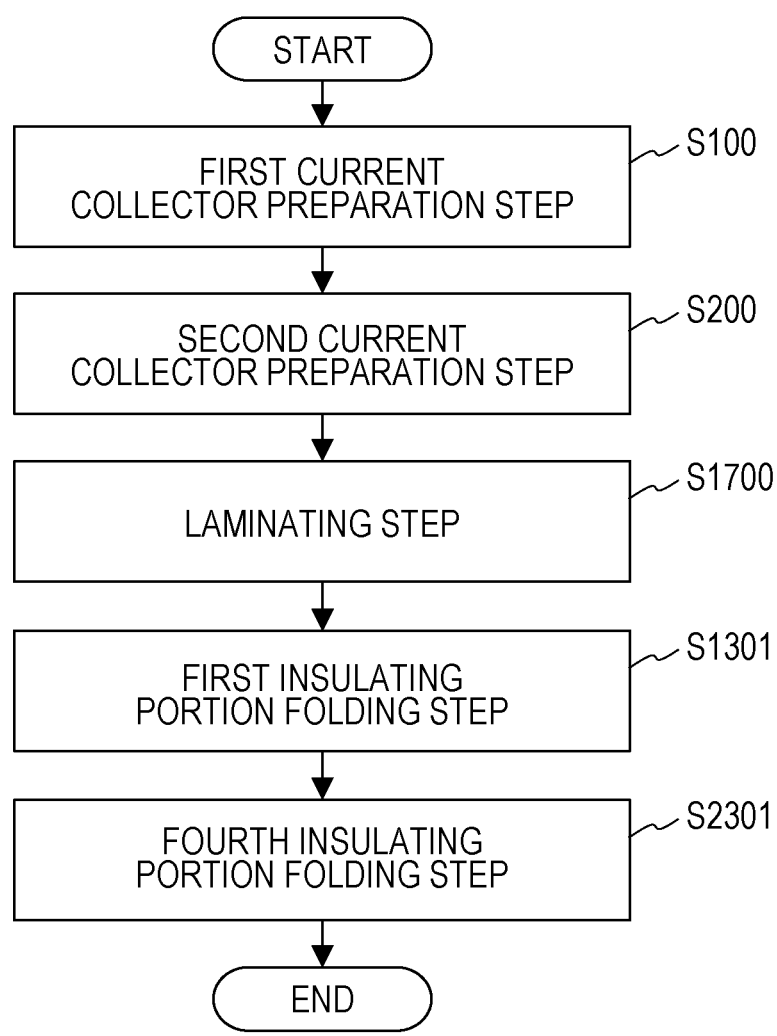
FIG. 63 is a flowchart illustrating an example of a battery manufacturing method according to the third embodiment.

FIG. 63 is a flowchart illustrating an example of a battery manufacturing method according to the third embodiment.

The battery manufacturing method illustrated in FIG. 63 further includes the following steps, in addition to the steps of the above-described battery manufacturing method illustrated in FIG. 62.

That is to say, the battery manufacturing method illustrated in FIG. 63 further includes a fourth insulating portion folding step S2301 (i.e., a step (c4)).

The fourth insulating portion folding step S2301 is a step executed after the first insulating portion folding step S1301. The fourth insulating portion folding step S2301 is a step where the fourth insulating portion 221 is folded by the current collector folding unit 430.

The second electrode layer 321 and fifth counter electrode layer 324 are positioned facing each other, due to the second current collector 200 being folded at the fourth insulating portion 221 by the current collector folding unit 430 in the fourth insulating portion folding step S2301.

According to the above configuration, the bonding strength among the component members of the battery can be further improved. That is to say, the fourth electrode layer 315 and fifth counter electrode layer 324 can each be formed on the fifth electroconductive portion 211 and sixth electroconductive portion 212 that are linked to each other by the fourth insulating portion 221. Accordingly, the positional relationship between the fourth electrode layer 315 disposed on the fifth electroconductive portion 211 and the fifth counter electrode layer 324 disposed on the sixth electroconductive portion 212 can be strongly maintained by the fourth insulating portion 221 (in other words, by the second current collector 200 that is a single component member). Accordingly, the layers (e.g., the fourth electrode layer 315 and fifth counter electrode layer 324) making up the battery can be prevented from exhibiting positional shifting or separation due to shock, vibration, and so forth, when manufacturing the battery, for example.

According to the above configuration, a laminated battery where bipolar-structure electrodes are laminated can be fabricated by a convenient folding process. That is to say, a laminated battery where the power-generating elements have been serially laminated can be fabricated by a step of folding the first insulating portion 121 of the first current collector 100 where bipolar-structure electrodes have been provided, and the fourth insulating portion 221 of the second current collector 200 where bipolar-structure electrodes have been provided. Accordingly, a serial-structure laminated battery can be fabricated more conveniently and less expensively as compared to a case of using a process of laminating multiple bipolar-structure electrodes that have been individually separated, while suppressing positional deviation of the component members.

According to the above manufacturing apparatus and manufacturing method, the battery 2100 according to the second embodiment can be manufactured.

Figure 64:
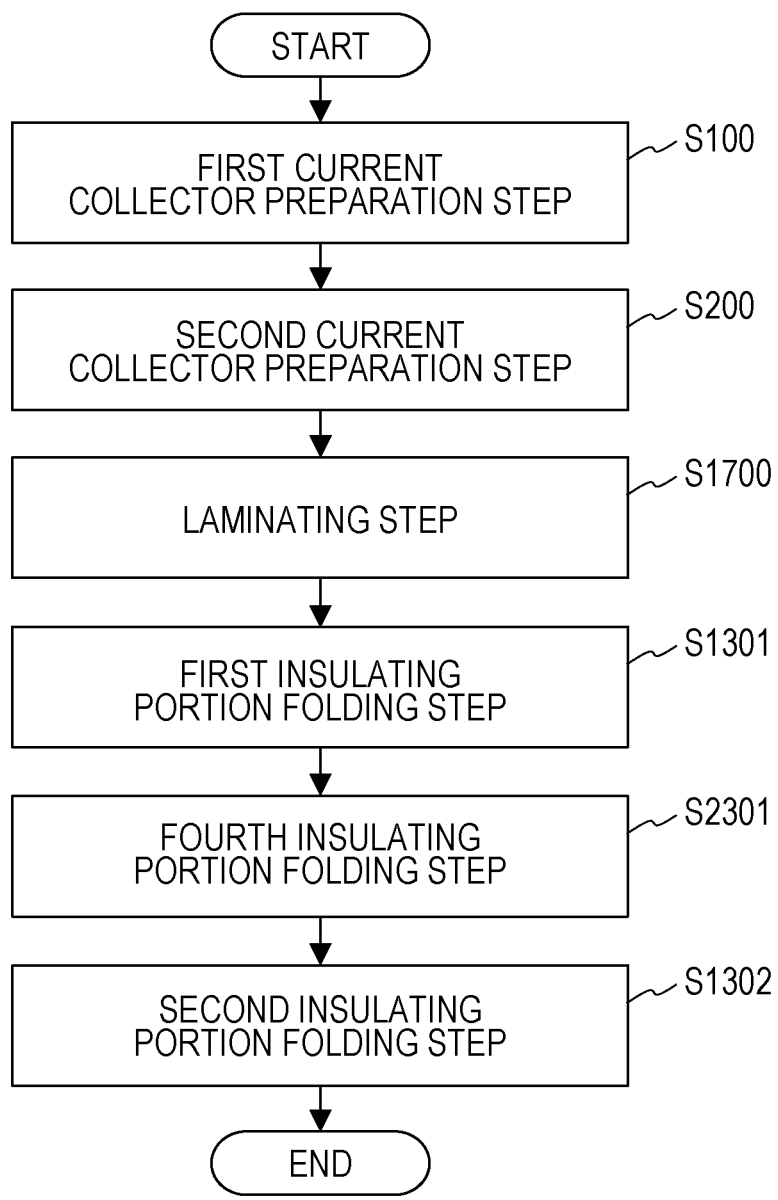
FIG. 64 is a flowchart illustrating an example of a battery manufacturing method according to the third embodiment.

FIG. 64 is a flowchart illustrating an example of a battery manufacturing method according to the third embodiment.

The battery manufacturing method illustrated in FIG. 64 further includes the following steps, in addition to the steps of the above-described battery manufacturing method illustrated in FIG. 63.

That is to say, the battery manufacturing method illustrated in FIG. 64 further includes the second insulating portion folding step S1302.

The second insulating portion folding step S1302 is executed after the fourth insulating portion folding step S2301.

The fifth electrode layer 325 and second counter electrode layer 322 are positioned facing each other, due to the first current collector 100 being folded at the second insulating portion 122 by the current collector folding unit 430 in the second insulating portion folding step S1302.

According to the above configuration, the bonding strength among the component members of the battery can be further improved. That is to say, the second electrode layer 321 and second counter electrode layer 322 can each be formed on the second electroconductive portion 112 and third electroconductive portion 113 that are linked to each other by the second insulating portion 122. Accordingly, the positional relationship between the second electrode layer 321 disposed on the second electroconductive portion 112 and the second counter electrode layer 322 disposed on the third electroconductive portion 113 can be strongly maintained by the second insulating portion 122 (in other words, by the first current collector 100 that is a single component member). Accordingly, the layers (e.g., the second electrode layer 321 and second counter electrode layer 322) making up the battery can be prevented from exhibiting positional shifting or separation due to shock, vibration, and so forth, when manufacturing the battery, for example.

According to the above configuration, a laminated battery where bipolar-structure electrodes are laminated can be fabricated by a convenient folding process. That is to say, a laminated battery where the power-generating elements have been serially laminated can be fabricated by a step of folding the first insulating portion 121 and second insulating portion 122 of the first current collector 100 where bipolar-structure electrodes have been provided, and the fourth insulating portion 221 of the second current collector 200 where bipolar-structure electrodes have been provided. Accordingly, a serial-structure laminated battery can be fabricated more conveniently and less expensively as compared to a case of using a process of laminating multiple bipolar-structure electrodes that have been individually separated, while suppressing positional deviation of the component members.

According to the above manufacturing apparatus and manufacturing method, the battery 2200 according to the second embodiment can be manufactured.

Figure 65:
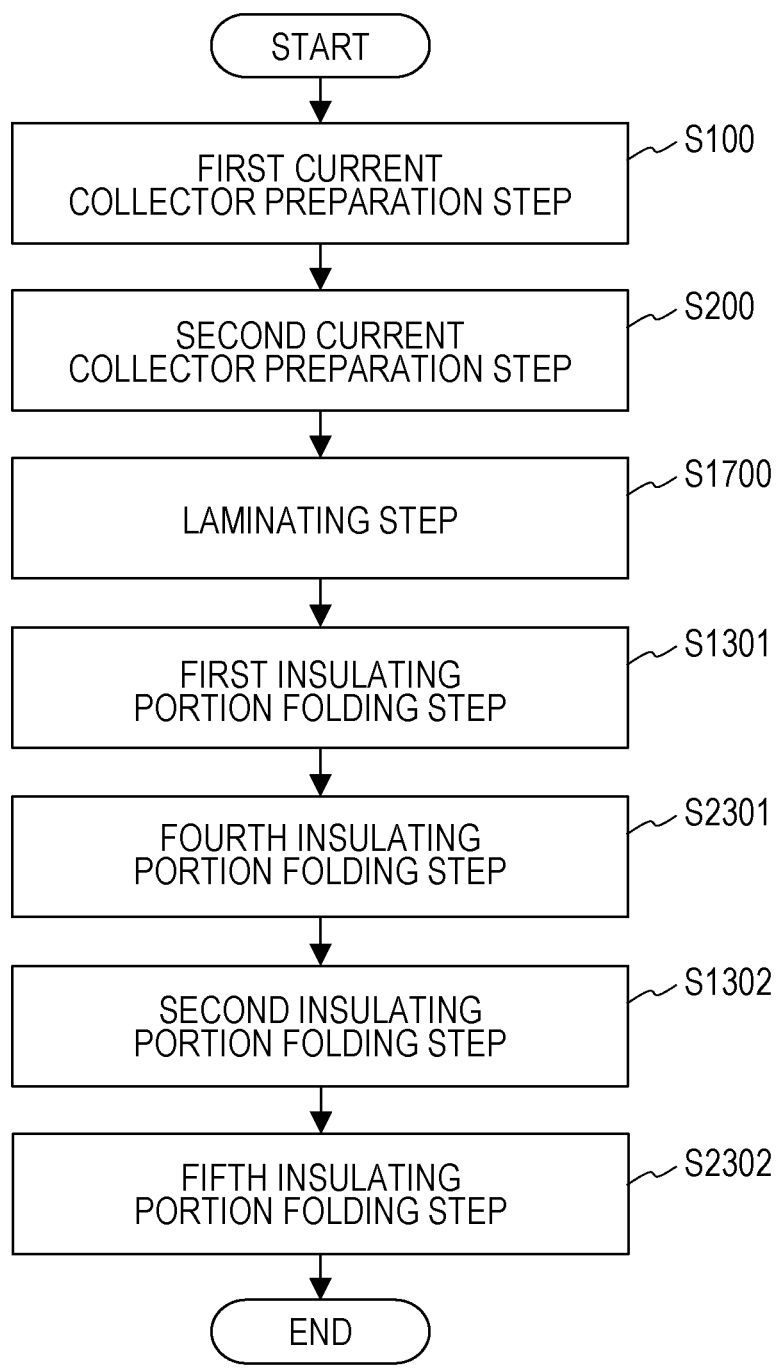
FIG. 65 is a flowchart illustrating an example of a battery manufacturing method according to the third embodiment.

FIG. 65 is a flowchart illustrating an example of a battery manufacturing method according to the third embodiment.

The battery manufacturing method illustrated in FIG. 65 further includes the following steps, in addition to the steps of the above-described battery manufacturing method illustrated in FIG. 64.

That is to say, the battery manufacturing method illustrated in FIG. 65 further includes a fifth insulating portion folding step S2302 (i.e., a step (c5)).

The fifth insulating portion folding step S2302 is executed after the second insulating portion folding step S1302.

The third electrode layer 331 and sixth counter electrode layer 334 are positioned facing each other, due to the second current collector 200 being folded at the fifth insulating portion 222 by the current collector folding unit 430 in the fifth insulating portion folding step S2302.

According to the above configuration, the bonding strength among the component members of the battery can be further improved. That is to say, the fifth electrode layer 325 and sixth counter electrode layer 334 can each be formed on the sixth electroconductive portion 212 and seventh electroconductive portion 213 that are linked to each other by the fifth insulating portion 222. Accordingly, the positional relationship between the fifth electrode layer 325 disposed on the sixth electroconductive portion 212 and the sixth counter electrode layer 334 disposed on the seventh electroconductive portion 213 can be strongly maintained by the fifth insulating portion 222 (in other words, by the second current collector 200 that is a single component member). Accordingly, the layers (e.g., the fifth electrode layer 325 and sixth counter electrode layer 334) making up the battery can be prevented from exhibiting positional shifting or separation due to shock, vibration, and so forth, when manufacturing the battery, for example.

According to the above configuration, a laminated battery where bipolar-structure electrodes are laminated can be fabricated by a convenient folding process. That is to say, a laminated battery where the power-generating elements have been serially laminated can be fabricated by a step of folding the first insulating portion 121 and second insulating portion 122 of the first current collector 100 where bipolar-structure electrodes have been provided, and the fourth insulating portion 221 and fifth insulating portion 222 of the second current collector 200 where bipolar-structure electrodes have been provided. Accordingly, a serial-structure laminated battery can be fabricated more conveniently and less expensively as compared to a case of using a process of laminating multiple bipolar-structure electrodes that have been individually separated, while suppressing positional deviation of the component members.

According to the above manufacturing apparatus and manufacturing method, the battery 2300 according to the second embodiment can be manufactured.

Figure 66:
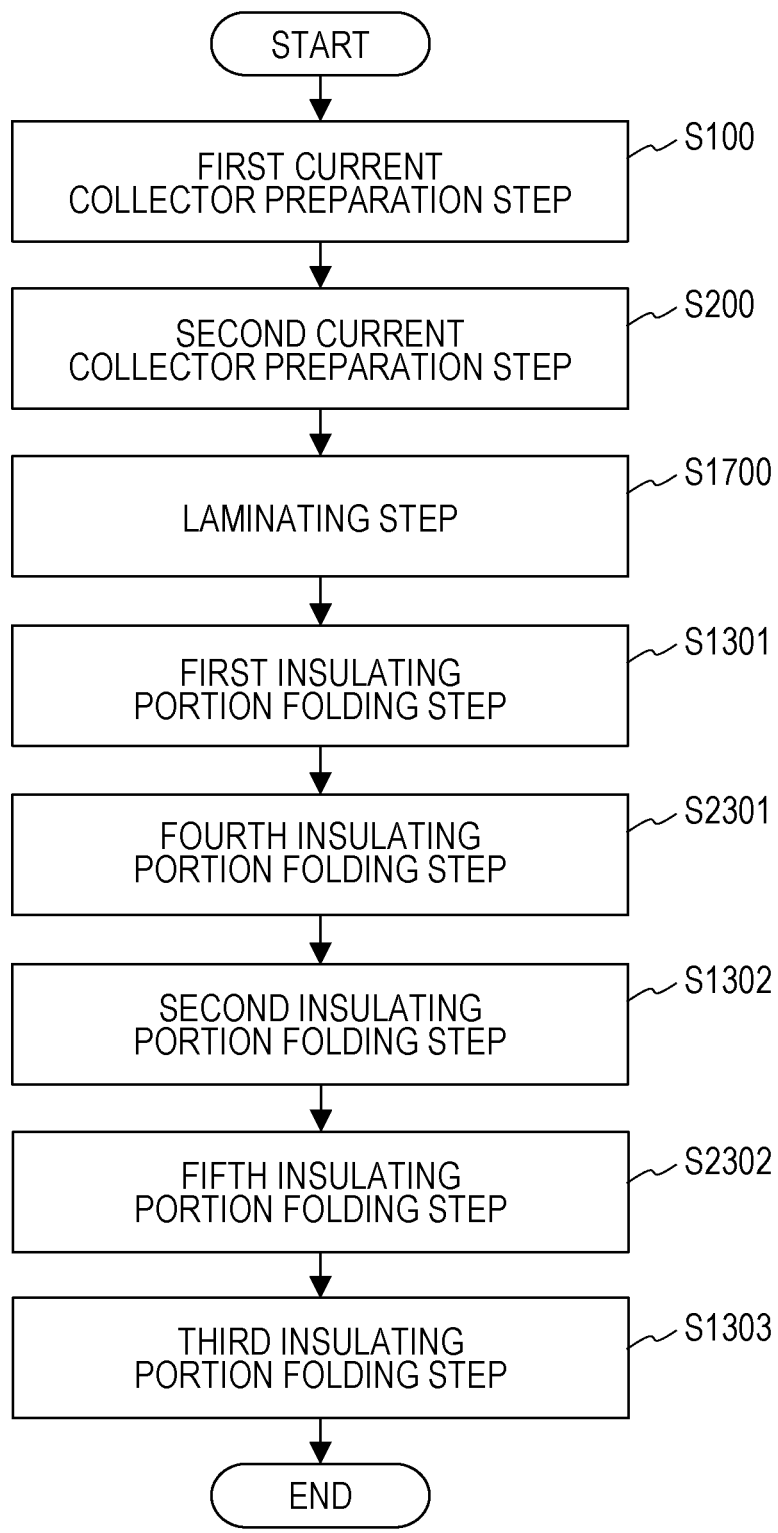
FIG. 66 is a flowchart illustrating an example of a battery manufacturing method according to the third embodiment.

FIG. 66 is a flowchart illustrating an example of a battery manufacturing method according to the third embodiment.

The battery manufacturing method illustrated in FIG. 66 further includes the following steps, in addition to the steps of the above-described battery manufacturing method illustrated in FIG. 65.

That is to say, the battery manufacturing method illustrated in FIG. 66 further includes the third insulating portion folding step S1303.

The third insulating portion folding step S1303 is executed after the fifth insulating portion folding step S2302.

The sixth electrode layer 335 and third counter electrode layer 332 are positioned facing each other, due to the first current collector 100 being folded at the third insulating portion 123 by the current collector folding unit 430 in the third insulating portion folding step S1303.

According to the above configuration, the bonding strength among the component members of the battery can be further improved. That is to say, the third electrode layer 331 and third counter electrode layer 332 can each be formed on the third electroconductive portion 113 and fourth electroconductive portion 114 that are linked to each other by the third insulating portion 123. Accordingly, the positional relationship between the third electrode layer 331 disposed on the third electroconductive portion 113 and the third counter electrode layer 332 disposed on the fourth electroconductive portion 114 can be strongly maintained by the third insulating portion 123 (in other words, by the first current collector 100 that is a single component member). Accordingly, the layers (e.g., the third electrode layer 331 and third counter electrode layer 332) making up the battery can be prevented from exhibiting positional shifting or separation due to shock, vibration, and so forth, when manufacturing the battery, for example.

According to the above configuration, a laminated battery where bipolar-structure electrodes are laminated can be fabricated by a convenient folding process. That is to say, a laminated battery where the power-generating elements have been serially laminated can be fabricated by a step of folding the first insulating portion 121, second insulating portion 122, and third insulating portion 123 of the first current collector 100 where bipolar-structure electrodes have been provided, and the fourth insulating portion 221 and fifth insulating portion 222 of the second current collector 200 where bipolar-structure electrodes have been provided. Accordingly, a serial-structure laminated battery can be fabricated more conveniently and less expensively as compared to a case of using a process of laminating multiple bipolar-structure electrodes that have been individually separated, while suppressing positional deviation of the component members.

According to the above manufacturing apparatus and manufacturing method, the battery 2400 according to the second embodiment can be manufactured.

FIGS. 67A through 67J are x-y views (plan views) illustrating an example of the laminating step S1700 and the insulating portion folding steps.

The first current collector 100 and second current collector 200 are laminated by the above-described battery manufacturing method illustrated in FIG. 66 being carried out. For example, the first current collector 100 and second current collector 200 are laid out orthogonally as illustrated in FIG. 67A, and laminated. Thereafter, the insulating portions of the first current collector 100 and the insulating portions of the second current collector 200 are alternately folded. Accordingly, the laminated-structure battery illustrated in FIG. 67G (the battery 2300 according to the second embodiment) is obtained.

Further, in the example illustrated in FIGS. 67A through 67J, the first current collector 100 and second current collector 200 have further electroconductive portion and insulating portion and power-generating element members (electrode layers, counter electrode layers, and solid electrolyte layers). Thus, the folding can be continued, as illustrated in FIGS. 67H through 67J. Accordingly, a battery where a greater number of power-generating elements have been laminated than the battery 2300 according to the second embodiment can be fabricated.

Note that the shape of the electroconductive portions (and the formation ranges of electrode layers, counter electrode layers, and solid electrolyte layers) may be square, as illustrated in FIGS. 67A through 67J.

FIGS. 68A and 68B are x-y views (plan views) illustrating an example of laminating the first current collector 100 and second current collector 200.

The shape of the electroconductive portions (and the formation ranges of electrode layers, counter electrode layers, and solid electrolyte layers) may be rectangular, as illustrated in FIG. 68. Thus, using shapes that are not squares (e.g., rectangles) for the shapes of the electroconductive portions allows the shapes of the laminated battery formed by these being laminated, to be optionally designed.

Note that the overhang portion forming unit 450 may form the fourth overhang portion and fifth overhang portion.

Figure 69:
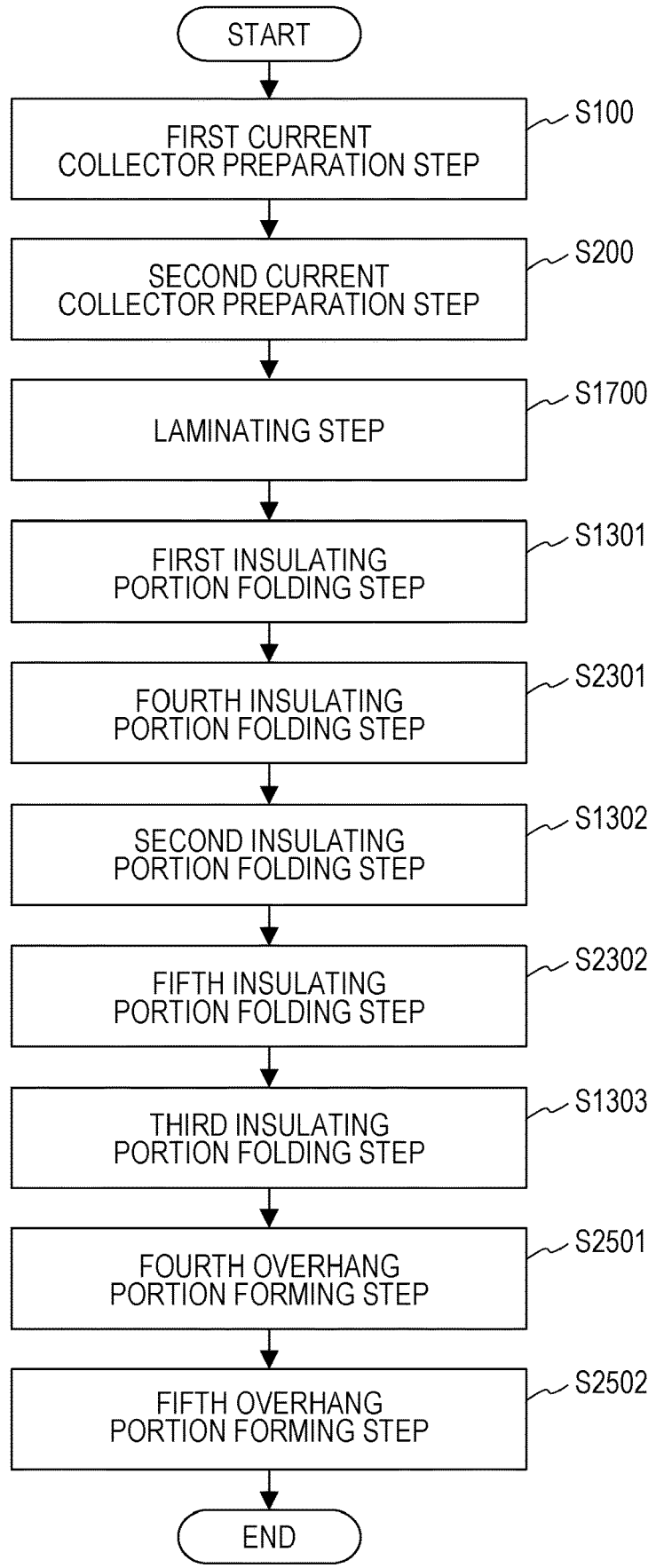
FIG. 69 is a flowchart illustrating an example of a battery manufacturing method according to the third embodiment.

FIG. 69 is a flowchart illustrating an example of a battery manufacturing method according to the third embodiment.

The battery manufacturing method illustrated in FIG. 69 further includes the following steps, in addition to the steps of the above-described battery manufacturing method illustrated in FIG. 66.

That is to say, the battery manufacturing method illustrated in FIG. 69 further includes a fourth overhang portion forming step S2501 (i.e., a step (d4)), and a fifth overhang portion forming step S2502 (i.e., a step (d5)).

The fourth overhang portion forming step S2501 is a step executed after the fourth insulating portion folding step S2301. The fourth overhang portion forming step S2501 is a step in which a portion of the fourth insulating portion 221 is caused by the overhang portion forming unit 450 to overhang from the fifth electroconductive portion 211 to the side where the fourth counter electrode layer 314 is disposed, thereby forming the fourth overhang portion 221a.

According to the above configuration, the side faces of component members situated toward the side where the fourth counter electrode layer 314 is disposed from the fifth electroconductive portion 211 (e.g., power-generating element 310a, first electroconductive portion 111, etc.) can be covered by the fourth overhang portion 221a of the fourth insulating portion 221. That is to say, a configuration where side faces of the battery are covered can be realized more conveniently and less expensively as compared to a case of using a process where individual insulating members (i.e., members different from the fourth insulating portion 221) are separately attached, while suppressing positional deviation of the component members.

Alternatively, the fourth overhang portion forming step S2501 is a step in which a portion of the fourth insulating portion 221 is caused by the overhang portion forming unit 450 to overhang from the sixth electroconductive portion 212 to the side where the fifth electrode layer 325 is disposed, thereby forming the fourth overhang portion 221b.

According to the above configuration, the side faces of component members situated toward the side where the fifth electrode layer 325 is disposed from the sixth electroconductive portion 212 (e.g., power-generating element 320b, power-generating element 330a, third electroconductive portion 113, etc.) can be covered by the fourth overhang portion 221b of the fourth insulating portion 221. That is to say, a configuration where side faces of the battery are covered can be realized more conveniently and less expensively as compared to a case of using a process where individual insulating members (i.e., members different from the fourth insulating portion 221) are separately attached, while suppressing positional deviation of the component members.

The fifth overhang portion forming step S2502 is a step executed after the fifth insulating portion folding step S2302. The fifth overhang portion forming step S2502 is a step in which a portion of the fifth insulating portion 222 is caused by the overhang portion forming unit 450 to overhang from the sixth electroconductive portion 212 to the side where the fifth counter electrode layer 324 is disposed, thereby forming the fifth overhang portion 222a.

According to the above configuration, the side faces of component members situated toward the side where the fifth counter electrode layer 324 is disposed from the sixth electroconductive portion 212 (e.g., power-generating element 310b, power-generating element 320a, second electroconductive portion 112, etc.) can be covered by the fifth overhang portion 222a of the fifth insulating portion 222. That is to say, a configuration where side faces of the battery are covered can be realized more conveniently and less expensively as compared to a case of using a process where individual insulating members (i.e., members different from the fifth insulating portion 222) are separately attached, while suppressing positional deviation of the component members.

Alternatively, the fifth overhang portion forming step S2502 is a step in which a portion of the fifth insulating portion 222 is caused by the overhang portion forming unit 450 to overhang from the seventh electroconductive portion 213 to the side where the sixth electrode layer 335 is disposed, thereby forming the fifth overhang portion 222b.

According to the above configuration, the side faces of component members situated toward the side where the sixth electrode layer 335 is disposed from the seventh electroconductive portion 213 (e.g., power-generating element 330b, fourth electroconductive portion 114, etc.) can be covered by the fifth overhang portion 222b of the fifth insulating portion 222. That is to say, a configuration where side faces of the battery are covered can be realized more conveniently and less expensively as compared to a case of using a process where individual insulating members (i.e., members different from the fifth insulating portion 222) are separately attached, while suppressing positional deviation of the component members.

Note that the order of execution of the fourth overhang portion forming step S2501 and fifth overhang portion forming step S2502 may be optionally decided.

The overhang portion forming unit 450 may have overhang portion forming members (e.g., pressing plate, roller, etc.), for example. The overhang portion forming unit 450 may form the overhang portions by pressing the overhang portion forming members against the insulating portions. For example, the battery 2500 according to the second embodiment may be manufactured by pressing the insulating portions by the overhang portion forming members. Alternatively, the battery 2600 according to the second embodiment may be manufactured by pressing the insulating members by the overhang portion forming members (e.g., moving the overhang portion forming members) from the side where the first electroconductive portion 111 is situated toward the side where the fourth electroconductive portion 114 is situated, for example. Alternatively, the battery 2700 according to the second embodiment may be manufactured by pressing the insulating members by the overhang portion forming members (e.g., moving the overhang portion forming members) from the side where the fourth electroconductive portion 114 is situated toward the side where the first electroconductive portion 111 is situated, for example.

Note that the first overhang portion forming step S1501, second overhang portion forming step S1502, and third overhang portion forming step S1503 may be performed along with the fourth overhang portion forming step S2501 and fifth overhang portion forming step S2502.

According to the above configuration, the side face where the first insulating portion 121, second insulating portion 122, and third insulating portion 123 are situated can be covered by the first insulating portion 121, second insulating portion 122, and third insulating portion 123, while covering the side where the fourth insulating portion 221 and fifth insulating portion 222 are situated by the fourth insulating portion 221 and fifth insulating portion 222.

Note that the second current collector 200 may have the sixth insulating portion 223 linked to the seventh electroconductive portion 213.

The fourth insulating portion 221 and sixth insulating portion 223 may be in contact with each other due to the fourth overhang portion forming step S2501 at this time.

According to the above configuration, the side faces of component members interposed between the sixth electroconductive portion 212 and seventh electroconductive portion 213 (e.g., power-generating element 320b, power-generating element 330a, third electroconductive portion 113, etc.) can be covered by at least one of the fourth insulating portion 221 and sixth insulating portion 223. That is to say, a configuration where side faces of the battery are covered can be realized more conveniently and less expensively as compared to a case of using a process where individual insulating members (i.e., members different from the fourth insulating portion 221 and sixth insulating portion 223) are separately attached, while suppressing positional deviation of the component members.

Note that the fourth insulating portion 221 and sixth insulating portion 223 may come into contact with each other by the fourth overhang portion 221b being formed in the fourth overhang portion forming step S2501, and the fourth overhang portion 221b and the sixth overhang portion 223a of the sixth insulating portion 223 coming into contact with each other (e.g., FIG. 31).

Alternatively, the fourth insulating portion 221 and sixth insulating portion 223 may come into contact with each other by the fourth overhang portion 221b being formed in the fourth overhang portion forming step S2501, and the fourth overhang portion 221b and the sixth insulating portion 223 coming into contact with each other (e.g., FIG. 32).

Note that the fourth insulating portion 221 and sixth insulating portion 223 may come into contact with each other by the sixth overhang portion 223a being formed at the sixth insulating portion 223, and the fourth insulating portion 221 and sixth overhang portion 223a coming into contact with each other (e.g., FIG. 33).

The insulating portion shrinking unit 460 may shrink the fourth insulating portion 221 and fifth insulating portion 222.

Figure 70:
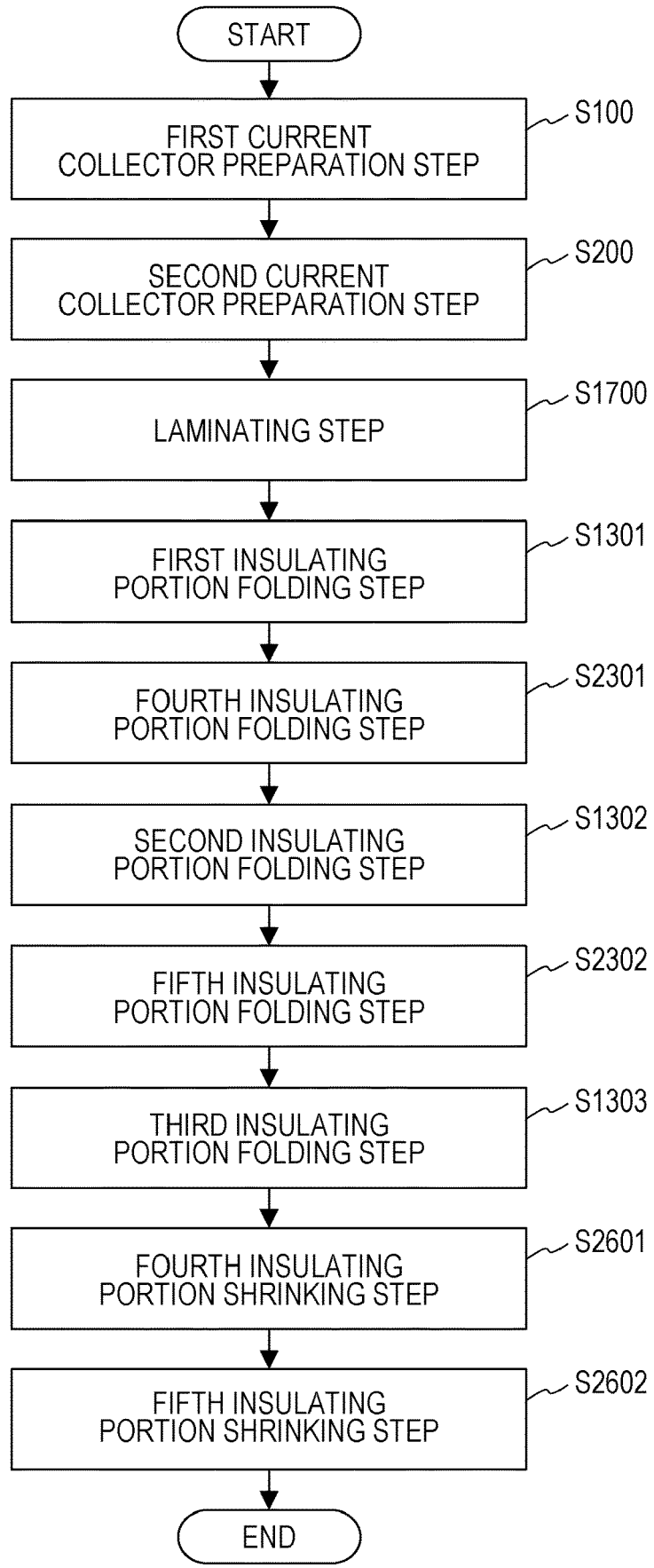
FIG. 70 is a flowchart illustrating an example of a battery manufacturing method according to the third embodiment.

FIG. 70 is a flowchart illustrating an example of a battery manufacturing method according to the third embodiment.

The battery manufacturing method illustrated in FIG. 70 further includes the following steps, in addition to the steps of the above-described battery manufacturing method illustrated in FIG. 66.

That is to say, the battery manufacturing method illustrated in FIG. 70 further includes a fourth insulating portion shrinking step S2601 (i.e., a step (e4)), and a fifth insulating portion shrinking step S2602 (i.e., a step (e5)).

The fourth insulating portion shrinking step S2601 is a step executed after the fourth insulating portion folding step S2301. The fourth insulating portion shrinking step S2601 is a step for shrinking the fourth insulating portion 221 by the insulating portion shrinking unit 460.

According to the above configuration, by shrinking the fourth insulating portion 221, the bonding between component members of the battery can be made even stronger by the fourth insulating portion 221.

The fifth insulating portion shrinking step S2602 is a step executed after the fifth insulating portion folding step S2302. The fifth insulating portion shrinking step S2602 is a step for shrinking the fifth insulating portion 222 by the insulating portion shrinking unit 460.

According to the above configuration, by shrinking the fifth insulating portion 222, the bonding between component members of the battery can be made even stronger by the fifth insulating portion 222.

The fourth insulating portion 221 and fifth insulating portion 222 may include thermal-shrinking material. The method for shrinking the first insulating portion 121, second insulating portion 122, and third insulating portion 123, described above, may be used as the method for shrinking the fourth insulating portion 221 and fifth insulating portion 222.

Note that in the third embodiment, the electrode layer forming unit 410, counter electrode layer forming unit 420, and solid electrolyte layer forming unit 440 may each have, for example, a discharging mechanism (e.g., a discharge orifice) that discharges coating material (e.g., electrode material, counter electrode material, solid electrolyte material, etc.), a supply mechanism (e.g., a tank and supply tube) that supplies the coating material to the discharge mechanism, a conveyance mechanism (e.g., a roller) that conveys an object to be coated or the like, a pressing mechanism (e.g., a pressing stand and a cylinder) that applies pressure for compression, and so forth. Commonly known apparatuses and members may be used for these mechanisms as appropriate.

Note that in the third embodiment, the current collector folding unit 430 may be provided with, for example, a folding mechanism (e.g., rod member, wire member, etc.) that folds an object of folding, a conveying mechanism (e.g., roller) that conveys the object of folding, and so forth. Commonly known apparatuses and members may be used for these mechanisms as appropriate.

Note that in the third embodiment, the laminating unit 470 may be provided with, for example, a conveying mechanism (e.g., roller) that moves an object of laminating (e.g., the first current collector 100 and second current collector 200) or the like, and adjusting mechanism that adjusts the position of the object of laminating, and so forth. Commonly known apparatuses and members may be used for these mechanisms as appropriate.

Note that the battery manufacturing apparatus according to the third embodiment may further have a control unit 500. The control unit 500 controls operations of the electrode layer forming unit 410, counter electrode layer forming unit 420, current collector folding unit 430, solid electrolyte layer forming unit 440, overhang portion forming unit 450, insulating portion shrinking unit 460, and laminating unit 470.

The control unit 500 may be configured of a processor and memory, for example. The processor may be a central processing unit (CPU) or microprocessor unit (MPU) or the like, for example. The processor may execute the control method (battery manufacturing method) disclosed in the present disclosure by reading out and executing programs stored in the memory.

Note that the battery manufacturing method according to the third embodiment is not restricted to coating for the electrode layers, counter electrode layers, and solid electrolyte layers. These may be formed by other techniques (e.g., sequential laminating, applying two objects to each other, transferring, etc.), or by combinations of coating and other techniques, and so forth.

Note that in the battery manufacturing method according to the third embodiment, the power-generating elements may be pressed by a press or the like, after the folding steps or the like. This can realize higher packing density and stronger adhesion. That is to say, applying pressure in the layer direction of the layers enables making the layers more precise and in a better bonding state with each other.

Also, in the battery manufacturing method according to the third embodiment, part of the insulating portions (or all of the insulating portions) may be removed (e.g., cut) after the folding step or the like. Accordingly, energy density by volume and energy density by weight of the battery can be further improved.

The battery according to the present disclosure can be used as a battery (e.g., fully-solid secondary battery) for electronic equipment, electric appliances, electric vehicles, and so forth.

What is claimed is:

1. A battery, comprising:
a first current collector;
a first electrode layer;
a first counter electrode layer;
a second current collector;
a fourth electrode layer; and
a fourth counter electrode layer,
wherein the first counter electrode layer is a counter electrode of the first electrode layer,
wherein the first current collector includes a first electroconductive portion, a second electroconductive portion, and a first insulating portion,
wherein the first electrode layer is disposed in contact with the first electroconductive portion,
wherein the first counter electrode layer is disposed in contact with the second electroconductive portion,
wherein the first insulating portion links the first electroconductive portion and the second electroconductive portion,
wherein the first current collector is folded at the first insulating portion, whereby the first electrode layer and the first counter electrode layer are positioned facing each other,
wherein the fourth counter electrode layer is a counter electrode of the first electrode layer and fourth electrode layer,
wherein the second current collector has a fifth electroconductive portion,
wherein the fifth electroconductive portion is disposed between the first electroconductive portion and second electroconductive portion,
wherein the fourth electrode layer is disposed at a position facing the first counter electrode layer, in contact with the fifth electroconductive portion, and
wherein the fourth counter electrode layer is disposed at a position facing the first electrode layer, in contact with the fifth electroconductive portion.

2. The battery according to claim 1, further comprising:
a second electrode layer; and
a fifth counter electrode layer,
wherein the fifth counter electrode layer is a counter electrode of the first electrode layer, second electrode layer, and fourth electrode layer,
wherein the second current collector has a sixth electroconductive portion and a fourth insulating portion,
wherein the second electrode layer is disposed in contact with the second electroconductive portion,
wherein the fifth counter electrode layer is disposed in contact with the sixth electroconductive portion, wherein the fourth insulating portion links the fifth electroconductive portion and sixth electroconductive portion, and wherein the second current collector is folded at the fourth insulating portion, whereby the second electrode layer and fifth counter electrode layer are positioned facing each other.

3. The battery according to claim 2, further comprising:

a fifth electrode layer; and a second counter electrode layer, wherein the second counter electrode layer is a counter electrode of the first electrode layer, second electrode layer, fourth electrode layer, and fifth electrode layer, wherein the first current collector has the second insulating portion and third electroconductive portion, wherein the fifth electrode layer is disposed in contact with the sixth electroconductive portion, wherein the second counter electrode layer is disposed in contact with the third electroconductive portion, wherein the second insulating portion links the second electroconductive portion and third electroconductive portion, and wherein the first current collector is folded at the second insulating portion, whereby the fifth electrode layer and second counter electrode layer are positioned facing each other.

4. The battery according to claim 3, further comprising:

a third electrode layer; and a sixth counter electrode layer, wherein the sixth counter electrode layer is a counter electrode of the first electrode layer, second electrode layer, third electrode layer, fourth electrode layer, and fifth electrode layer, wherein the second current collector has a seventh electroconductive portion and a fifth insulating portion, wherein the third electrode layer is disposed in contact with the third electroconductive portion, wherein the sixth counter electrode layer is disposed in contact with the seventh electroconductive portion, wherein the fifth insulating portion links the sixth electroconductive portion and seventh electroconductive portion, and wherein the second current collector is folded at the fifth insulating portion, whereby the third electrode layer and sixth counter electrode layer are positioned facing each other.

5. The battery according to claim 4, further comprising:

a sixth electrode layer; and a third counter electrode layer, wherein the third counter electrode layer is a counter electrode of the first electrode layer, second electrode layer, third electrode layer, fourth electrode layer, fifth electrode layer, and sixth electrode layer, wherein the first current collector has the third insulating portion and fourth electroconductive portion, wherein the sixth electrode layer is disposed in contact with the seventh electroconductive portion, wherein the third counter electrode layer is disposed in contact with the fourth electroconductive portion, wherein the third insulating portion links the third electroconductive portion and fourth electroconductive portion, and wherein the first current collector is folded at the third insulating portion, whereby the sixth electrode layer and third counter electrode layer are positioned facing each other.

6. The battery according to claim 5, wherein the fourth insulating portion has a fourth overhang portion that overhangs from the fifth electroconductive portion toward the side where the fourth counter electrode layer is disposed, or that overhangs from the sixth electroconductive portion toward the side where the fifth electrode layer is disposed, and wherein the fifth insulating portion has a fifth overhang portion that overhangs from the sixth electroconductive portion toward the side where the fifth counter electrode layer is disposed, or that overhangs from the seventh electroconductive portion toward the side where the sixth electrode layer is disposed.

7. The battery according to claim 5, wherein the second current collector has a sixth insulating portion linked with the seventh electroconductive portion, and wherein the fourth insulating portion and sixth insulating portion come into contact with each other.

8. The battery according to claim 5, further comprising:

a first solid electrolyte layer;

a second solid electrolyte layer;

a third solid electrolyte layer;

a fourth solid electrolyte layer;

a fifth solid electrolyte layer; and a sixth solid electrolyte layer, wherein the first solid electrolyte layer is situated between the first electrode layer and the fourth counter electrode layer, wherein the second solid electrolyte layer is situated between the second electrode layer and the fifth counter electrode layer, wherein the third solid electrolyte layer is situated between the third electrode layer and sixth counter electrode layer, wherein the fourth solid electrolyte layer is situated between the fourth electrode layer and the first counter electrode layer, wherein the fifth solid electrolyte layer is situated between the fifth electrode layer and the second counter electrode layer, and wherein the sixth solid electrolyte layer is disposed between the sixth electrode layer and third counter electrode layer.

* * * * *